United States Patent
Nelson et al.

(10) Patent No.: US 11,794,139 B2
(45) Date of Patent: *Oct. 24, 2023

(54) FILTER ELEMENTS, AIR CLEANER ASSEMBLIES, AND METHODS OF USE AND ASSEMBLY

(71) Applicant: Donaldson Company, Inc., Bloomington, MN (US)

(72) Inventors: Benny K. Nelson, Bloomington, MN (US); Daniel Adamek, Bloomington, MN (US); David Nelson, Coon Rapids, MN (US); Dave Matalamaki, Apple Valley, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,664

(22) Filed: Mar. 21, 2022

(65) Prior Publication Data

US 2022/0203283 A1 Jun. 30, 2022

Related U.S. Application Data

(63) Continuation of application No. 16/570,550, filed on Sep. 13, 2019, now Pat. No. 11,311,829, which is a
(Continued)

(51) Int. Cl.
*B01D 46/00* (2022.01)
*B01D 46/10* (2006.01)
(Continued)

(52) U.S. Cl.
CPC ..... *B01D 46/0005* (2013.01); *B01D 46/0001* (2013.01); *B01D 46/0004* (2013.01);
(Continued)

(58) Field of Classification Search
CPC ............ B01D 46/0023; B01D 46/0031; B01D 46/62; B01D 46/64; B01D 46/0046;
(Continued)

(56) References Cited

U.S. PATENT DOCUMENTS

| | | |
|---|---|---|
| 4,128,251 A | 12/1978 | Gaither et al. |
| 4,426,095 A | 1/1984 | Buttner |

(Continued)

FOREIGN PATENT DOCUMENTS

| | | |
|---|---|---|
| DE | 199 35 297 A1 | 2/2001 |
| DE | 20 2006 014 784 U1 | 3/2008 |

(Continued)

OTHER PUBLICATIONS

Office Action corresponding to Japanese Application No. 2021-156021 dated Feb. 16, 2023 (English Translation).
(Continued)

*Primary Examiner* — Robert Clemente
(74) *Attorney, Agent, or Firm* — Merchant & Gould P.C.

(57) ABSTRACT

Air cleaner assemblies, components therefor, and features thereof are described. Also described are methods of assembly and use. In depicted examples, the air cleaner assemblies and components optionally use advantageous housing seal features. Methods of assembly and use are described.

21 Claims, 49 Drawing Sheets

Related U.S. Application Data continuation of application No. 15/430,268, filed on Feb. 10, 2017, now Pat. No. 10,413,855.

(60) Provisional application No. 62/294,690, filed on Feb. 12, 2016.

(51) Int. Cl.
*B01D 46/62* (2022.01)
*B01D 46/24* (2006.01)
*B01D 46/52* (2006.01)

(52) U.S. Cl.
CPC ..... *B01D 46/0031* (2013.01); *B01D 46/0046* (2013.01); *B01D 46/10* (2013.01); *B01D 46/2411* (2013.01); *B01D 46/526* (2013.01); *B01D 46/527* (2013.01); *B01D 46/62* (2022.01); *B01D 2265/021* (2013.01); *B01D 2271/027* (2013.01); *B01D 2279/60* (2013.01)

(58) Field of Classification Search
CPC .......... B01D 46/10; B01D 46/525–527; B01D 2279/60; B01D 2271/027; B01D 2265/021; B01D 46/2414; B01D 46/0001; B01D 46/0004; B01D 46/0005
See application file for complete search history.

(56) References Cited

U.S. PATENT DOCUMENTS

| | | |
|---|---|---|
| 4,720,292 A | 1/1988 | Engel et al. |
| 4,734,195 A | 3/1988 | Lhuillier et al. |
| 4,974,881 A | 12/1990 | Engel et al. |
| 5,464,337 A | 11/1995 | Bernardon et al. |
| 5,487,767 A | 1/1996 | Brown |
| 5,556,440 A | 9/1996 | Mullins et al. |
| 5,613,992 A | 3/1997 | Engel |
| 5,755,844 A | 5/1998 | Arai et al. |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| 6,039,778 A | 3/2000 | Coulonvaux |
| D425,189 S | 5/2000 | Gillingham et al. |
| D428,128 S | 7/2000 | Gillingham et al. |
| 6,132,608 A | 10/2000 | Sale et al. |
| 6,179,890 B1 | 1/2001 | Ramos et al. |
| D437,401 S | 2/2001 | Ramos et al. |
| 6,190,432 B1 | 2/2001 | Gieseke et al. |
| 6,210,469 B1 | 4/2001 | Tokar |
| RE37,163 E | 5/2001 | Oussoren et al. |
| 6,235,195 B1 | 5/2001 | Tokar |
| 6,348,084 B1 | 2/2002 | Gieseke et al. |
| 6,350,291 B1 | 2/2002 | Gieseke et al. |
| 6,350,296 B1 | 2/2002 | Warner |
| 6,383,244 B1 | 5/2002 | Wake et al. |
| 6,387,162 B1 | 5/2002 | Kosmider et al. |
| 6,416,561 B1 | 7/2002 | Kallsen et al. |
| 6,419,718 B1 | 7/2002 | Klug et al. |
| 6,447,567 B1 | 9/2002 | Ehrenberg |
| 6,482,247 B2 | 11/2002 | Jaroszczyk et al. |
| 6,517,598 B2 | 2/2003 | Anderson et al. |
| 6,572,667 B1 | 6/2003 | Grief et al. |
| 6,585,894 B1 | 7/2003 | Gebert et al. |
| 6,638,332 B1 | 10/2003 | Schmitz et al. |
| 6,652,614 B2 | 11/2003 | Gieseke et al. |
| 6,673,136 B2 | 1/2004 | Gillingham et al. |
| 6,706,087 B1 | 3/2004 | Gebler et al. |
| 6,966,940 B2 | 11/2005 | Krisko et al. |
| 7,070,642 B2 | 7/2006 | Scott et al. |
| 7,083,661 B2 | 8/2006 | Hasegawa et al. |
| 7,351,270 B2 | 4/2008 | Engelland et al. |
| 7,396,375 B2 | 7/2008 | Nepsund et al. |
| 7,396,376 B2 | 7/2008 | Schrage et al. |
| 7,455,707 B2 | 11/2008 | Engel et al. |
| 7,520,913 B2 | 4/2009 | Mills et al. |
| 7,524,349 B2 | 4/2009 | Schrage et al. |
| 7,537,631 B2 | 5/2009 | Scott et al. |
| 7,625,419 B2 | 12/2009 | Nelson et al. |
| 7,658,777 B2 | 2/2010 | Kopec et al. |
| 7,682,416 B2 | 3/2010 | Engelland et al. |
| 7,959,703 B2 | 1/2011 | Merritt et al. |
| RE42,174 E | 3/2011 | Gunderson et al. |
| 7,905,936 B2 | 3/2011 | Coulonvaux et al. |
| 7,981,183 B2 | 7/2011 | Nepsund et al. |
| 8,038,756 B2 | 10/2011 | Iddings et al. |
| 8,066,791 B2 | 11/2011 | Baseotto et al. |
| 8,097,154 B2 | 1/2012 | Dworatzek et al. |
| 8,128,724 B2 | 3/2012 | Mills et al. |
| 8,142,533 B2 | 3/2012 | Gillenberg et al. |
| 8,147,576 B2 | 4/2012 | Gillenberg et al. |
| 8,152,876 B2 | 4/2012 | Gillenberg et al. |
| 8,163,056 B2 | 4/2012 | Coulonvaux et al. |
| 8,167,142 B2 | 5/2012 | Hacker |
| 8,182,569 B2 | 5/2012 | Casey et al. |
| 8,216,335 B2 | 7/2012 | Scott et al. |
| 8,226,786 B2 | 7/2012 | Schrage et al. |
| 8,241,383 B2 | 8/2012 | Schrage et al. |
| 8,268,032 B2 | 9/2012 | Eyers et al. |
| 8,273,143 B2 | 9/2012 | Coulonvaux et al. |
| 8,277,532 B2 | 10/2012 | Reichter et al. |
| 8,287,612 B2 | 10/2012 | Gillenberg et al. |
| 8,292,984 B2 | 10/2012 | Baseotto et al. |
| 8,328,897 B2 | 12/2012 | Nelson et al. |
| 8,382,876 B2 | 2/2013 | Widerski et al. |
| 8,404,029 B2 | 3/2013 | Lundgren et al. |
| 8,414,675 B2 | 4/2013 | Iddings et al. |
| 8,444,736 B2 | 5/2013 | Dworatzek et al. |
| 8,479,924 B2 | 7/2013 | Mbadinga-Mouanda et al. |
| 8,499,749 B2 | 8/2013 | Mosset et al. |
| 8,557,007 B2 | 10/2013 | Read |
| 8,591,621 B2 | 11/2013 | Ruhland et al. |
| 8,714,142 B2 | 5/2014 | Jacob et al. |
| 8,747,512 B2 | 6/2014 | Mills et al. |
| 8,758,467 B2 | 6/2014 | Lundgren et al. |
| 8,814,973 B2 | 8/2014 | Baseotto et al. |
| 8,864,866 B2 | 10/2014 | Osendorf et al. |
| 8,906,128 B2 | 12/2014 | Reichter et al. |
| 8,916,044 B2 | 12/2014 | Rapin |
| 8,920,530 B2 | 12/2014 | Ruhland et al. |
| 8,945,268 B2 | 2/2015 | Nelson et al. |
| 9,044,695 B2 | 6/2015 | Sann et al. |
| 9,089,804 B2 | 7/2015 | Campbell et al. |
| 9,120,047 B2 | 9/2015 | Boehrs et al. |
| 9,180,399 B2 | 11/2015 | Reichter et al. |
| 9,254,457 B2 | 2/2016 | Kaufmann et al. |
| 9,346,001 B2 | 5/2016 | Kato et al. |
| 9,387,425 B2 | 7/2016 | Osendorf et al. |
| 9,399,972 B2 | 7/2016 | Boehrs et al. |
| 9,527,023 B2 | 12/2016 | Reichter et al. |
| 9,610,529 B2 | 4/2017 | Mills et al. |
| 9,636,615 B2 | 5/2017 | Osendorf et al. |
| 10,029,198 B2 | 7/2018 | Adamek et al. |
| 10,245,541 B2 | 4/2019 | Kaufmann et al. |
| 10,258,913 B2 | 4/2019 | Osendorf et al. |
| 10,279,302 B2 | 5/2019 | Mills et al. |
| 10,413,855 B2 | 9/2019 | Nelson et al. |
| 10,576,403 B2 | 3/2020 | Osendorf et al. |
| 10,576,406 B2 | 3/2020 | Osendorf et al. |
| 10,646,810 B2 | 5/2020 | Movia et al. |
| 10,758,859 B2 | 9/2020 | Gieseke et al. |
| 10,835,850 B2 | 11/2020 | Osendorf et al. |
| 11,311,829 B2 | 4/2022 | Nelson et al. |
| 11,331,609 B2 | 5/2022 | Osendorf et al. |
| 11,420,147 B2 | 8/2022 | Gieseke et al. |
| 2003/0146149 A1 | 8/2003 | Binder et al. |
| 2004/0035097 A1 | 2/2004 | Schelnsker et al. |
| 2004/0187689 A1 | 9/2004 | Sporre et al. |
| 2005/0130508 A1 | 6/2005 | Yeh |
| 2005/0166561 A1 | 8/2005 | Schrage et al. |

(56) References Cited

U.S. PATENT DOCUMENTS

| | | |
|---|---|---|
| 2005/0252848 A1 | 11/2005 | Miller |
| 2006/0102549 A1 | 5/2006 | Wright |
| 2008/0110142 A1 | 5/2008 | Nelson et al. |
| 2009/0145095 A1 | 6/2009 | Juliar et al. |
| 2010/0064646 A1 | 3/2010 | Smith et al. |
| 2010/0263339 A1 | 10/2010 | Steins et al. |
| 2011/0017657 A1 | 1/2011 | Jokschas et al. |
| 2011/0094197 A1 | 4/2011 | Ruhland et al. |
| 2011/0308212 A1 | 12/2011 | Ruhland et al. |
| 2014/0059986 A1 | 3/2014 | Kaufmann et al. |
| 2014/0102058 A1 | 4/2014 | Kaufmann et al. |
| 2014/0165834 A1 | 6/2014 | Kaufmann et al. |
| 2014/0208702 A1 | 7/2014 | Lundgren et al. |
| 2014/0215982 A1 | 8/2014 | Wood et al. |
| 2014/0250843 A1 | 9/2014 | Krull et al. |
| 2015/0101298 A1 | 4/2015 | Osendorf et al. |
| 2015/0292448 A1 | 10/2015 | Campbell et al. |
| 2016/0375391 A1 | 12/2016 | Adamek et al. |
| 2018/0361292 A1 | 12/2018 | Adamek et al. |
| 2019/0046915 A1 | 2/2019 | Gieseke et al. |
| 2020/0338486 A1 | 10/2020 | Osendorf et al. |
| 2021/0046416 A1 | 2/2021 | Gieseke et al. |
| 2021/0069623 A1 | 3/2021 | Osendorf et al. |

FOREIGN PATENT DOCUMENTS

| | | |
|---|---|---|
| DE | 20 2007 018 072 U1 | 6/2009 |
| DE | 20 2008 017 059 U1 | 6/2010 |
| DE | 10 2011 106 502 A1 | 12/2012 |
| EP | 0 676 228 A1 | 10/1995 |
| EP | 0 793 041 A1 | 9/1997 |
| EP | 1 106 232 A1 | 6/2001 |
| EP | 2 477 718 B1 | 3/2014 |
| EP | 2 982 427 A1 | 2/2016 |
| EP | 2 742 986 B1 | 4/2018 |
| FR | 2 214 505 A1 | 8/1974 |
| JP | 2004-136203 | 5/2004 |
| JP | 2007-205261 | 8/2007 |
| JP | 2009-501859 | 1/2009 |
| JP | 2009-136733 A | 6/2009 |
| JP | 2013-508132 | 3/2013 |
| JP | 2014-532554 A | 12/2014 |
| JP | 2016-523178 A | 8/2016 |
| KR | 10-2015-0086351 | 7/2015 |
| WO | WO 2004/007054 A1 | 1/2004 |
| WO | WO 2004/082795 A1 | 9/2004 |
| WO | WO 2005/077487 A1 | 8/2005 |
| WO | WO 2006/006241 A1 | 1/2006 |
| WO | WO 2007/044677 A1 | 4/2007 |
| WO | WO 2008/045326 A2 | 4/2008 |
| WO | WO 2009/014986 A1 | 1/2009 |
| WO | WO 2009/014988 A1 | 1/2009 |
| WO | WO 2011/047754 A1 | 4/2011 |
| WO | WO 2012/116314 A1 | 8/2012 |
| WO | WO 2013/003762 A2 | 1/2013 |
| WO | 2014/194275 A2 | 12/2014 |
| WO | WO 2014/197698 A2 | 12/2014 |
| WO | WO 2015/010085 A2 | 1/2015 |
| WO | WO 2016/057815 A1 | 4/2016 |
| WO | WO 2016/077377 A1 | 5/2016 |

OTHER PUBLICATIONS

U.S. Appl. No. 61/551,741, filed Oct, 2011.
U.S. Appl. No. 61/712,454, filed Oct. 2012.
Communication Relating to the Results of the Partial International Search Report for PCT/US2017/01754 dated May 31, 2017.
First Examination Report corresponding to Australian Patent Application No. 2017217863 dated Sep. 28, 2021.
International Search Report and Written Opinion for Application No. PCT/US2017/017514 dated Jul. 26, 2017.
Notice of Reasons for Rejection corresponding to Korean Patent Application Publication No. 10-2018-7025590.
Office Action corresponding to EP 17707730.2 dated Feb. 12, 2020.
Office Action corresponding to Indian Patent Application No. 201817026960 dated Sep. 18, 2020.
Office Action corresponding to Indian Patent Application No. 202118011663 dated Feb. 18, 2022.
Office Action corresponding to Russian Patent Application No. 2018132403 dated Jul. 24, 2020.
Office Action in corresponding China Application 201780010285.9 dated Jun. 17, 2020.
Exhibit A, Allowed Claims of U.S. Appl. No. 16/744,360 dated Apr. 20, 2022.
Exhibit B, Pending claims of U.S. Appl. No. 17/098,537 dated Apr. 20, 2022.
Exhibit C, Pending claims of U.S. Appl. No. 16/942,327 dated Apr. 20, 2022.
Exhibit A, Pending Claims of U.S. Appl. No. 17/734,598.
Exhibit B, Pending Claims of U.S. Appl. No. 17/863,883.
Office Action corresponding to Brazilian Application No. BR 12 2023 003646-8 dated Apr. 11, 2023 (English Translation).

FILTER ELEMENTS, AIR CLEANER ASSEMBLIES, AND METHODS OF USE AND ASSEMBLY

CROSS REFERENCE TO RELATED APPLICATIONS

This application is a continuation of U.S. application Ser. No. 16/570,550 that was filed the United States Patent and Trademark Office on Sep. 13, 2019, and that granted as U.S. Pat. No. 11,311,829. U.S. application Ser. No. 16/570,550 claims priority to U.S. application Ser. No. 15/430,268 that was filed the United States Patent and Trademark Office on Feb. 10, 2017, and that granted as U.S. Pat. No. 10,413,855. U.S. application Ser. No. 15/430,268 claims priority to U.S. Application Ser. No. 62/294,690 that was filed with the United States Patent and Trademark Office on Feb. 12, 2016. A claim of priority is made to each of U.S. application Ser. Nos. 16/570,550, 15/430,268, and 62/294,690 is made to the extent appropriate. The disclosures of U.S. application Ser. Nos. 16/570,550, 15/430,268, and 62/294,690 are incorporated herein by reference.

BACKGROUND

Air or other gas filtering is desirable in a number of systems. A typical application is in the filtration of intake air to internal combustion engines. Another is in the filtration of crankcase ventilation filter assemblies. Typically, such systems comprise filter assemblies having a serviceable filter cartridge therein. After a period of use, filter media within a filter housing requires servicing, either through cleaning or complete replacement. Typically, for an air cleaner or crankcase ventilation filter assembly used with an internal combustion engine, for example, on a vehicle, the filter media is contained in a removable and replaceable, i.e. serviceable, component, typically referred as a filter element or cartridge. The filter cartridge is configured to be removably sealed within the air cleaner, in use. Improvements in filter arrangements relating to assembly, serviceability, and/or use are desirable. The filter cartridge can be provided as a first (e.g., primary) filter cartridge or a second (e.g., secondary or safety) filter cartridge. The air cleaner assembly can contain only a first filter cartridge or both a first filter cartridge and a second filter cartridge.

SUMMARY

Filter assemblies (such as air cleaner assemblies or crankcase ventilation filter assemblies) and components therefor; and, features thereof are described. Also described are methods of assembly and use. The filter assemblies generally comprise a housing having a filter cartridge removably positioned therein. An exemplary filter cartridge is depicted which has a housing seal surface comprising a radially directed surface extending in a perimeter around an open volume and having a plurality of radially outwardly projecting and axially extending sections alternating with radially inwardly projecting and axially extending sections. The plurality of radially outwardly projecting and axially extending sections alternating with radially inwardly projecting and axially extending sections are constructed to engage a housing sealing surface having a plurality of axially extending ribs projecting radially from a housing sealing surface.

Another exemplary filter cartridge depicted includes filtration media and a housing seal arrangement. The housing seal arrangement includes a non-wavy wall seal support, and a seal member supported by (e.g., molded to) the non-wavy wall seal support and having a radially directed seal surface and a thickness between the seal support and the radially directed seal surface that varies along the seal member to provide a wavy wall seal member surface forming the radially directed seal surface.

Another exemplary filter cartridge depicted includes filtration media and a housing seal arrangement. The housing seal arrangement includes a seal member having a radially directed wavy wall seal member surface, a plurality of lobes arranged along and forming the wavy wall seal member surface, and wherein the plurality of lobes provide a pitch of about 1 mm/lobe to about 25 mm/lobe (e.g., about 2 mm/lobe to about 12 mm/lobe) wherein the pitch is the distance between peaks on adjacent lobes.

Another exemplary filter cartridge depicted includes filtration media and a housing seal arrangement wherein the housing seal arrangement includes a seal support and a seal member supported by the seal support and having a radially directed surface and a softness sufficient to permit the radially directed surface to conform to a wavy wall seal surface on a filter housing having a plurality of lobes provided at a pitch of about 1 mm/lobe to about 25 mm/lobe (e.g., about 2 mm/lobe to about 12 mm/lobe) wherein the pitch is the distance between peaks of adjacent lobes.

There is no specific requirement that an air cleaner assembly, component therefor, or feature thereof include all of the detail characterized herein, to obtain some advantage according to the present disclosure.

DETAILED DESCRIPTION

Herein, example filter assemblies, filter cartridges, features and components therefor are described and depicted. A variety of specific features and components are characterized in detail. Many can be applied to provide advantage. There is no specific requirement that the various individual features and components be applied in an overall assembly with all of the features and characteristics described, however, in order to provide for some benefit in accord with the present disclosure.

It is noted that a plurality of embodiments are depicted and described. The embodiments are not meant to be exclusive with respect to features depicted. That is, selected features of one embodiment can be applied in one or more of the other embodiments if desired, to advantage. In many examples, the filter assembly depicted is an air cleaner assembly, for example, used to filter intake air for an internal combustion engine. Additional embodiments are described in which the filter assembly is a crankcase ventilation filter assembly, in which the filter cartridge is used to filter crankcase blowby gases which include, typically, both particulate and liquid contaminant therein. Both type of filter assemblies are generally "gas filter assemblies," since the carrier stage being filtered is gas (air or crankcase ventilation gases). While the techniques described herein will typically be used in application for gas filtration, they can be used in the filtration of other materials, for example, liquids, if desired.

Figure 1:
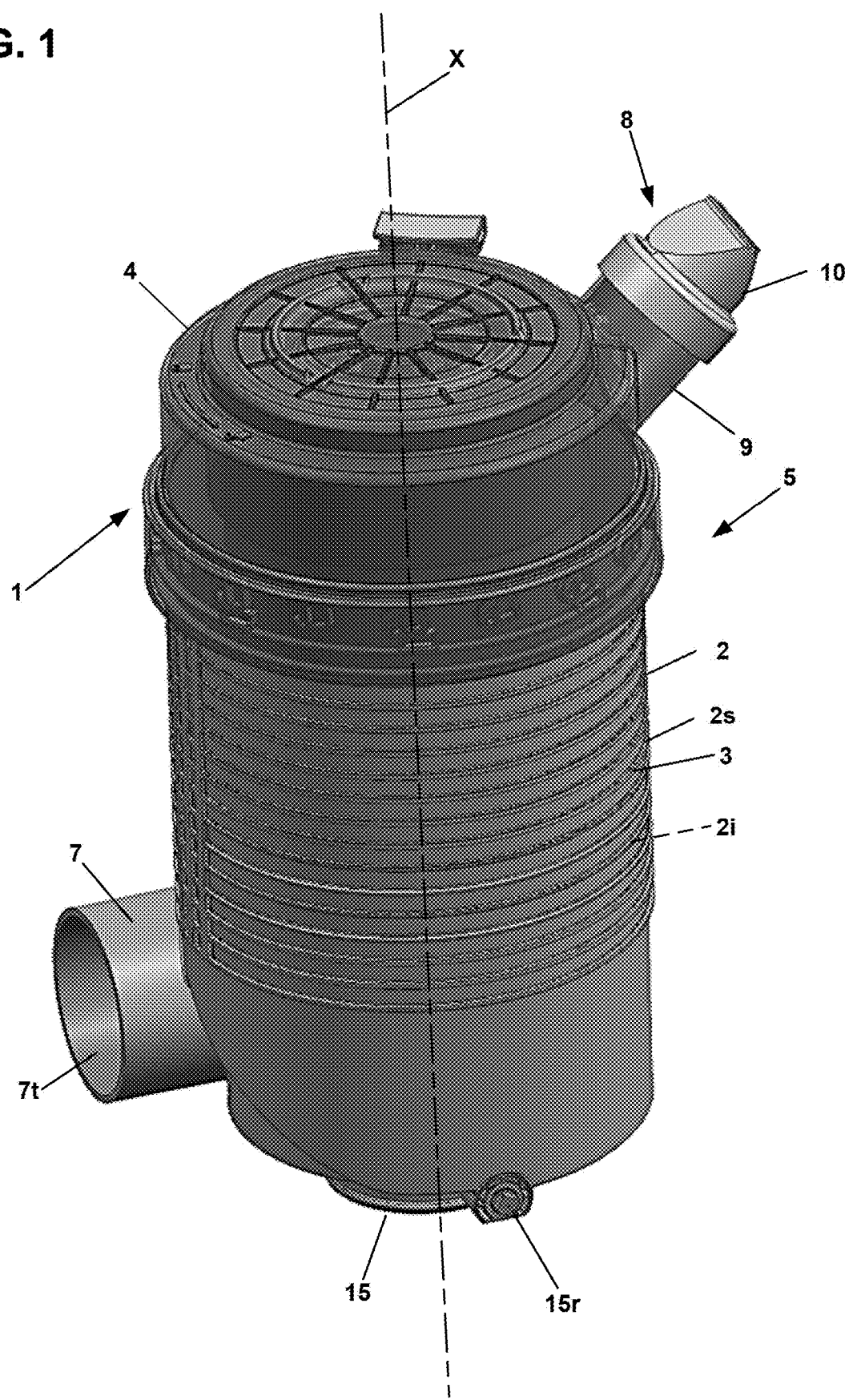
FIG. 1 is a perspective view of an air cleaner assembly according to the present disclosure.

The reference numeral 1, FIG. 1, generally indicates a filter assembly, for example, an air cleaner or air cleaner assembly or arrangement in accord with the present disclosure. The filter assembly (in the example an air cleaner assembly) 1 comprises a housing 2. The housing 2 defines a sidewall 2s and includes: a first body or housing section 3; and a second body section or access cover 4. In the example depicted, the access cover 4 is removably secured to the first body section 3, but alternatives are possible. Also although alternatives are possible, for the example depicted, attachment of the cover section 4 to the body section 3 is by a twist lock arrangement 5. The exemplary twist lock arrangement 5 is depicted in U.S. Provisional Application No. 62/184, 567, filed on Jun. 2, 2015, the disclosure of which is incorporated herein by reference. The cover section 4 can be held to the body section 3 by latches such as, for example, over center latches.

In general, the air (gas) cleaner 1 includes an air (gas) flow inlet arrangement 7. In the example depicted, the air flow inlet arrangement 7 is an inlet tube indicated at 7t, on the body section 3. The particular inlet tube 7t depicted is configured as a side, tangential, inlet, i.e. gas flow is directed tangentially against an inner wall of housing 2, as opposed to being directed directly toward a housing central axis X. Alternate inlet arrangements, locations and direction are possible. However, the tangential inlet arrangement depicted is convenient and advantageous for reasons discussed below.

At 8, a dust/water ejector arrangement is depicted on the housing 2, comprising tube 9. In the example depicted, the tube 9 comprises a portion of access cover 4, although alternatives are possible. The tube 9 is covered by an evacuator valve arrangement 10, in the example depicted comprising a duck-billed valve of a type widely used with air cleaners, see for example WO 2006/06241 A1; U.S. Pat. No. 6,419,718 B1; and U.S. Pat. No. 8,864,866, incorporated herein by reference. Alternate evacuator valve arrangements can be used.

At 15, an outlet tube or flow tube is depicted, as a portion of housing 2 positioned on a remainder of the housing body section 3. The tube 15 can be formed integral with the housing body 3, but the outlet tube 15 can be a separate piece snap-fit or otherwise attached to the housing body 3.

In operation, air (gas) to be filtered enters the air cleaner assembly through inlet tube 7t. Eventually the air passes through filter media of a filter cartridge arrangement positioned within interior 2i of the housing 2. After passage through media of the air filter cartridge, the filtered air is directed to exit the housing through outlet tube 15. From outlet tube 15, the filtered air is directed to downstream equipment such as to a turbo system or to the air intake of an engine system.

The particular air cleaner (filter) assembly 1 depicted includes an optional precleaner stage. The precleaner stage is provided in part by directing air from inlet tube 7t tangentially into interior 2i of the housing 2. The air will then be directed into a cyclonic pattern around an interior of the assembly 1. This will tend to drive a portion of any water or dust particles contained within the air stream, against an interior surface of sidewall 2s. This material, separated from the air stream, will eventually migrate to, and enter, the tube 9, from which ejection occurs through valve 10.

The particular air cleaner assembly 1 depicted is configured so that it can be mounted in a variety of orientations, for example with the central axis X directed vertically, or alternatively with the central axis X directed horizontally, or any angle between vertical and horizontal. This is facilitated by having outlet tube 9 directed downwardly.

The housing body section 3 can include a mounting pad arrangement thereon. The mounting pad arrangement can be formed integral with a remainder of the housing 2 or it can be a separate piece. The mounting pad arrangement is used to help secure the housing 2 in place, on equipment with which air cleaner 1 would be used. By having the mounting pad arrangement on the housing section 3, the housing section 3 can be retained in place on the equipment by bolts, or other systems during servicing, with access cover 4 being removably secured to body section 3, for convenient servicing. An exemplary mounting pad arrangement that can be used as part of the housing section 3 is disclosed in U.S. Pat. No. 8,864,866, the disclosure of which is incorporated herein by reference.

A pressure tap for a restriction indicator 15r can optionally be used with air cleaner assembly 1.

Additional air cleaner assemblies can be used in conjunction with the present disclosure, including those depicted and described in WO 2006/06241 A1; WO 2009014988; U.S. Pat. Nos. 6,419,718 B1; and, 8,864,866, the disclosures of which are incorporated herein by reference.

Figure 2:
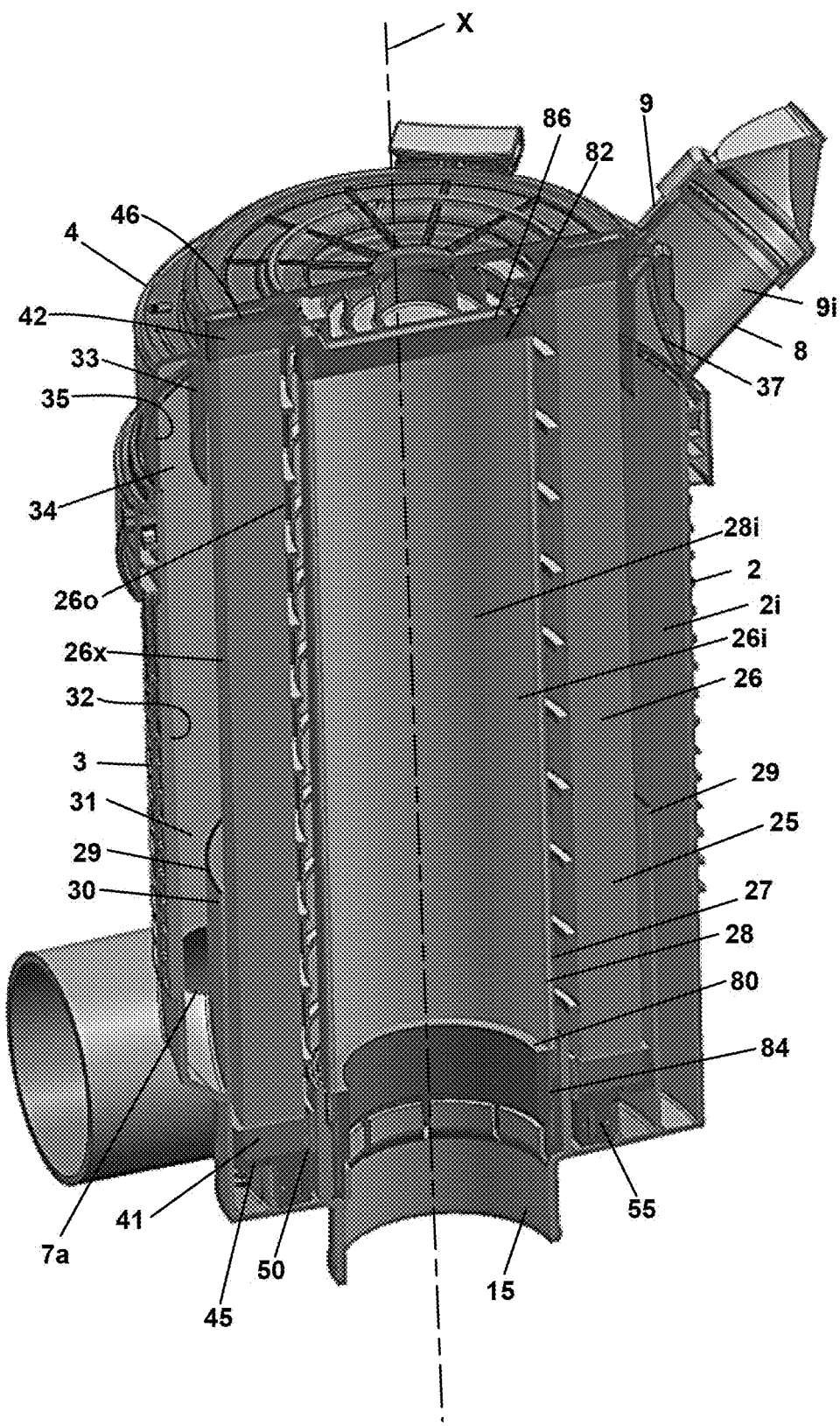
FIG. 2 is a perspective, sectional view of the air cleaner assembly of FIG. 1.

Attention is now directed to FIG. 2, in which air cleaner assembly 1 is depicted in cross-section. Referring to FIG. 2, filter cartridge 25 and filter cartridge 27 are viewable positioned within housing interior 2i. The filter cartridge 25 will be described in greater detail below. In general, the cartridge 25 is a serviceable component that includes an extension of filter media 26 through which air to be filtered passes, before it can exit assembly 1. In addition, the filter cartridge 27 will be described in greater detail below. In general, the cartridge 27 is a serviceable component that includes an extension of filter media 28 through which air to be filtered passes before it exits assembly 1. The filter cartridge 25 can be referred to as a first (e.g., primary) filter cartridge or element, and the filter cartridge 27 can be referred to as a second (e.g., secondary or safety) filter cartridge or element. The various features of the embodiments of the filter cartridges discussed herein can be applied to both primary and secondary filter cartridges, and such discussion should not be interpreted as being limited to only primary or secondary filter cartridges, unless indicated otherwise. Further, the various features of certain embodiments of the filter cartridges discussed herein can be applied to other embodiments, and such discussion should not be interpreted as being limited to only the particular embodiment being described, unless apparent by context or indicated otherwise.

By the term "serviceable component" as used herein, and in reference to the cartridges 25 and 27, it is meant that the cartridges 25 and 27 are removable and replaceable in the air cleaner assembly 1. Thus, as the media 26 and/or 28 occludes during use, the cartridge 25 and/or the cartridge 27 can be removed, and can be refurbished or replaced.

Referring to FIG. 2, it can be seen that housing 2 includes an optional shield arrangement 29 surrounding a selected portion of the filter cartridge 25. The shield arrangement 29 includes first shield section 30 in housing body section 3, oriented to surround a portion of the cartridge 25 at that location, creating an annulus 31 between the shield 30 and outer sidewall 32. Air from inlet 7 is directed into inlet aperture 7a and into annulus 31, and in a cyclonic pattern. Shield 30 inhibits direct impingement of the dust and other material carried by the inlet air in annulus 31 onto the media 26 until after the air has moved at least partially through the cyclonic pattern and past shield 30 in a direction toward access cover 4.

In FIG. 2, a second shield section of shield arrangement 29 is depicted in access cover 4 at reference number 33. The second shield section 33 defines an annulus 34 between the shield 33 and sidewall 35 of section 4. At 37, an egress or outlet aperture in a sidewall 2 from housing interior 2i to interior 9i of tube 9 is depicted. The egress or outlet aperture 37 is in communication with the annulus 34. The shield 33 helps facilitate removal of dust and other materials through aperture 37 into dust ejector arrangement 8.

Use of shield arrangements analogous to shield arrangement 29, with one or more shields analogous to sections 30 and 33, is common in many air cleaner arrangements, see for example WO 2006/06241 A1; WO 2009/014988; U.S. Ser. No. 61/446,653; U.S. Ser. No. 61/473,296; U.S. Pat. Nos. 6,419,718 B1; and 8,864,866, the disclosures of which are incorporated herein by reference. Analogous features and principles can be used here.

It is noted that the use of the shield arrangement 29 and dust ejector arrangement 8 is consistent with many applications in which a "dual stage" or "two stage" air (gas) cleaner is desired, having a first precleaner stage to separate water and larger particles from the air before it passes into the filter cartridge 25 (the second stage). However, such features are generally optional, and many of the principles of the present disclosure can be applied in air cleaners that do not have such a two stage configuration or precleaner stage. Downstream of the filter cartridge 25 is the second filter cartridge 27 so that air passes through both of the filter cartridge 25 and the filter cartridge 27 prior to exiting via the air outlet 15. It should be understood that the air cleaner assembly 1 can be operated with the filter cartridge 25 alone, with the filter cartridge 27 alone, or with both the filter cartridge 25 and the filter cartridge 27 provided together and as shown in FIG. 2.

As indicated above, the features previously identified and discussed with respect to FIGS. 1-2 relating to general air cleaner configuration (filter assembly) and operation are well known features, forms of which have been used in a variety of systems. Certain unique characteristics of the present air cleaner, of FIGS. 1-2, relate to specific features of the filter cartridges, and in particular relating to its engagement with a remaining portion of the air cleaner assembly 1. In this section, selected features relating to this are discussed.

In general terms, again, the cartridges 25 and 27 are serviceable components. That is, they can be removed and replaced through the lifetime of the air cleaner 1. A releasable seal is necessary between the cartridge 25 and the housing 2, and between the cartridge 27 and the housing, to allow the cartridges to be serviceable components and to ensure that unfiltered air does not bypass the cartridge 25 and/or the cartridge 27 and enter the outlet tube 15, as this can cause damage to the engine.

The filter cartridge 25 generally includes filtration media 26 extending between first and second opposite media ends 41 and 42. First media end 41 is engaged by a first end piece (e.g., cap) 45. The second media end 42 is engaged by a second end piece (e.g., cap) or piece 46. Thus, the media 26 extends between opposite end caps (e.g., end pieces) 45, 46.

Although alternatives are possible with selected techniques described herein, for the example depicted, the filter media 26 is configured surrounding an open filter interior 26i, generally around a central axis X of the air cleaner 1 and cartridge 25. The media 26 can be pleated media, although alternatives are possible. The media 26 can be configured in a cylindrical pattern as shown, if desired, although alternatives are possible. For example, the media 26 can be somewhat conical in extension between the opposite ends 41, 42. Also, the media can be configured with non-circular inner and/or outer perimeters; for example oblong, oval or other cross-sectional configurations are possible. In some embodiments, the media is arranged around a central plenum to achieve these various configurations.

Although alternatives are possible with selected techniques described herein, the second end piece (e.g., cap) 46 is typically a closed end piece or cap, extending completely across the media 26 at the second end 42, closing that end 42 of the media 26 and the filter interior 26i. That is, end piece 46, for the example depicted, is a closed end piece, i.e. an end piece having no aperture therethrough in communication with the open filter interior 26i.

First end piece or cap 45 on the other hand, is an open end piece. That is, it surrounds and defines a central aperture 50 in communication with the media, in the example via open filter interior 26i. In typical use, aperture 50 is an air flow exit aperture from the media, for example open filter interior 26i, for filtered air. In alternate applications with a reverse direction of gas flow during filtering, aperture 50 can be an inlet aperture. In general, it is a gas flow aperture.

For the example depicted, first end piece 45 extends completely across all media 26 of the cartridge 25, from an outer perimeter 26x to an inner perimeter 26o. The first end piece 45 typically has only one, central, aperture 50 therethrough.

Again, when the access cover 4 is removed from the housing body section 3, access to interior 2i is provided for either installation or removal of the cartridge 25. The filter cartridge 25, then, needs to be adequately removably sealed to the housing 2 to protect against flow of unfiltered air into the exit tube 15. To provide for this, the cartridge 25 is provided with a first (or housing) seal arrangement 55.

An exemplary interaction between a housing seal or first seal arrangement 55 and a housing 2 is described in U.S. Pat. No. 8,864,866, the entire disclosure of which is incorporated herein by reference.

Figure 3:
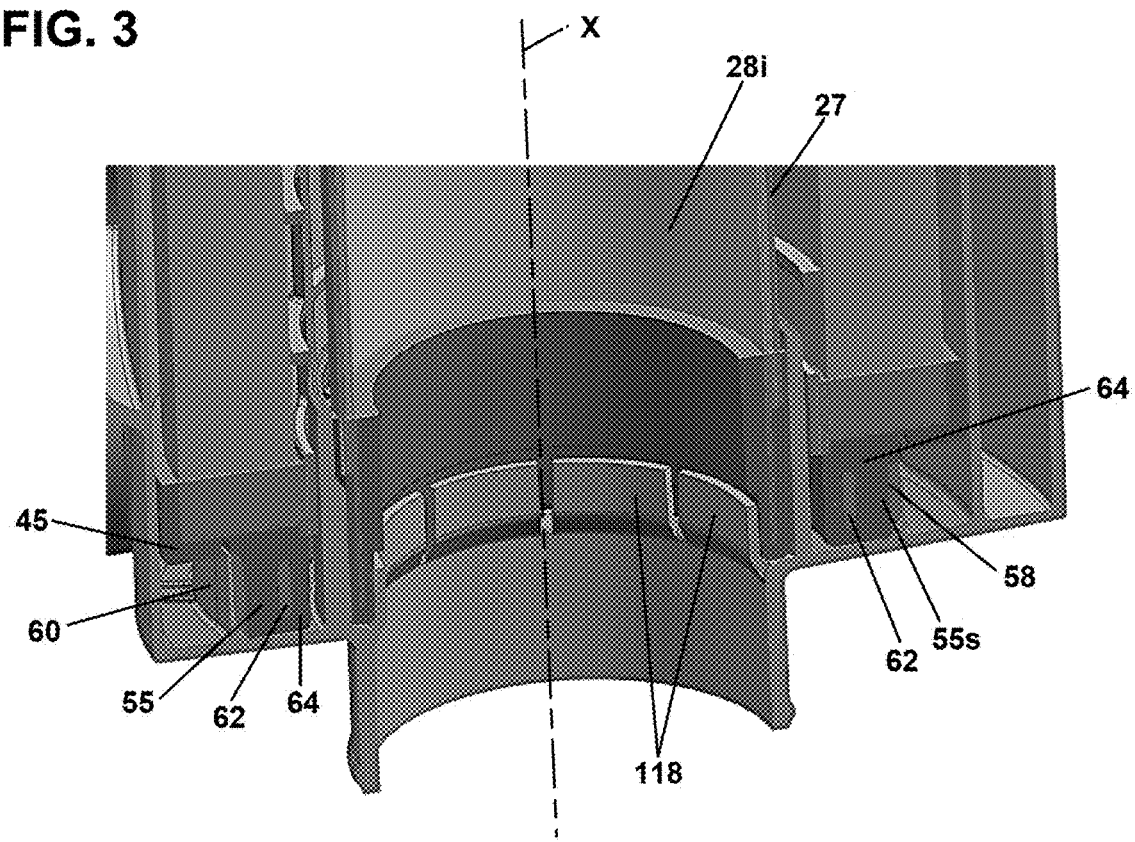
FIG. 3 is an enlarged perspective, sectional view of a portion of the air cleaner assembly of FIG. 1.
Figure 4:
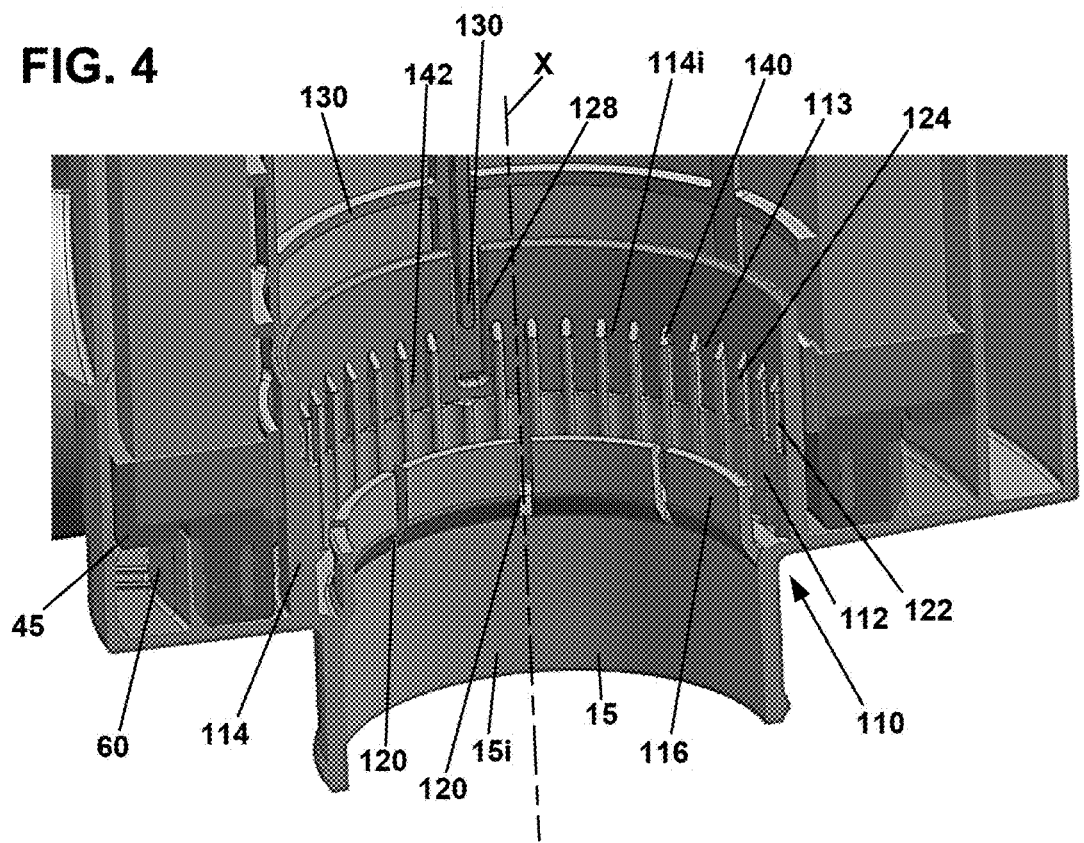
FIG. 4 is an enlarged perspective, sectional view of a portion of the air cleaner of FIG. 1 wherein the filter cartridge is removed.

With respect to the first housing seal or first seal arrangement 55, and other features of first end piece (e.g., 45), attention is directed to FIGS. 3 and 4. The first seal arrangement 55 can be seen as defining a radially directed seal or seal surface 55s directed to engage a portion of air cleaner assembly 1 referred to as the first cartridge seal surface 58, for releasable sealing. As shown, the first seal arrangement 55 forms an outwardly directed radial seal with the first cartridge seal surface 58 when the first filter cartridge 25 is installed in the filter assembly 1.

Still referring to FIG. 3, it will be understood that the surface 55s, of first seal arrangement 55, that forms a seal with structure 58 is generally a radially directed surface. Hence, the first seal arrangement 55 can be referred to as a radially directed seal. By "radially" in this context, it is meant that the seal or seal surface (and the compression of the seal surface during sealing) is directed generally toward or away from (i.e. around or about) central axis X. The particular surface 55s in the example depicted is radially outwardly directed relative to the central axis X, so the seal arrangement 55 can be characterized as "radially outwardly directed." It is noted however, that a radially inwardly directed seal can be used with some principles in accord with the present disclosure.

It should be appreciated that characterizing the seal or seal surface as radially outwardly directed or radially inwardly directed includes situations where the forces acting on the seal may not be exactly in line through the central axis X. That is, because of the shape or curvature of the seal surface around or about the central axis X, the forces compressing the seal at any particular point along the seal surface may resolve in a direction directed toward one side or the other of the central axis X. In general, the seal surface is either on the inside of the seal member (inwardly directed and generally facing toward the central axis X) or on the outside of the seal member (outwardly directed and generally facing away the central axis X). The direction of the force on the seal member is apparent in the following discussion. This is in contrast to an axial seal where the force on the seal member is applied in a direction that is generally parallel to the central axis X and the seal surface is generally perpendicular to the central axis X.

It is noted that in the example depicted, the housing seal arrangement 55 comprises a portion of end piece (e.g., cap) 45. In more general terms, the housing seal arrangement is mounted on a filter cartridge and is configured to releasably seal to a housing, whether that particular housing seal arrangement comprises a portion of an end piece or not.

The preferred and advantageous housing seal arrangements described herein are generally "non-clamp" or "clampless" housing seal arrangements. By this it is meant that they are established as the cartridge is inserted into the housing, without the need for tightening a clamp or connector of some type around the housing seal arrangement.

Specific features of the example first seal arrangement 55 depicted are described in greater detail below.

In general, for the particular arrangement depicted in FIG. 3, the surface 58 which the seal arrangement 55 removably engages to form the first seal arrangement 55, comprises a seal flange 60 directed axially inwardly of housing 2 toward the access cover 4, FIG. 2.

Attention is now directed to FIGS. 2-4 in which the cartridge 25 is depicted with portions shown in cross-section to depict internal detail. Attention is specifically directed to the first end piece (e.g., cap) 45. In the typical preferred arrangement, end piece (e.g., cap) 45 comprises a seal support 62 so that the molded seal member 64 is compressed between the seal support 62 and the first cartridge seal surface 58. Preferably, sealing pressure for seal arrangement 55 at surface 55s is managed by providing a radially compressible material and preferably (and optionally) having embedded therein a relatively rigid, radial support arrangement (e.g., seal support 62) within end piece (e.g., cap) 45.

In some embodiments, the support arrangement that provides support for the seal arrangement 55 is a "preform" embedded within the end piece (e.g., cap) molding 45. By "preform" in this context, it is meant that with the support arrangement or structure, i.e. a preformed or preform component used in the assembly of cartridge 25. Typically, the preform component is molded from plastic, although alternatives are possible. Typically, the preform component is secured to structure that extends toward the second end piece (e.g., cap) 45, although alternatives are possible. The "preform" can be formed and the seal arrangement 55 can be applied to the preform by molding or other technique.

The seal support 62 is typically embedded within seal material that forms the first seal 55 at a location such that compression of the surface 55s radially towards central axis X will be backed up by the support 62 in a manner so that the amount of radial compression of end piece (e.g., cap) material in a region between surface 55s and the support 62 will have a minimum compression of at least 5%, typically at least 15%, preferably at least about 25%, and will typically have a maximum compression of less than about 75%. Typically, to accomplish this, the seal support 62 is positioned or spaced from the surface 55s, maximally, a distance of not greater than 25 mm, usually not greater than 15 mm and typically the amount of spacing is within the range of about 3-15 mm. The amount of spacing in this context is meant to refer to the maximum spacing, i.e. to refer to a distance between the seal support 62 and the portion of surface 55s which, when surface 55s is undistorted by compression, is radially furthest from the seal support 62. This type of arrangement where there is a seal support 62 and a seal arrangement 55 can be referred to as a supported seal.

Now referring to the filter cartridge 27 depicted in FIGS. 2, 3, and 5-9, the filter cartridge 27 can be referred to as a second filter element. In some embodiments, during the servicing of the filter assembly 1, wherein the first filter cartridge 25 is removed and replaced with a new or refurbished filter cartridge, the second filter element 27 prevents dust or debris from entering into the outlet tube 15. Furthermore, in the event of a malfunction in the first filter cartridge 25, the second filter cartridge 27 is available to prevent dust or debris from entering the outlet tube 15. However, as discussed above, the described features should not be interpreted as being limited to only a first or second filter cartridge.

The second filter cartridge 27 includes a first end 80, a second end 82, and filtration media 28 extending between the first end 80 and the second end 82. In the exemplary second filter cartridge 27 depicted, the first end 80 includes a first end piece (e.g., cap) 84 and the second end 82 includes a second end piece (e.g., cap) 86. The second filter cartridge 27 can be provided, if desired, without a second end piece 86. That is, the second filter cartridge 27 can be provided so that the media extends over the second end 82. In addition, the second filter cartridge 27 can be provided with a support structure 90 (e.g., a liner, such as a screen) extending from the first end 80 to the second 82 to help support the filtration media 28 while allowing gas (air) to pass therethrough. The filtration media 28 can be embedded in the first and second end pieces 84 and 86. In addition, the support structure 90 for the filtration media 28 can be embedded in the first and second end pieces 84 and 86.

The second filter cartridge 27 can be constructed so that the filtration media 28 is configured surrounding an open filter interior 28i. For example, the media 28 can be provided as pleated media or non-pleated media. The media 28 can be configured in a cylindrical pattern as shown, if desired, although alternatives are possible. For example, the media 28 can be somewhat conical in extension between the opposite ends 80, 82. In addition, the media can be configured with non-circular inner and/or outer perimeters. For example, the media can be configured having an oval, circular, or other cross-sectional configuration.

The second end piece (e.g., cap) 86 can be provided as a closed end piece, extending completely across the media 28 at the second end 82, closing the second end 82 of the filtration media 28 of the filter interior 28i. An exemplary top view of the second end cap 86 is shown, for example, in FIG. 8. The second end cap 86 can include projections 86p that help provide axial compression between the second filter cartridge 27 and the first filter cartridge 25.

The second end piece (e.g., cap) 86 can be characterized as a closed end piece or cap, i.e. an end cap having no aperture therethrough in communication with the open filter interior 28i. In various alternative configurations, the second end 82 can be provided without an end cap. In one variation of the second filter element 27 without a second end cap 86, the filtration media 28 extends over and encloses the second end 82. That is, the filtration media 28 can form the closure at the second end 82 thereby preventing unfiltered air from entering into the open filter interior 28i. In an alternative, the second end 82 can be provided with a seal arrangement that mounts onto a second filter element support structure wherein the support structure includes a closed end corresponding to the second end 82 of the second filter cartridge 27. A remaining portion of the support structure would be open to flow of gas (air) therethrough. However, the closed end of the support structure would, in combination with the seal at the second end of the second filter cartridge 27 prevent unfiltered air from entering into the open filter 28i. Such an arrangement is disclosed in WO 2008/045326 and WO 2009/014986 which are incorporated herein by reference.

Figure 6:
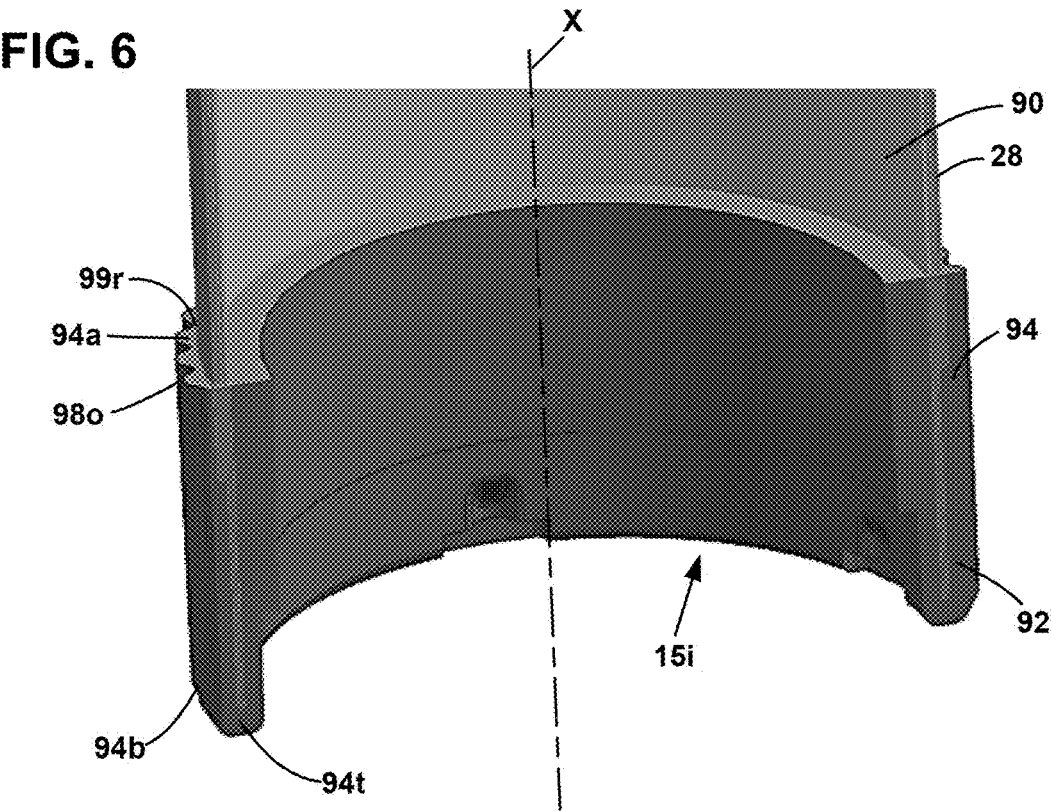
FIG. 6 is a perspective, sectional view of a portion of the filter cartridge of FIG. 5.

The first end piece (e.g., cap) 84 can include a support 92 and a second seal member 94. The support 92 can be provided as part of the support structure 90, or the support 92 can be provided as a separate component such as a plastic preform. As shown in FIG. 6, the support 92 can be part of the support structure 90. That is, the support structure 90 extends into the second seal member 94 a sufficient amount to help support the second seal member 94 when provided in a sealing relationship with the housing 2. The combination of the support structure 90 (and/or support 92) and the second seal member 94 can form the first end cap 84. The support 92 helps support the second seal member 94 when it engages the housing second filter cartridge seal surface 112 of second filter cartridge seal area 110. The second seal member 94 can be referred to as a housing seal arrangement for the second filter cartridge 27. In general, the second seal member 94 can be molded onto the support 92 and provides an outwardly directed sealing surface 96. When molded, the second seal member 94 can be provided having an outer section 94o on the outside of the support 92 and having an inner section 94i on the inside of the support 92.

The second seal member 94 can include a portion 94t extending over a tip of the support 92. In addition, the second seal member 94 can include a plurality of radially outwardly projecting and axially extending sections 98 and/or (e.g., alternating with) radially inwardly projecting and axially extending sections 99. In the embodiment shown in FIG. 6A, the plurality of radially outwardly projecting and axially extending sections 98 alternating with radially inwardly projecting and axially extending sections 99 are located on the outer section 94o (outside the support 92) in the second seal member 94. As shown in alternative embodiments, the second seal member can be provided with a plurality of radially inwardly projecting and axially extending sections and/or (e.g., alternating with) radially outwardly projecting and axially extending sections located on the inner section (such as inner section 94i inside the support 92) of the second seal member 94. The configuration of a plurality of radially outwardly projecting and axially extending sections 98 and/or (e.g., alternating with) radially inwardly projecting and axially extending sections 99 (whether located in the outer section 94o or the inner section 94i) can be referred to as "a wavy wall seal member surface" 95. In some embodiments, the wavy wall seal member surface shape is formed in the seal member prior to introducing the filter element into a housing of, for example, an air cleaner. In other embodiments, the seal member assumes the wavy wall seal member surface shape when inserted into a housing of, for example, an air cleaner as a result of the interaction between the seal member and the seal surface of the housing.

The wavy wall seal member surface 95 can be provided as an outwardly facing radial seal or as an inwardly facing radial seal. In the embodiment shown in FIGS. 5 and 6A, the wavy wall seal member surface 95 is depicted as an outwardly facing radial seal. FIGS. 6B and 6C also show an embodiment of an outwardly directed wavy wall seal member surface 95 with a plurality of radially outwardly projecting and axially extending sections 98 alternating with radially inwardly projecting and axially extending sections 99. In FIGS. 6B and 6C, "outwardly" and "inwardly" can be referenced with respect to reference line r. The embodiment depicted in FIGS. 6D and 6E incudes an inwardly directed wavy wall seal member surface 95' with a plurality of radially outwardly projecting and axially extending sections 98' alternating with radially inwardly projecting and axially extending sections 99'. In FIGS. 6D and 6E, "outwardly" and "inwardly" can be referenced with respect to reference line r. In embodiments having first and second filter cartridges, the first filter cartridge wavy wall surface can be axially coincident with the second filter cartridge wavy wall surface.

Figure 6A:
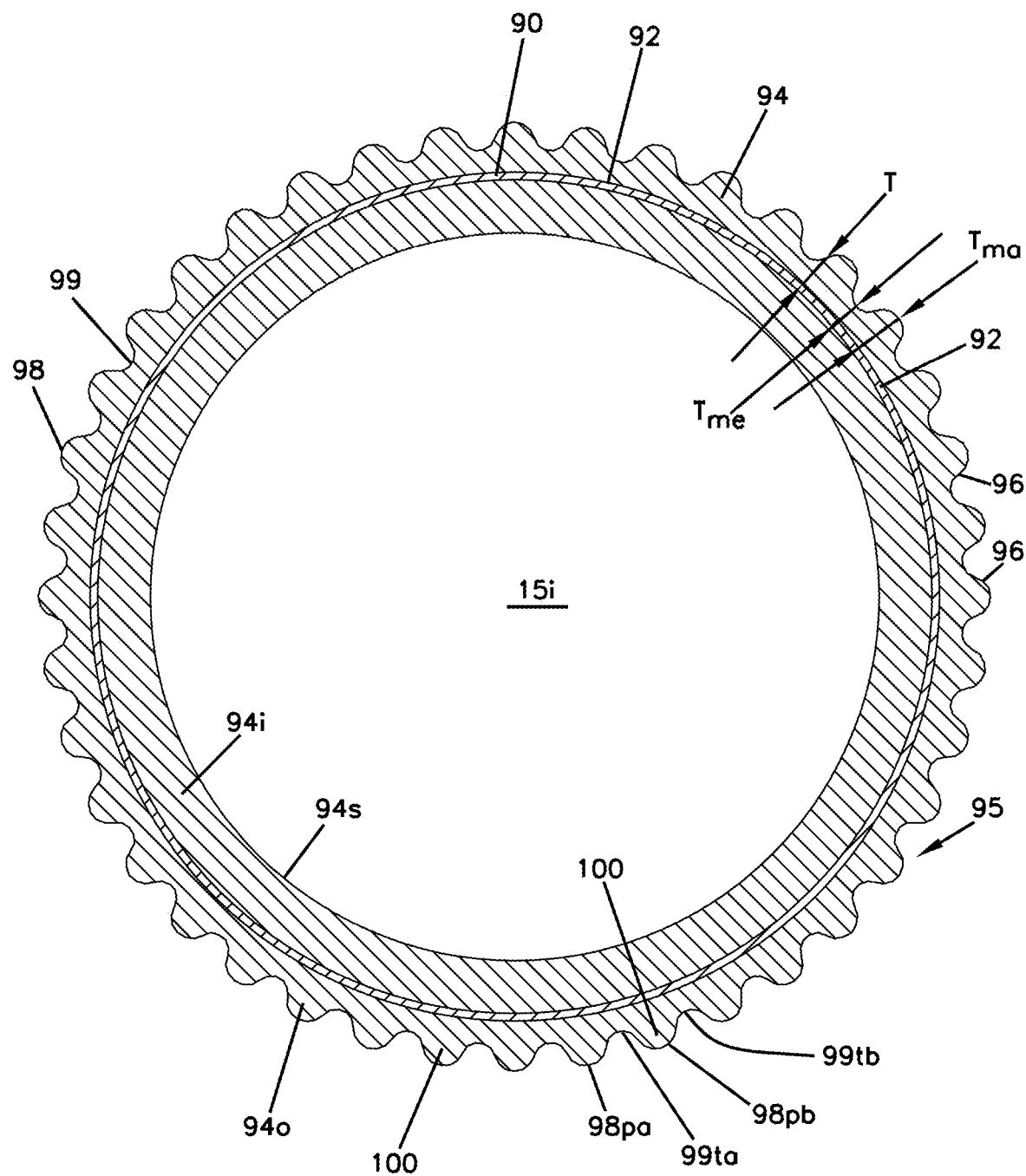
FIG. 6A is a sectional view of the filter cartridge of FIG. 5

In the embodiment of FIG. 6A, the second seal member 94 extends in a perimeter around a central open volume 15i. The central open volume 15i can be in communication with the open filter interior 28i. In the embodiment shown, during operation of the filter assembly 1 when the second filter cartridge 27 is installed, air passes through the filtration media 28 into the open filter interior 28i, and then passes through the central open volume 15i and into the outlet tube 15. In other embodiments, the flow direction could be reversed.

The "wavy wall seal member surface" is characterized as having the outwardly projecting and inwardly projecting sections as extending axially. Because these sections extend axially, it is possible to move the seal members axially (in the direction along the central axis X) into and out of the housing seal surface to thereby create the radial seal. In addition, because the outwardly projecting and inwardly projecting sections extend axially, the filter element resists rotation about the central axis X when installed (e.g., when a radial seal is created). The seal surface is configured to interact with a complementary "wavy wall seal housing surface" having outwardly projecting and inwardly projecting sections that extend axially. An exemplary wavy wall seal housing surface is depicted as sealing surface 112 in FIG. 4.

As shown in FIG. 6A, in some embodiments the wavy wall seal member surface 95 can be provided as part of a seal member that is supported by a non-wavy wall support 92. However, in some embodiments, the seal member does not include a support (e.g., such as in embodiments where the seal member extends beyond an axial end of the media and/or support structure and does not include a separate component such as a plastic preform). The non-wavy wall support can be used to support the wavy wall seal member surface when the wavy wall seal member surface is provided as an outwardly directed radial seal and when provided as an inwardly directed radial seal. In some embodiments, the shape of the wall support is different than the shape of the seal member surface. In such embodiments, a thickness T of the seal between the seal surface and the wall support can vary around the perimeter (e.g., in a radial direction), either continuously or intermittently. In certain embodiments, the thickness T of the seal between the seal surface and the wall support vary around at least a portion of the perimeter in a regularly repeating pattern. In some embodiments, a ratio of a maximum thickness $T_{me}$ to a minimum thickness $T_{me}$ is greater than 1.1, such as greater than about 1.2 (e.g., greater than about 1.3). In certain embodiments, $T_{me}$ is at least about 1 mm, such as at least about 2 mm (e.g., at least about 4 mm).

In the embodiment shown in FIG. 6A, the wall support 92 is generally cylindrical with a constant radius. Other embodiments may have different shapes such as oval or racetrack (curved ends separated by straight sides). In general, the support can be provided as non-undulating, and can have a shape that does not include an inflection point. In certain embodiments, when curved, the wall support can have a curvature at least 1.5 times larger, at least 2 times larger, or at least an order of magnitude larger than the wavy wall seal member surface.

Figure 5:
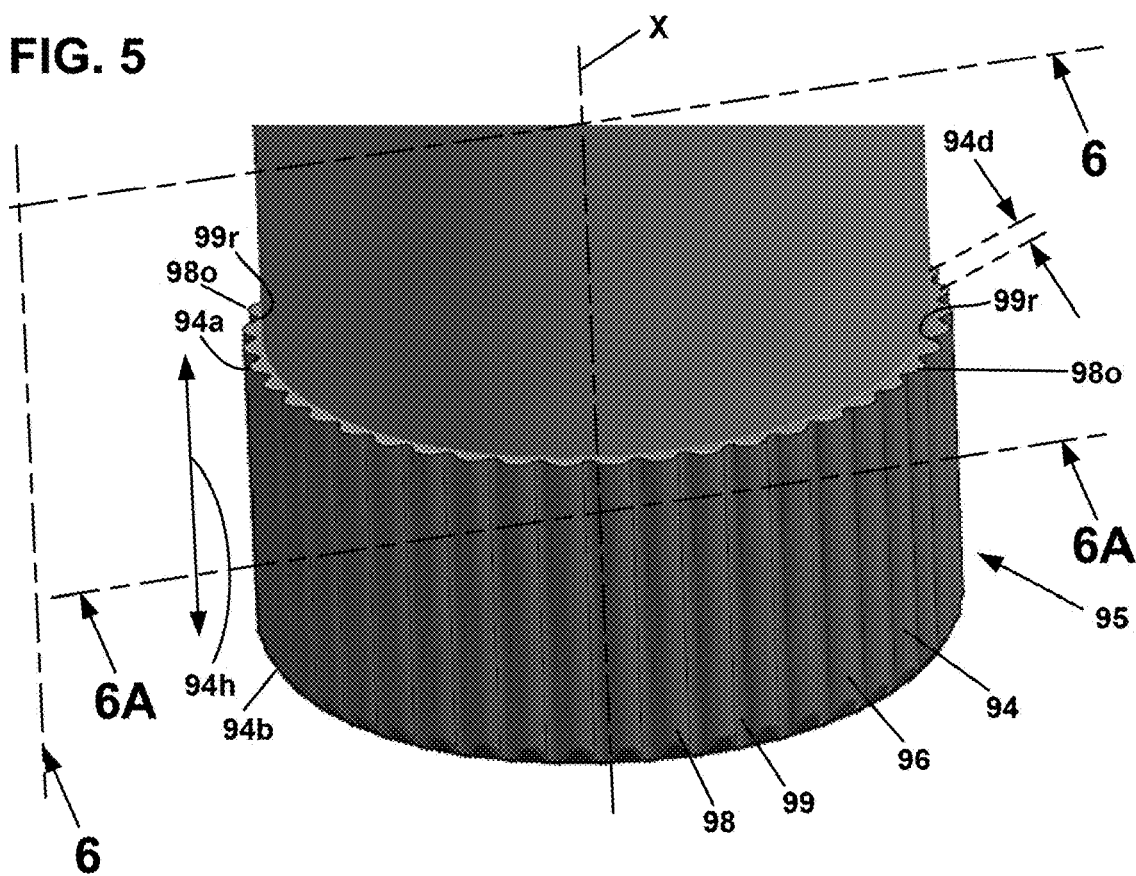
FIG. 5 is a perspective view of a portion view of a portion of a filter cartridge for use in the air cleaner of FIG. 1.
Figure 6B:
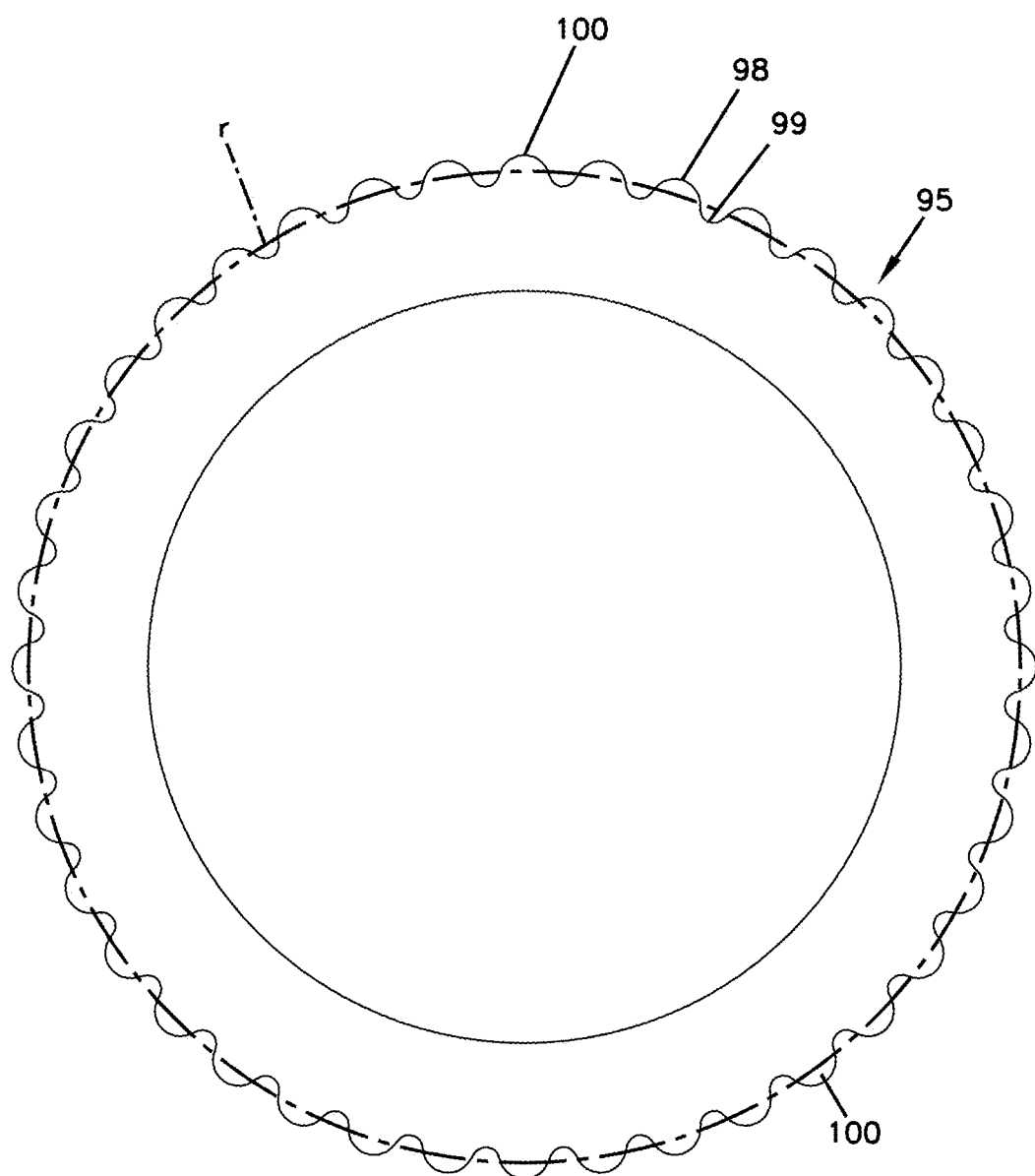
FIG. 6B is an end view of an outwardly directed seal surface.
Figure 6C:
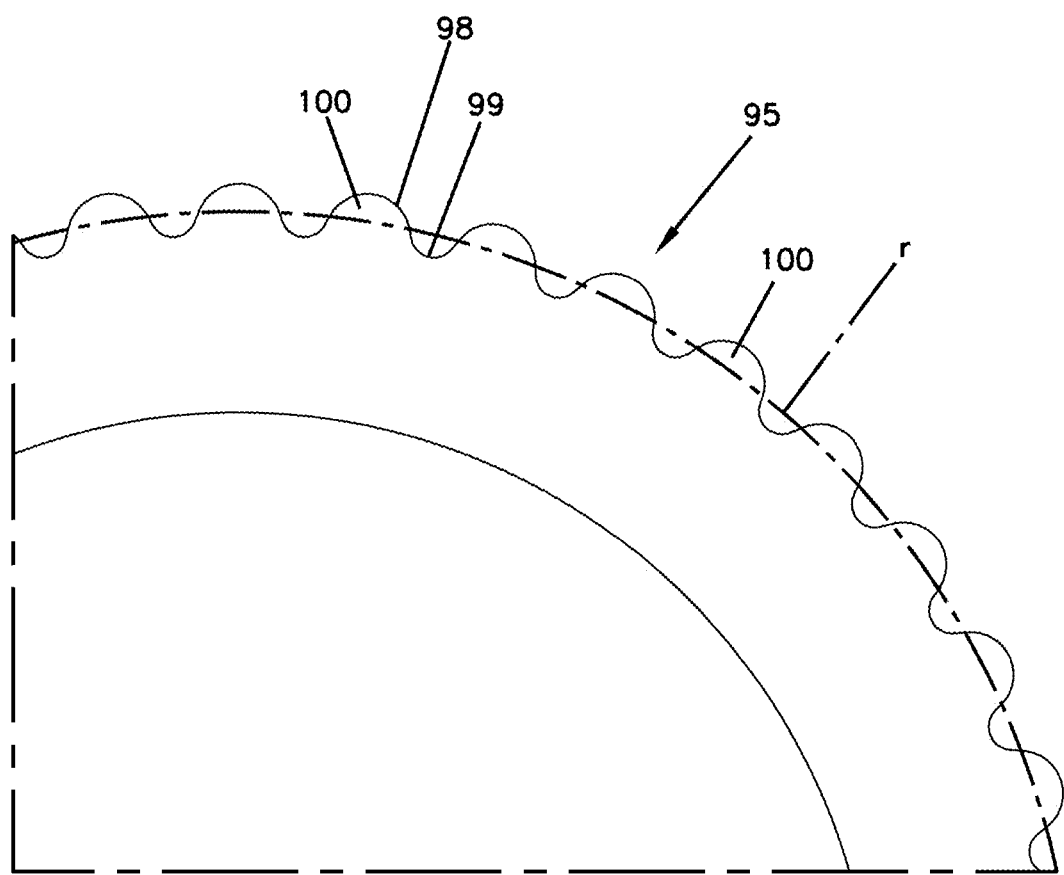
FIG. 6C depicts a close-up view of a portion of FIG. 6B.
Figure 6D:
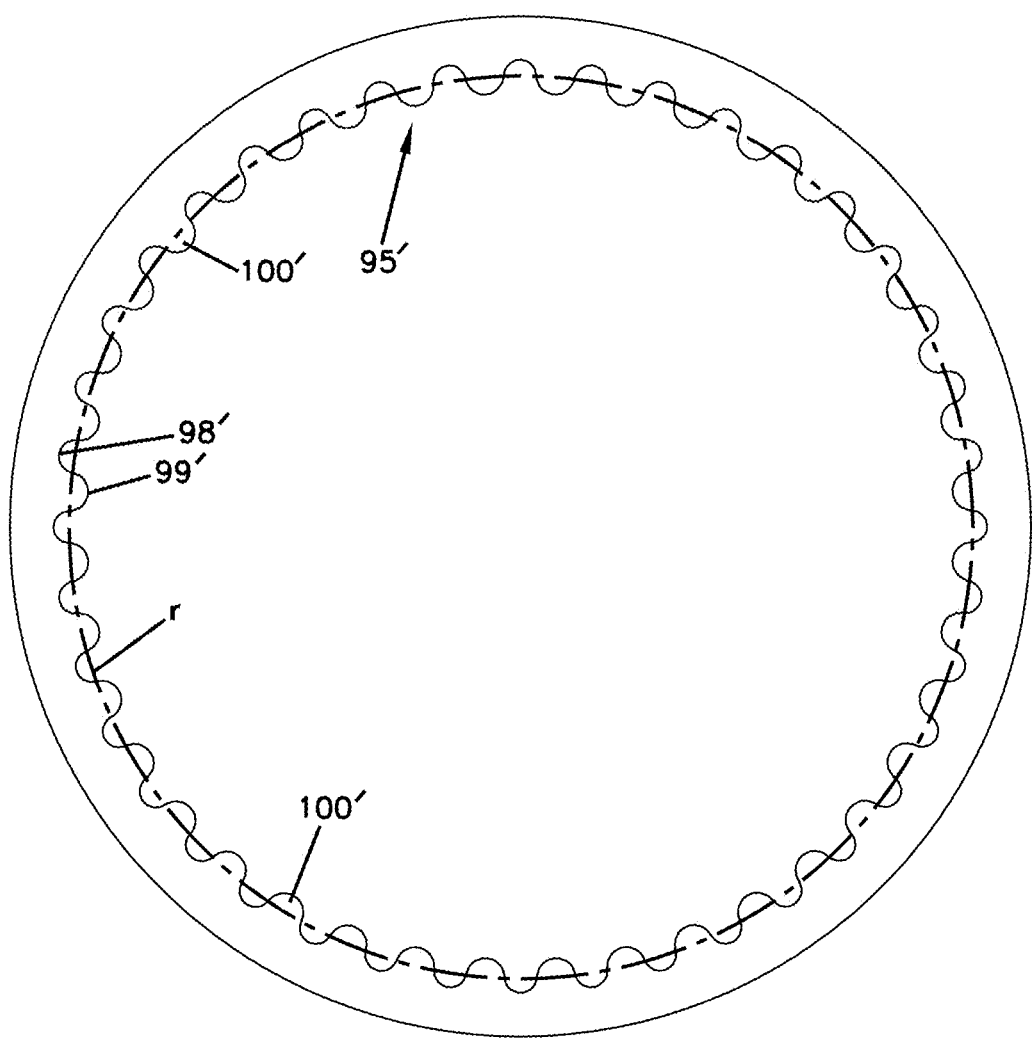
FIG. 6D is an end view of an inwardly directed seal surface.
Figure 6E:
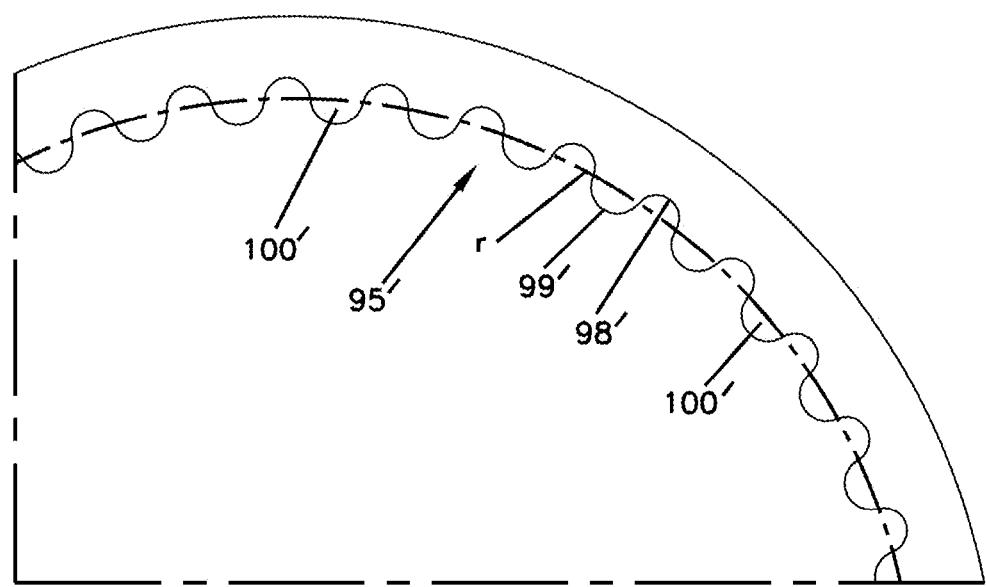
FIG. 6E depicts a close-up view of a portion of FIG. 6D.
Figure 7:
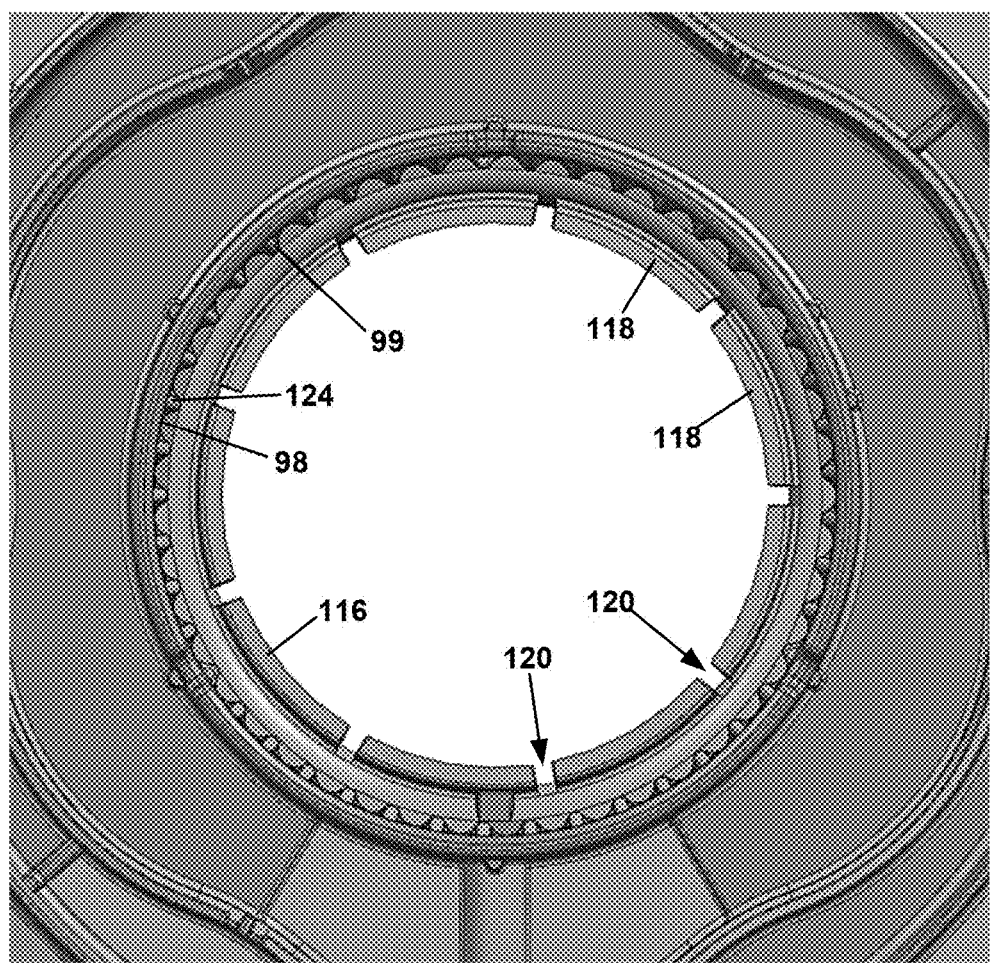
FIG. 7 is a plan view of the outlet tube of the housing of the air cleaner of FIG. 1.
Figure 8:
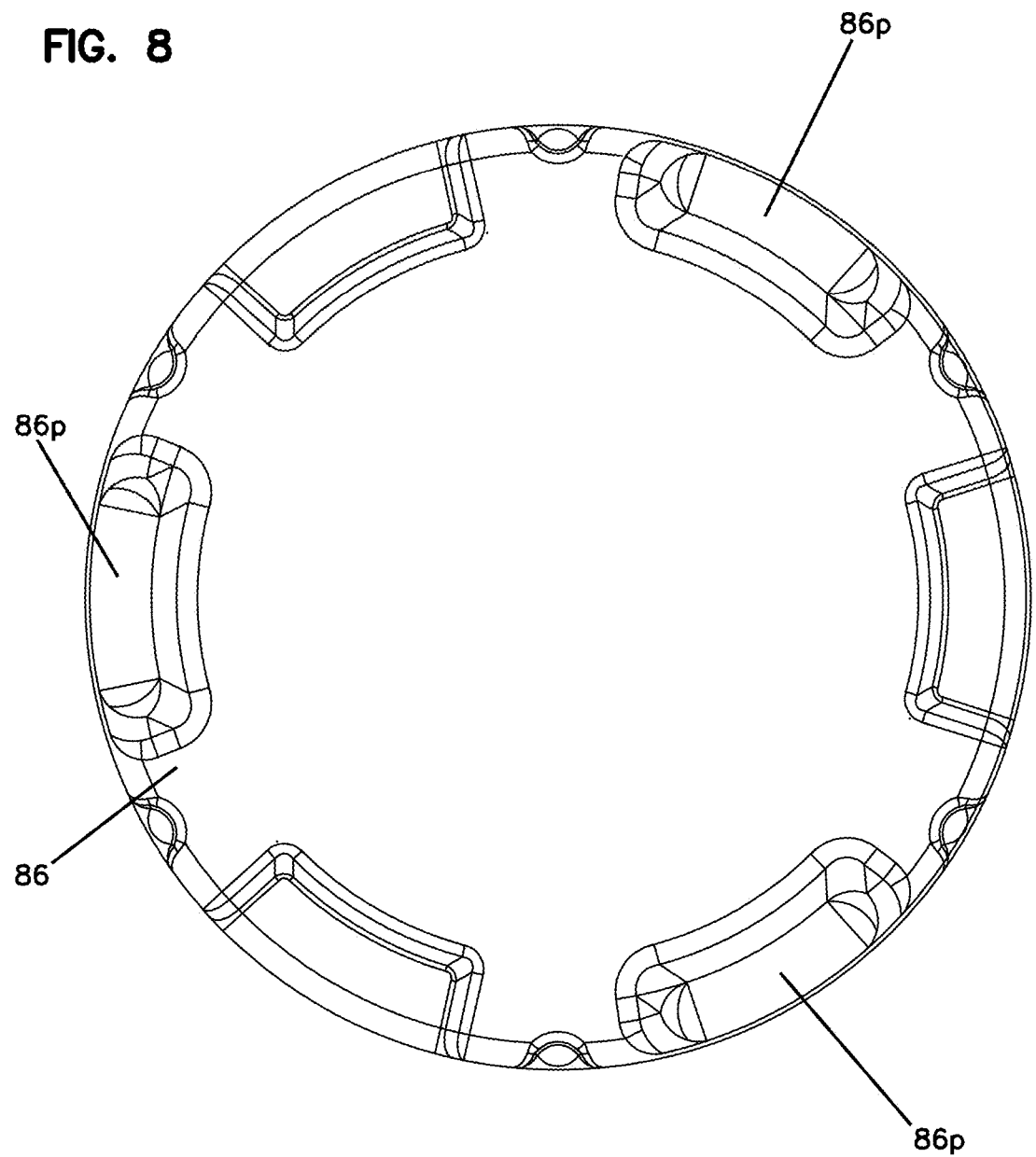
FIG. 8 is a plan view of a closed end piece of the filter cartridge of the air cleaner of FIG. 2.
Figure 9:
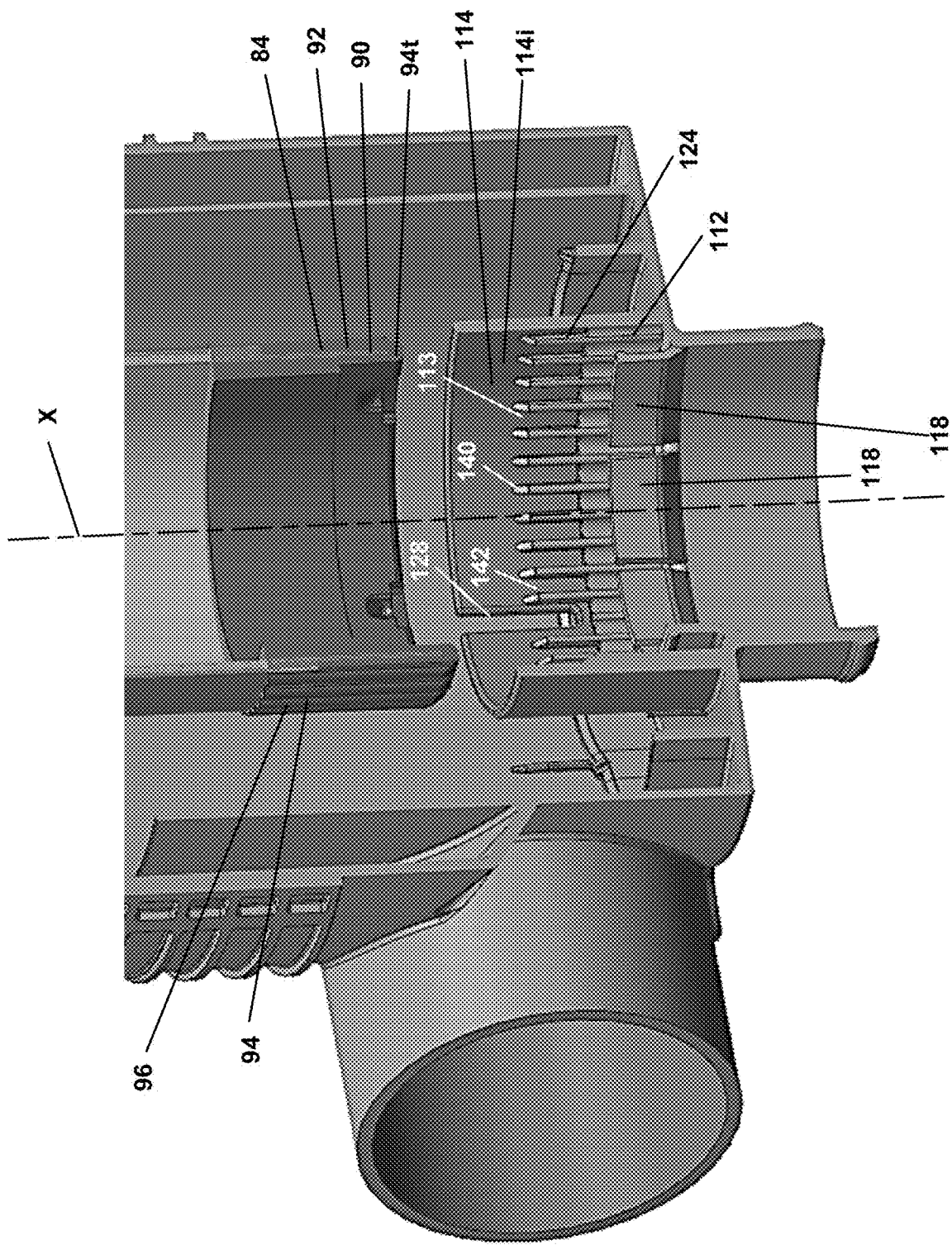
FIG. 9 is perspective, sectional and partial assembly view of the air cleaner assembly of FIG. 1 showing the filter cartridge prior to engagement with the air cleaner housing outlet tube.

Referring to FIG. 5, the second seal member 94 can be characterized as having an axial distance or height 94h from a second end 94b to a first end 94a that is sufficient to provide a seal with the second filter cartridge sealing surface 112. In general, the height 94h can be at least 4 times the depth 94d, which can be determined as the distance from the deepest recess 99r of the radially inwardly projecting and axially extending sections 99 to the outer most portion 98o of the radially outwardly projecting and axially extending sections 98. However, in alternate embodiments, the ratio may be less than about 4. In certain embodiments, the ratio is at least 6, at least 8, and can be at least 10. In the embodiment shown, the height of the seal member is generally constant. In other embodiments, the height of the seal member varies.

The second seal member 94 located at the first end 80 of the second filter cartridge 27 is provided so that it fits within the filter assembly 1 at the second filter cartridge seal area 110. The second filter cartridge sealing area 110 includes a second filter cartridge seal surface 112 located on an interior of the axially extending second filter cartridge baffle 114. The interior of the axially extending second filter cartridge baffle 114 additionally includes a second filter cartridge indexing surface 113. The indexing surface 113 helps orient the second filter cartridge 27 so that an accurate and releasable seal is created between the second seal member 94 at the location of the second filter cartridge sealing surface 112.

Additionally provided in the embodiment shown is an axially extending support baffle 116. In the embodiment shown in FIG. 4, the second seal member 94 of the second filter cartridge 27 fits between the second filter cartridge baffle 114 and the support baffle 116. It should be appreciated that the support baffle 116 is optional, and the filter assembly 1 can be provided without the support baffle 116. The support baffle 116 helps provide support for the second seal member 94 while also providing clearance for air flow within the central open volume 15i. In order to help provide back up support for the second seal member 94, the support baffle 116 can be divided into a plurality of support flanges 118. The support flanges 118 can deflect when the second filter cartridge 27 is located within the second filter cartridge seal area 110, and provide continuous support in a radial direction of the second seal member 94 against the second filter cartridge sealing surface 112. The gaps 120 between the support baffle flanges 118 allow the plurality of support flanges 118 to deflect thereby assisting with insertion and removal of the second filter cartridge 27.

The second filter cartridge baffle 114 shown includes a plurality of axially extending ribs 124 that extend along the interior surface 114i of the second filter cartridge baffle 114 in the second filter cartridge sealing area 110 in an axial direction. The axially extending ribs 124 form at least part of the indexing surface 113 and at least part of the seal surface 112. The indexing surface 113 helps align the second seal member 94 in the proper location so the seal can be created between the second seal member 94 and the seal surface 112 when the second filter cartridge 27 is fully introduced into the second filter cartridge seal area 110. The ribs 124 help align the second filter cartridge 27 in the proper orientation when introduced along the indexing surface 113.

In some embodiments, an indexing surface gap 128 can be provided to help ensure that the second filter cartridge 27 is inserted fully so that a seal is created between the second seal member 94 and the seal surface 112. That is, a sufficient seal may not be created if the second seal member 94 only engages the indexing surface 113 of the second filter cartridge baffle 114. In order to obtain a proper seal, the second filter cartridge 27 should be seated so that the second seal member 94 engages the second filter cartridge sealing surface 112 to create a seal therebetween. Furthermore, the gap 128 allows for indexing of the support structure 130 of the first filter cartridge 25. As a result of indexing the first filter cartridge 25, the first seal arrangement 55 can more accurately align with the first cartridge seal surface 58 to provide correct insertion of the first filter cartridge 25 into a sealed arrangement with the housing 2.

As described, the second seal member 94 can include a plurality of the outwardly projecting and axially extending sections 98 and/or (e.g., alternating with) a plurality of inwardly projecting and axially extending sections 99. The resulting seal surface can be referred to as a wavy wall seal member surface 95. An embodiment of a wavy wall seal member surface 95 is shown in, for example, FIG. 5 as an outwardly directed wavy wall seal member surface 95, but the seal surface can be provided as an inwardly directed wavy wall seal member surface when the seal surface is a radially inwardly directed seal surface.

In general, a perimeter of the outwardly directed seal surface 94s of the seal member 94 includes at least about 20 radially outwardly projecting and axially extending sections 98 alternating with corresponding inwardly projecting and axially extending sections 99. The number can vary, but is generally expected that a perimeter will include about 20 to about 400 (e.g., about 20 to about 120, such as about 20 to about 40) radially outwardly projecting and axially extending sections 98 alternating with inwardly projecting and axially extending sections 99. In some embodiments, the radially directed seal surface comprises less than about 13 of the radially outwardly projecting and axially extending portions alternating with less than about 13 of the radially inwardly projecting and axially extending portions along a distance of one inch along the seal support extending around the filter cartridge axis.

Referring to FIG. 6A, the wavy wall seal member surface 95 can be characterized in terms of "pitch" which is the distance from peak to adjacent peak of the lobes 100. In the case of the wavy wall seal member surface 95, the pitch can be defined as the distance from the peak 98pa to the adjacent peak 98pb. Alternatively, the pitch can be defined as the distance between the adjacent troughs 99ta and 99tb. As described previously, the wavy wall seal member surface 95 can include a plurality of radially outwardly projecting and axially extending sections 98 alternating with a plurality of radially inwardly projecting and axially extending sections 99. The radially outwardly projecting and axially extending sections 98 form peaks 98p and the radially inwardly projecting and axially extending sections 99 form troughs 99t. The wavy wall seal member surface 95 can be characterized as having a pitch that allows the service provider (installer of the filter element) with a degree of indexing that allows the service provider to correctly index the filter element within the housing without having to re-grip the filter element. That is, the filter element can be correctly indexed by only rotating the filter element within a range of about plus or minus 15 degrees (preferably plus or minus 10 degrees) from zero or neutral.

In order to achieve this, the pitch can be at least 1 mm/lobe, such as at least 2 mm/lobe, or, in some embodiments, at least 4 mm/lobe. In certain embodiments, the pitch can be less than 25 mm/lobe, such as less than 12 mm/lobe, less than 10 mm/lobe, or less than 8 mm/lobe. In some embodiments, the pitch of the lobes is relatively constant. In other embodiments, the pitch varies between lobes or groups of lobes.

The lobes can include any useful shape. In the embodiment shown in FIG. 6A, the lobes 100 are generally curved when viewed along an axis of element insertion. In other embodiments, the lobes can include one or more straight portions, points, or curves, and combinations thereof. The lobes 100' in FIGS. 6D and 6E are also depicted as curved but can be provided with one or more straight portions, points, or curves, and combinations thereof.

Referring again to FIGS. 4 and 9, it can be seen that the second filter cartridge baffle 114 includes an indexing surface 113 and a seal surface 112. As previously explained, the second seal member 94 provides a radially directed seal with the seal surface 112. The indexing surface 113 helps align the plurality of outwardly directed and axially extending sections 98 and alternating inwardly projecting and axially extending sections 99 so that the second seal member 94 is correctly oriented so that further axial insertion of the second filter cartridge 27 results in a seal being created between the second seal member 94 and the seal surface 112. Advantageously, the indexing surface 113 helps to create the radial seal between the second seal member 94 and the seal surface 112 by avoiding twisting or pinching of the second seal member 94 which can be detrimental to the longevity of the second seal member 94. Furthermore, pinching and twisting of the second seal member may create opportunities for air to bypass the second seal member 94.

The exemplary indexing surface 113 is shown including a chamfer 140 on the plurality of axially extending ribs 124 at the lead in portion of the ribs 124. The exemplary indexing surface 113 is also shown including a surface 142 that is located further away from the axis X compared with the seal surface 112. Accordingly, as the filter cartridge 27 is inserted axially into the housing 2, the chamfers 140 help align the second seal member 94 so that the radially outwardly projecting an axially extending sections 98 become oriented between adjacent axially extending ribs 124, and the radially inwardly projecting and axially extending sections 99 become oriented opposite the axially extending ribs 124. Because, in the embodiment shown, the surface 142 is recessed slightly relative to the seal surface 112 located between axially extending ribs 124, there may not be sufficient compression of the second seal member 94 to create a seal when the second seal member 94 is located along the indexing surface 113. It should be understood that the indexing surface 113 helps orient the filter cartridge 27 so that after the second filter cartridge 27 is correctly oriented, further axially insertion of the filter cartridge 27 results in a seal being created between the outwardly directed sealing surface 96 and the sealing surface 112. In the embodiment shown in FIG. 4, the indexing surface 113 is located proximally to the sealing surface 112 in a direction of second filter cartridge 27 travel. Also as shown in the embodiment of FIG. 4, the sealing surface 112 can extend radially toward the axis X with respect to the indexing surface 113.

Although the second filter cartridge baffle 114 is shown having an indexing surface 113 and a sealing surface 112, the second filter cartridge 27 can be provided having the indexing surface and the seal surface. Furthermore, the second filter cartridge 27 is shown having a second seal member 94 with a generally consistent outwardly directed sealing surface 96. The second seal member 94 can be modified to include both a seal surface and an indexing surface. Furthermore, the second filter cartridge baffle 114 can be modified so that it includes a seal surface without also including an indexing surface.

Now referring to FIG. 6A, a sectional view of a portion of the combination of the second seal member 94 and the support 92 is shown. In this case, the support 92 includes the support structure 90 (e.g., a liner, such as a screen). As shown, the second seal member 94 includes an outer section 94o, and an inner section 94i. In the second seal member 94 shown, the inner section 94i can be provided having a generally constant thickness or distance extending away from the support 92 (or support structure 90) to the inner surface 94s. In contrast, the outer section 94o provides a non-constant thickness or distance between the support 92 (or support structure 90) and the outwardly directed seal surface 96 formed by the plurality of outwardly projecting and axially extending sections 98 and the alternating plurality of radially inwardly projecting and axially extending sections 99. In the embodiment shown, this non-constant thickness can be characterized as a continuously varying thickness when the surface 96 is continuous as shown in FIG. 6A.

As a result of the non-constant thickness between the seal support 92 and the outwardly directed seal surface 96, the second seal member 94 should be oriented or indexed so that it correctly corresponds to the housing seal surface having a similar shape in order to create a seal between the outwardly directed sealing surface 96 of the seal member 94 and the housing seal surface 112. It should be understood that this advantage of correctly orienting or indexing the seal member to correspond with the housing seal surface applies to the various alternative embodiments described herein where the seal member is provided on a first or second filter element and where the seal member is radially outwardly projecting or radially inwardly projecting.

Now referring to FIGS. 10-13, an alternative outlet tube is depicted at reference number 200. The outlet tube 200 can be utilized in a filter assembly such as the filter assembly 1 described in the context of FIGS. 1 and 2. The outlet tube 200 can be provided as a part that snap-fits or otherwise attaches to the housing body 3. In addition, the outlet tube 200 can be provided integral with the housing body 3. The outlet tube 200 can be provided as a replacement for the outlet tube 15 shown in FIGS. 1 and 2, and provides a first filter cartridge seal surface 202 and a second filter cartridge seal surface 204. By providing both the first filter cartridge seal surface 202 and the second filter cartridge seal surface 204, the outlet tube 200 renders the first cartridge seal surface 58, shown in FIG. 3, unnecessary. That is, the first cartridge seal surface 58 can be removed, and both the first filter cartridge and the second filter cartridge can be provided so that they seal to the outlet tube 200.

The outlet tube 200 includes a neck member 206 and a sealing member 208. In general, the neck member 206 is the portion that extends beyond the housing. Typically, cleaned or filtered air passes through the neck member 206 for downstream use such as in an internal combustion engine. The sealing member 208 extends axially into the filter assembly and provides the first filter cartridge seal surface 202 and the second filter cartridge seal surface 204 against which the first filter cartridge and the second filter cartridge can seal.

The first filter cartridge seal surface 202 and/or the second filter cartridge seal surface 204 can be characterized as being complementary to the seal members described herein, such as by having an undulatory or wavy wall 210. The undulatory or wavy wall 210 can also be referred to as a wavy wall housing seal surface. In general, the undulatory or wavy wall 210 refers to the peripherally non-uniform radial seal surface. The phrase "peripherally non-uniform" refers to the non-constant radial distance from the central axis X to the first filter cartridge seal surface 202 and/or to the second filter cartridge seal surface 204 along a periphery thereof about the central axis X. As illustrated, the wavy wall 210 has a continuous surface, but the continuous surface can be seen as a series of waves wherein the waves generally align along the central axis X in an axial direction. The wavy wall 210 includes the first filter cartridge seal surface 202 on one side and the second filter cartridge seal surface 204 on the opposite side. In order to provide the wavy wall 210 with a minimal thickness, the number of waves in the first filter cartridge seal surface 202 can equal to the number of waves provided in the second filter cartridge seal surface 204. If the number of waves on the two surfaces is different, then the thickness of the wavy wall 210 would have to be sufficient to accommodate the different numbers of waves on each side. It should be understood that the outlet tube 200 can be provided so that there is a different number of waves on the first filter cartridge seal surface 202 compared to the second filter cartridge seal surface 204.

Figure 10:
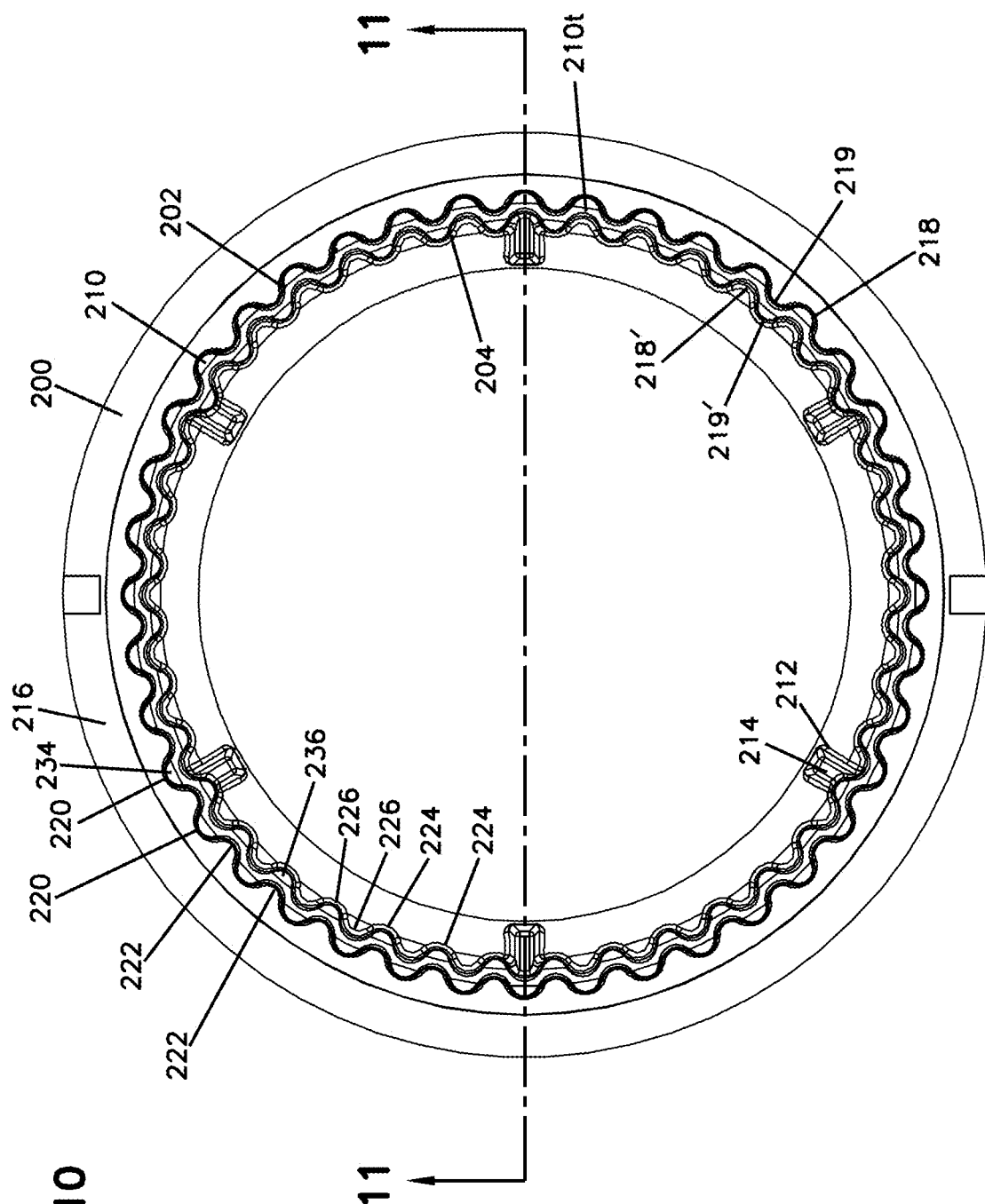
FIG. 10 is an end view of an alternative outlet tube for an air cleaner assembly generally in accordance with FIG. 1 and where the alternative outlet tube can be used with alternative filter cartridges.
Figure 12:
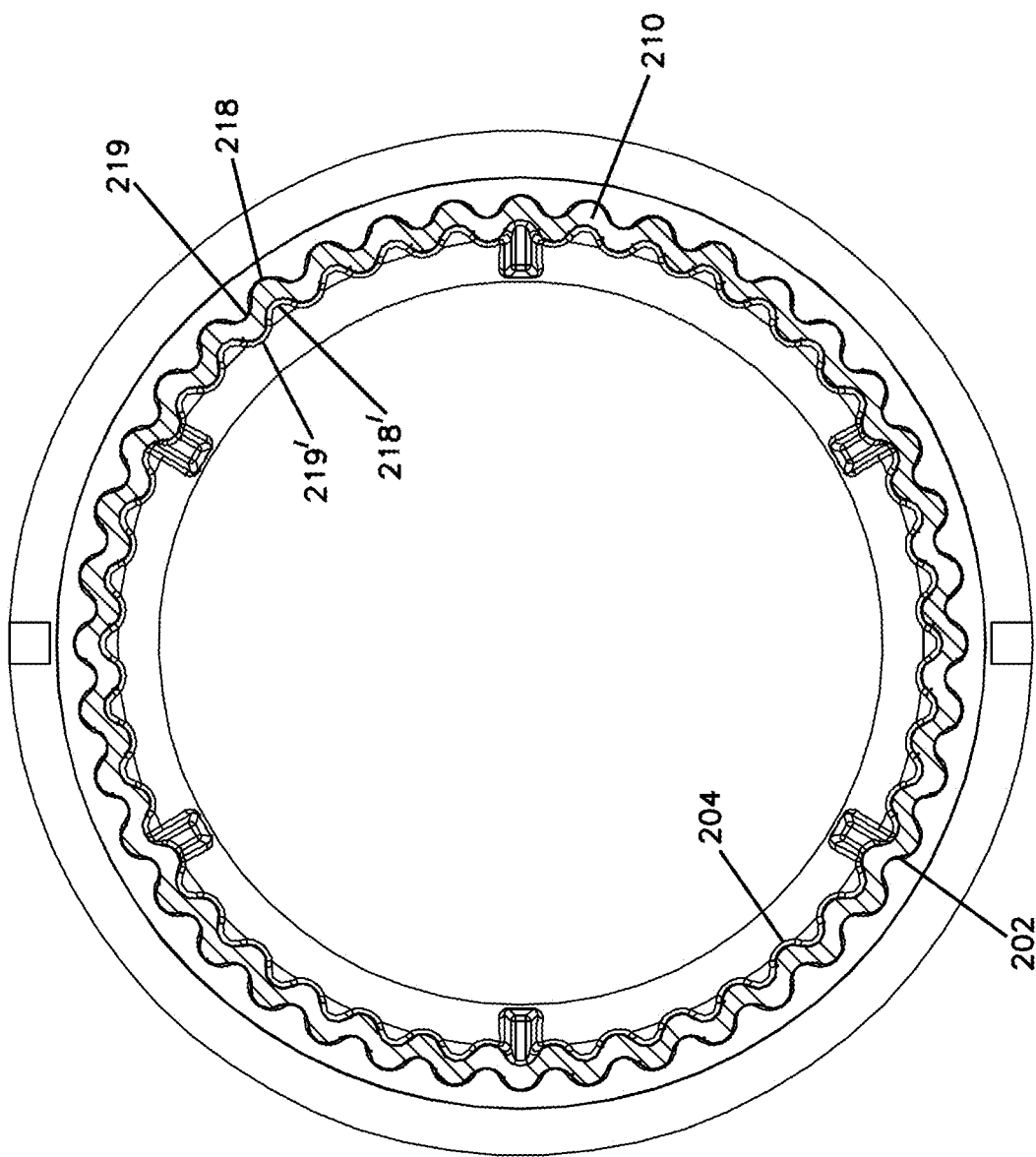
FIG. 12 is a sectional view of the alternative outlet tube of FIG. 11 taken along line 12-12.
Figure 13:
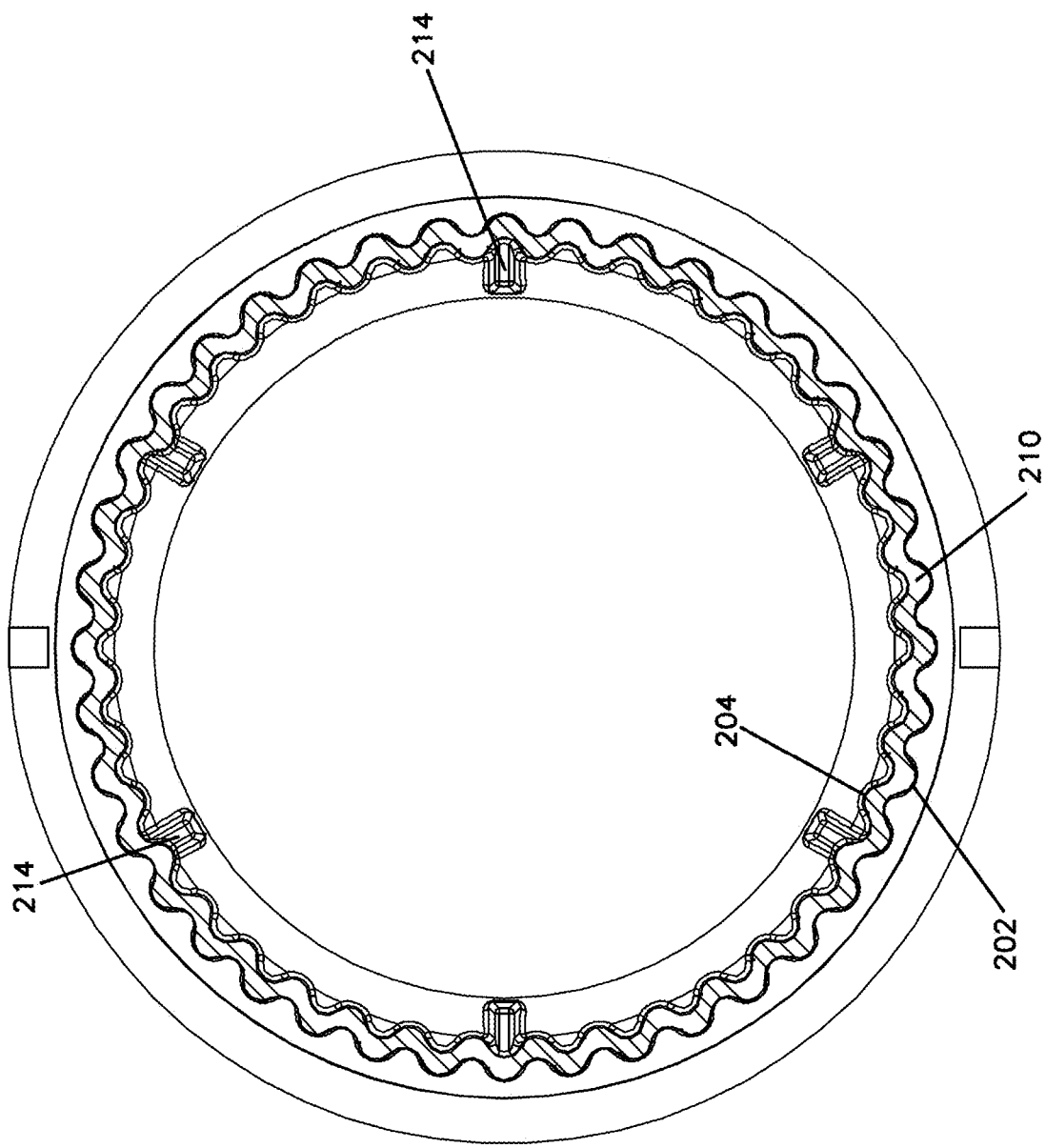
FIG. 13 is a sectional view of the alternative outlet tube of FIG. 11 taken along line 13-13.

Along the first filter cartridge seal surface 202 shown, the wavy wall 210 can be characterized as having radially outwardly projecting and axially extending portions 218 alternating with radially inwardly projecting and axially extending portions 219. Along the second filter cartridge seal surface 204 shown, the wavy wall can be characterized as having radially outwardly projecting and axially extending portions 218' alternating with radially inwardly projecting and axially extending portions 219'. In some embodiments, the wavy wall 210 has a thickness 210*t* that varies circumferentially. The wavy wall 210 can have a thickness 210*t* that varies axially. In general, the axial variation may result from the existence of a "draft" or taper in the wavy wall 210 in an axial direction. The difference in thickness peripherally may result because the wavy pattern along the second filter cartridge seal surface 204 need not be identical to the wavy pattern along the first filter cartridge seal surface 202. A difference in the wavy pattern of the second filter cartridge seal surface 204 and the first filter cartridge seal surface 202 is illustrated in FIGS. 10, 12, and 13. Because the first filter cartridge seal surface 202 is further way from the axis X compared to the second filter cartridge seal surface 204, the curvature forming the wavy pattern along the first filter cartridge seal surface 202 can be different from the wavy pattern along the second filter cartridge seal surface 204.

Because the series of waves along the wavy wall 210 extend generally axially, the first filter cartridge seal surface 202 and the second filter cartridge seal surface 204 can be considered as relatively continuous and axially uniform in the axial direction, but wavy or peripherally non-uniform in the peripheral or circumferential direction about the central axis X. As a result, a filter element constructed to engage the wavy wall 210 can slide into engagement by sliding in an axial direction. The peripherally non-uniform surface of the wavy wall 210 can help prevent rotation of the first filter element and/or second filter element in engagement with the wavy wall 210. It should be understood that the reference to "rotation," refers to the tendency of filter elements to rotate about the central axis X. Rotation can result from vibration of the air cleaner which is possible when the air cleaner is present on motor vehicles such as trucks. Furthermore, rotation can be detrimental to the seal. The wavy wall 210 can help reduce or eliminate filter element rotation about the central axis X. A prior art seal surface where the seal surface extends in a periphery at a constant radius relative to the central axis X can be referred to as "peripherally uniform" or "circumferentially uniform."

The first filter cartridge seal surface 202 and the second filter cartridge seal surface 204 of the wavy wall 210 can each be referred to as peripherally non-uniform because of the plurality of waves extending axially and located peripherally or circumferentially. In an axial direction, the first filter cartridge seal surface 202 and the second filter cartridge seal surface 204 can be considered relatively consistent. It should be understood, however, that in an axial direction, there may be taper. This taper may be a result of the manufacturing process when the outlet tube 200, for example, is prepared by injection molding. In such situations, it may be advantageous to provide a draft angle in the mold that results in a slight taper (typically, less than about 3 degrees). In any event, the taper can be advantageous to help allow the seal member on the first and second filter cartridges to engage the wavy wall 210 and slide axially there along until fully seated.

An advantage of the wavy wall 210 is the ability of the first filter cartridge and the second filter cartridge to resist rotation as result of vibration through the air cleaner assembly. In general, when the air cleaner assembly is provided on a motor vehicle, the engine of the motor vehicle has a tendency to create vibration that, in turn, can cause filter elements therein to move. Movement, such as rotation, of the filter element within the housing can be of concern because of the potential, as a result thereof, to wear the seal member and create leak paths for unfiltered air to bypass the filter cartridge. Accordingly, the wavy wall 210 of the outlet tube 200 helps resist filter element movement. When combined with an appropriate filter cartridge, having a seal member with a corresponding wavy wall seal surface, the filter cartridge can resist rotation without the need for additional structure to help secure the filter element in place. A filter cartridge with such a seal design, as discussed above, can be referred to as having a wavy wall seal member surface. The housing wall that engages the wavy wall seal member surface can be referred to as having a wavy wall housing seal surface.

Another advantage of the wavy wall 210 is that it permits the filter element designed to engage the wavy wall 210 to have more options available for rotational engagement compared, for example, with the configurations described in U.S. Pat. No. 8,864,866. For example, the filter element having a seal member constructed to engage the wavy wall 210 has many indexed configurations where it will engage the wavy wall 210 to provide a desired seal. This in turn makes servicing of the air cleaner more convenient for the service provider. It should be appreciated that this "indexing" applies when the seal member surface is formed, prior to insertion into the housing, having a shape that corresponds to the shape of the wavy wall 210. In other embodiments, the seal member surface forms into or mirrors the wavy wall 210 shape as a result of introducing the filter element into a sealing relationship with the wavy wall 210. In such a situation, indexing may not be applicable when the seal member surface does not exhibit, prior to introducing the filter element into a sealing relationship with the wavy wall, a shape corresponding to the wavy wall shape.

As discussed previously, the wavy wall seal surface 95 includes a plurality of lobes 100. The lobes 100 on the wavy wall seal surface 95 are provided to engage the wavy wall 210. In the case of the seal construction illustrated in FIG. 6A, the lobes 100 would engage the troughs 218' (the outwardly projecting and axially extending portions) along the second filter cartridge seal surface 204. Because of the generally small size of the lobes 100, it is convenient to rotate the filter element slightly clockwise or counter clockwise about the central axis X in order to find the correct orientation where the lobes 100 engage the troughs 218'. Accordingly, the service provider who is introducing an element into the air cleaner can turn the element within a range of hand rotation and find a catch where the seal member 96 engages the wavy wall 210. This type of indexing avoids the need for large rotational movements, or multiple movements, of the service provider's hand in order to line the filter element up correctly with the wavy wall 210. Furthermore, there is a tactile feedback effect where the service provider can feel that the filter element is in the correct air cleaner housing because of the ease by which it lines up and catches with the wavy wall 210. As a result, the service provider can feel confident that the filter element is the correct filter element for the air cleaner and is oriented correctly as a result of the seal member mating with the wavy wall 210.

For any given installation, there are two potential rotational directions for engagement after initial insertion of the element. The self-indexing features described herein facilitate movement in the direction requiring the lesser rotation. For that direction, the maximum rotation for indexing can be expressed in degrees by the following formula: 360 degrees/(number of lobes×2).

Figure 11:
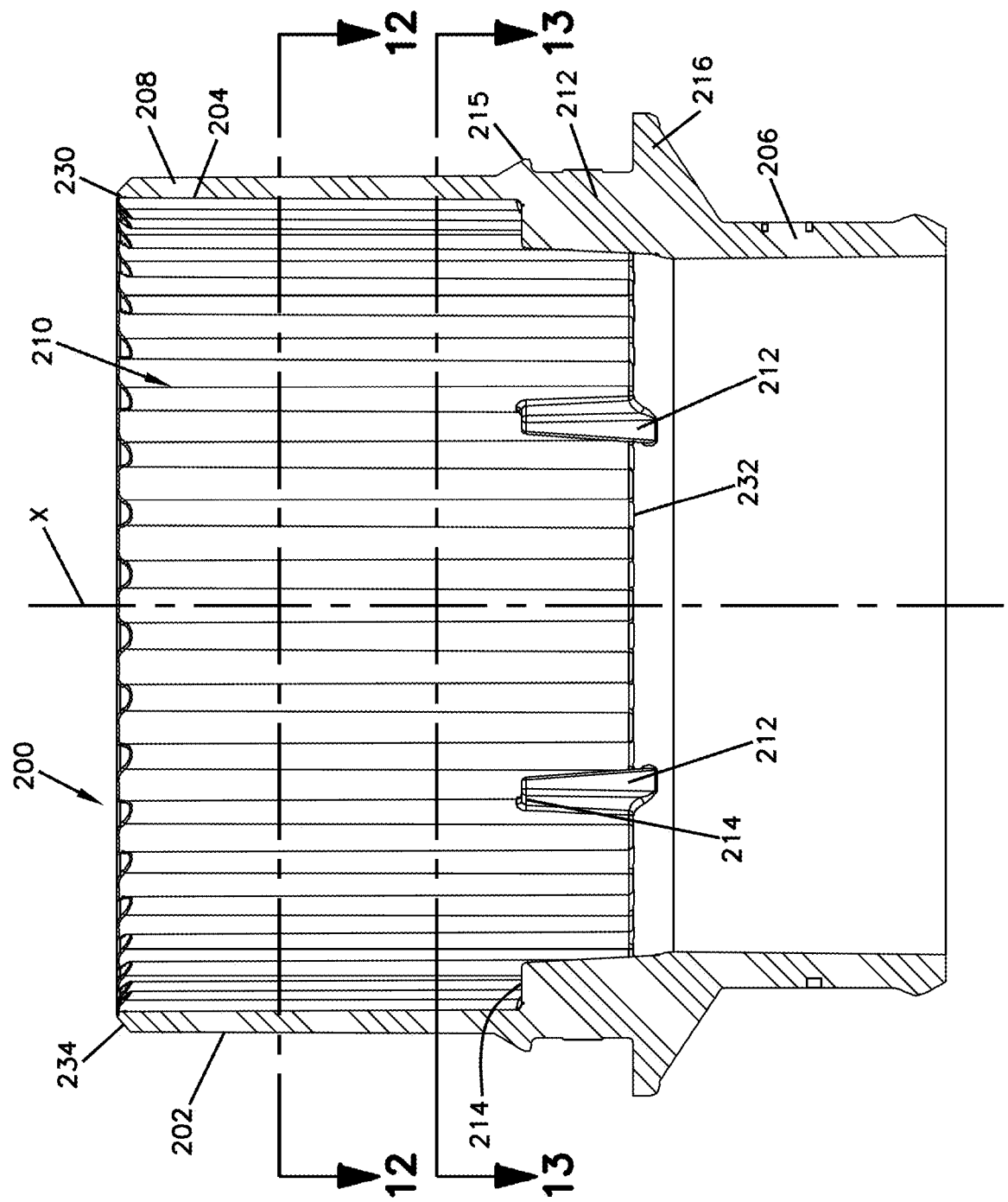
FIG. 11 is a sectional view of the alternative outlet tube of FIG. 10 taken along line 11-11.

In the embodiment shown in FIGS. 10-11, the outlet tube 200 includes stop members 212 each having a stop surface 214 that limits the extent to which a filter cartridge can be inserted along the second filter cartridge seal surface 204. The outlet tube 200 is shown as a snap-fit outlet tube that snaps onto the housing body. The wall of the housing can slide over the snap projection 215 and engage the outlet tube stop 216. As a result, the wall of the housing can be located between the snap projection 215 and the stop 216. Furthermore, the filter element constructed to engage the wavy wall 210 can slide into engagement along the first cartridge seal surface 202 and can be stopped by the wall of the housing.

The wavy wall 210 as shown includes the first filter cartridge seal surface 202 and the second filter cartridge seal surface 204. Each of the surfaces 202 and 204 of the shown wavy wall 210 can be characterized as having radially outwardly projecting and axially extending sections 218 and 218' alternating with radially inwardly projecting and axially extending sections 219 and 219'. The first filter cartridge seal surface 202 can be characterized as having a plurality of alternating peaks (or ridges) 220 and troughs (or grooves) 222. Similarly, the second filter cartridge seal surface 204 can be characterized as having a plurality of alternating peaks (or ridges) 224 and troughs (or grooves) 226. As shown, the plurality of peaks 220 and troughs 222 and the plurality of peaks 224 and troughs 226 extend generally continuously in the axial direction X from a first end 230 to a second end 232.

In some embodiments, the sealing surface 202 and/or the sealing surface 204 can change in size from the first end 230 towards the second end 232. For example, the sealing surface 202 can extend further away from the central axis X towards second end 232 compared to first end 230. As another example, the sealing surface 204 can extend closer to the central axis X towards the second end 232 compared to the first end 230. Such a change in size can help to increase pressure on a seal member that is being introduced from the first end 230 towards the second end 232 to help create a seal. The change in size can be discontinuous (e.g., stepped) or gradual (e.g., tapered). In some embodiments, the plurality of peaks 220 and troughs 222 and/or the plurality of peaks 224 and troughs 226 can be provided as generally stepped or tapered to have a different size at the first end 230 compared to the second end 232. Alternatively, the plurality of alternating peaks 220 and troughs 222 and/or the plurality of peaks 224 and troughs 226 can be provided as generally uniform from the first end 230 to the second end 232 although it should be appreciated that, because of manufacturing techniques, a draft angle may be present. In general, a draft angle refers to an angle provided in a structure to assist with demolding. Draft angles of about 0.5 degree to about 3 degrees can be used.

Based on the orientation depicted in FIG. 10, the peaks 220 and troughs 222 on the first filter cartridge seal surface 202 correspond to the outwardly projecting and axially extending portions 218 and the inwardly projecting and axially extending portions 219, respectively, and the peaks 224 and the troughs 226 on the second filter cartridge seal surface 204 correspond to the inwardly projecting and axially portions 219' and the outwardly projecting and axially extending portions 218', respectively. Thus, the lobes on a seal member engaging the first filter cartridge seal surface 202 fit in the troughs 222 between adjacent peaks 220. Similarly, the lobes on a seal member engaging the second filter cartridge seal surface 204 fit in the troughs 226 between adjacent peaks 224.

In the embodiments shown, the peaks 220 and 224 are provided with bevels 234 and 236. In general, the bevels 234 and 236 assist with the introduction and indexing of the filter cartridges along the wavy wall 210. When present, the bevels 234 and 236 can be provided extending at an angle of between about 10 degrees to about 80 degrees relative to the central axis X. In the exemplary embodiment shown in FIG. 11, the bevels 234 and 236 extend at angles of about 45 degrees relative to the central axis X. Although the lack of a bevel may be acceptable (e.g., where the surface extends at about 90 degrees to the axis X), there is a possibility that a non-beveled surface may be more likely catch the seal member of the first filter element and/or the second filter element and cause unnecessary wear on the seal member.

Several filter cartridge designs are disclosed having either a seal member with an inwardly directed radial seal member or an outwardly directed radial seal member with a wavy wall seal member surface consistent with the definition described previously. Furthermore, such seal members can be constructed to fit the wavy wall housing seal surfaces described previously or alternative wavy wall housing seal surfaces.

Now referring to FIGS. 14-17, a cartridge (e.g., secondary or safety) is shown at reference number 250. The filter cartridge 250 includes a first end piece (e.g., cap) 252, a second end piece (e.g., cap) 254, filter media 256 extending from the first end cap 252 to the second end cap 254, and a liner 258 supporting the filter media 256 and also extending from the first end cap 252 to the second end cap 254. The filter media 256 can be characterized as extending from a first end 256a to a second end 256b, and the liner 258 and be characterized as extending from a first end 258a to a second end 258b. In general, the filter media first end 256a and the liner first end 258a can be embedded in the first end cap 252, and the filter media second end 256b and the liner second end 258b can be embedded in the second end cap 254. The first end cap 252 can be characterized as an open end cap 260 because of the central aperture 262 that allows filtered air to flow from a central region 264 within the filter element 250, and through the outlet tube 200. The second end cap 254 can be characterized as a closed end cap 266 because it extends across the filter media second end 256b and closes off the filter media second end 256b. The filter element 250 can be provided without the second end cap 254 if the media is provided as continuous across the second end 256b.

The filter media 256 can be provided as any type of media, such as media commonly used in secondary filter elements. Exemplary media include pleated and non-pleated media (such as non-woven media) and multilayer laminate.

When the filter media 256 is embedded or potted in the first end piece (e.g., cap) 252 and/or the second end cap 254, the first end 256a can be provided extending to the location of the stand off 259 and the second end 256b can be provided extending to the location of the stand off 259. Similarly, the liner ends 258a and 258b can also extend to the stand off 259.

The first end piece (e.g., cap) 252 includes an outwardly directed surface 270. In the embodiment show, the outwardly directed surface 270 includes a lead in region 272, a transition region 274, and a seal region 276. The seal region 276 can be characterized as having a wavy wall seal member surface as previously defined.

Figure 14:
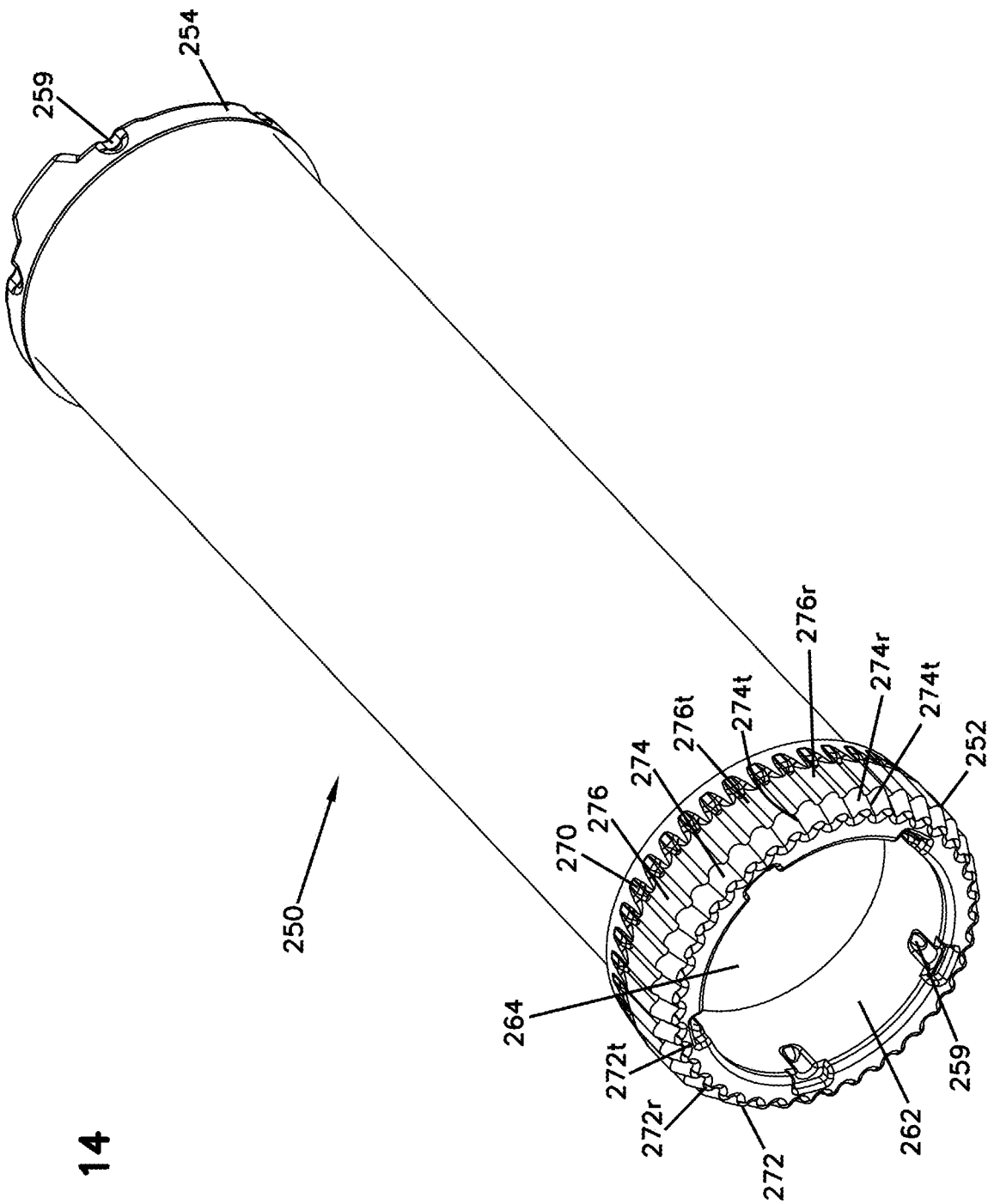
FIG. 14 is a perspective view of an alternatives filter cartridge constructed to engage the outlet tube of FIG. 10.
Figure 15:
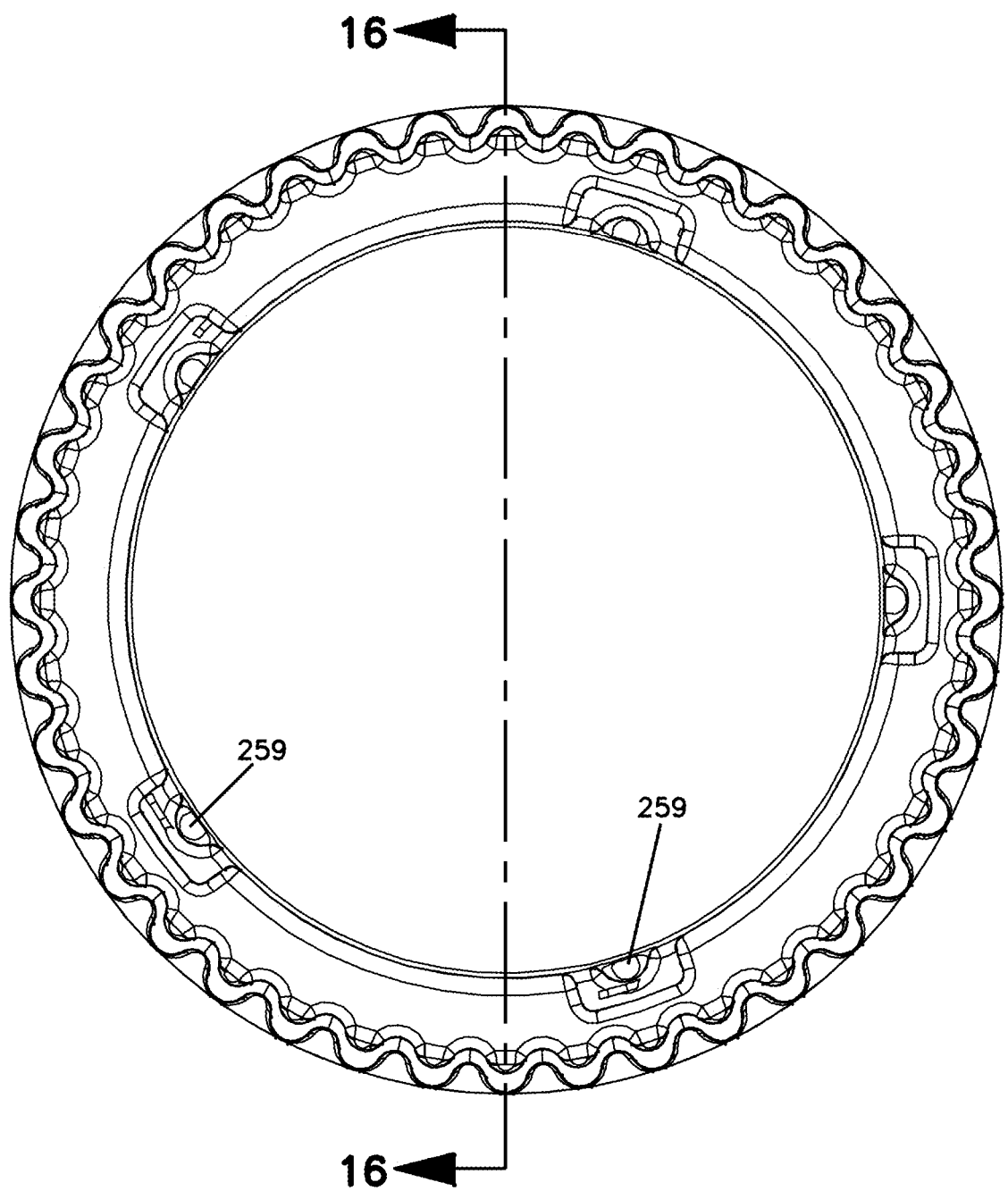
FIG. 15 is a bottom view of the end piece of the filter cartridge of FIG. 14.
Figure 16:
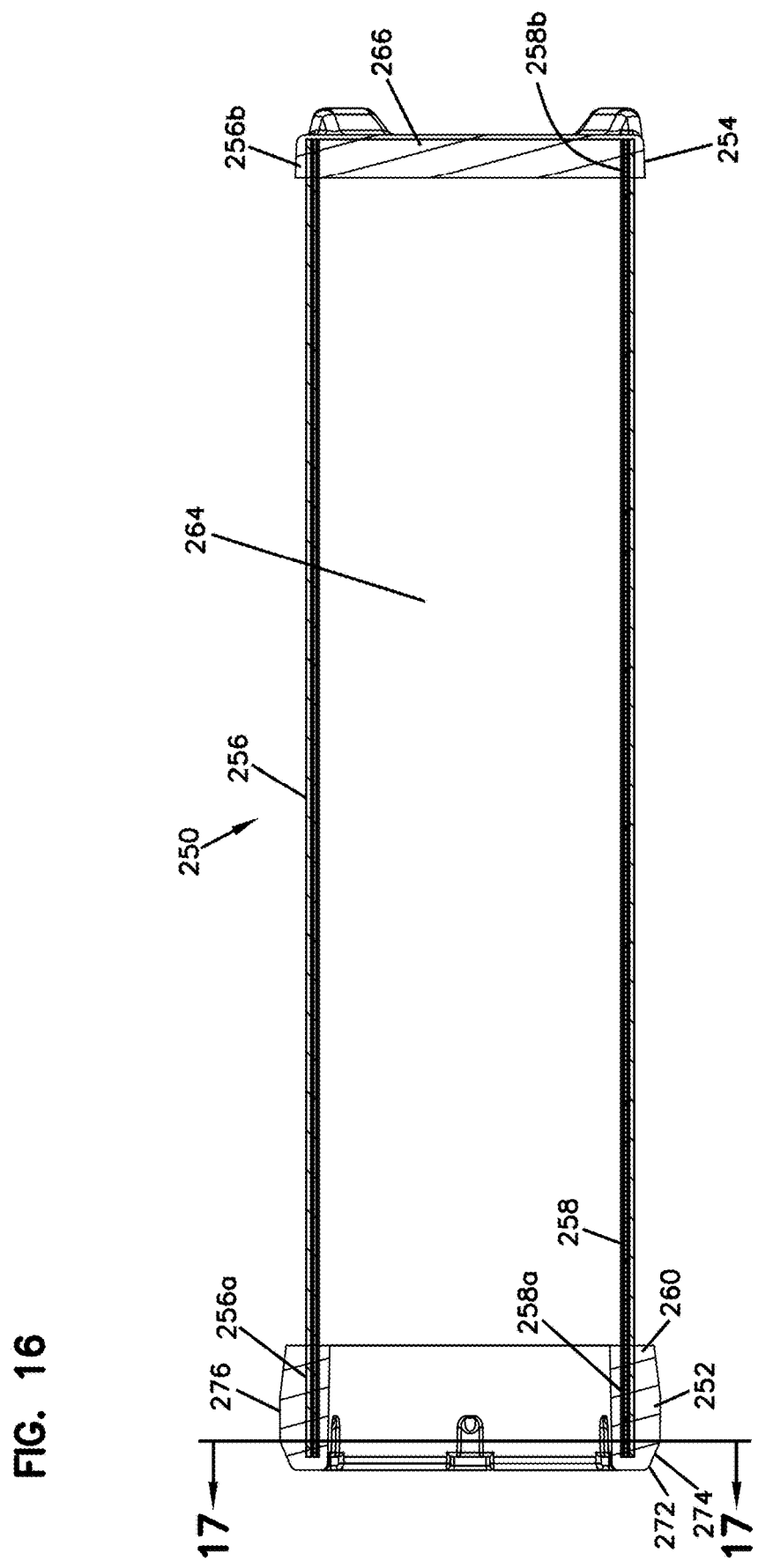
FIG. 16 is a sectional view of the filter cartridge of FIG. 15 taken along line 16-16.
Figure 17:
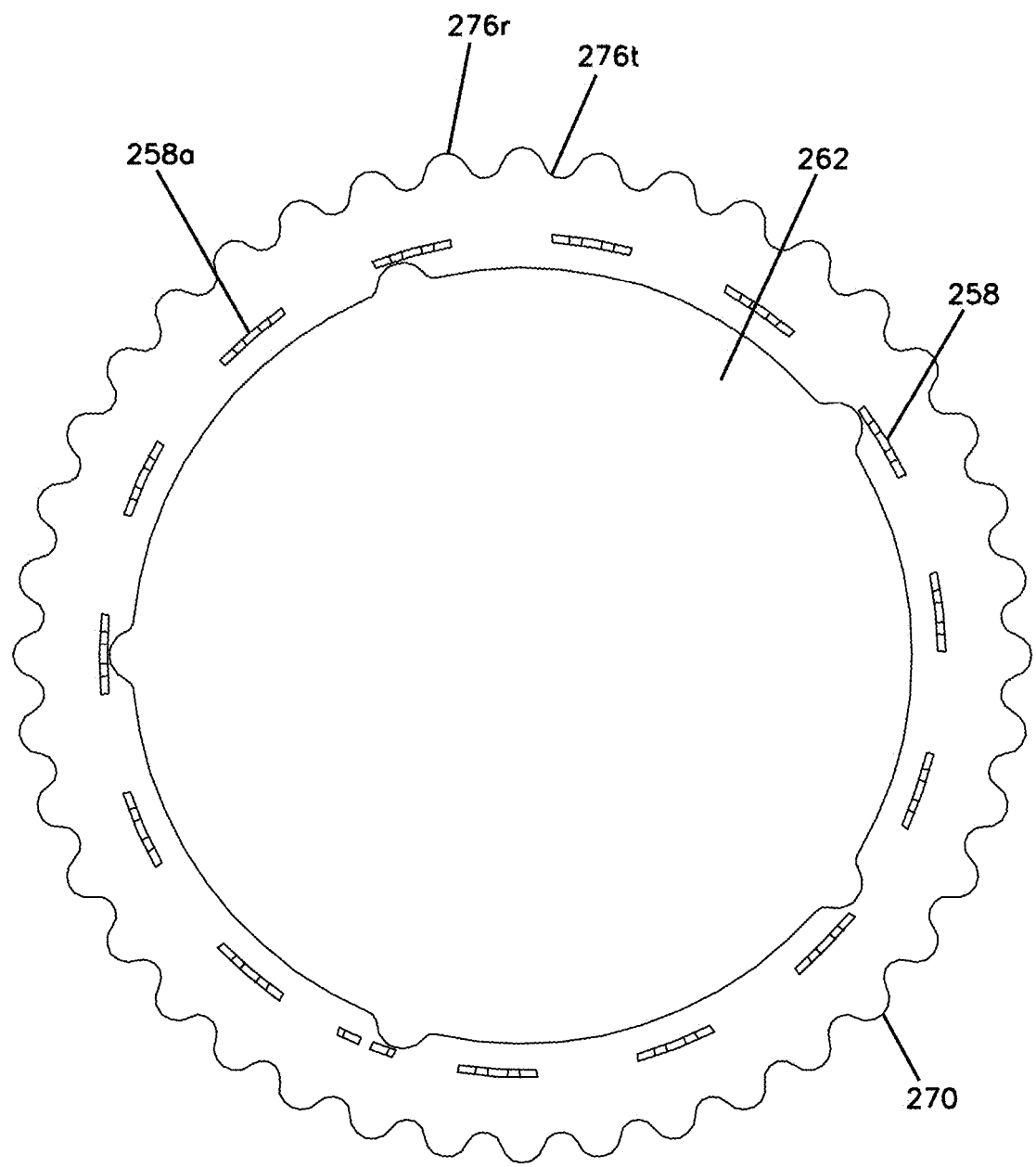
FIG. 17 is a sectional view of the end piece of the filter cartridge of FIG. 16 taken along line 17-17.

The lead in region 272 generally helps orientate the filter cartridge 250 properly within the outlet tube 200 so that the seal region 276 correctly engages the wavy wall 210 to form a radial seal. In general, during servicing of an air cleaner containing the outlet tube 200 (for example, FIG. 11), a second filter cartridge 250 is introduced into the housing so that the lead in region 272 engages the bevel 236 so that the plurality of ridges 272r and troughs 272t on the first end piece 252 engage the corresponding troughs 226 and ridges 224 on the second filter element seal surface 204 (see FIG. 10). As shown in FIG. 14, the plurality of ridges 272r and the plurality of troughs 272t extend from the lead in region 272, through the transition region 274 where they become the ridges 274r and troughs 274t, and into the seal region 276 where they become the ridges 276r and troughs 276t. In the case of the filter element 250, the ridges can be generally characterized as radially outwardly projecting and axially extending portions, and the troughs can be generally characterized as radially inwardly projecting and axially extending portions.

The lead in region 272 helps align the filter element 250 correctly with the outlet tube 200. The correct indexing informs the service provider that the filter 250 is in the correct positon for axial insertion. The transition region 274 helps further orientate the filter element 250 correctly within the outlet 200 so that the seal region 276 engages the outlet tube 200 and creates a seal when the filter element 250 is fully seated within the outlet tube 200. The transition region 274 can have a length as desired, but the purpose of the transition portion 274 is to help ease the transition from the lead in region 272 to the seal region 276. It is possible to omit a transition region 274. In such a situation, the seal member transitions directly from the lead in region 272 to the seal region 276. Also, if desired, the lead in region 272 can be omitted.

In order to assist with the creation of a seal between the seal region 270 and the second filter cartridge seal surface 204, the ridges and troughs can be modified in each of the regions. For example, in the lead in region 272 and the transition region 274, the depth of the troughs, the height of the ridges, and/or the thickness of the walls between the troughs and the ridges can be adjusted to provide for ease of orientation and insertion of the filter element 250 within the outlet tube 200. For example, the depth of the troughs can be greater in the lead in region 272 and the transition region 274 compared to the seal region 276 in order to provide easier movement between the troughs 272t and 274t and the corresponding peaks 224 on the outlet tube 200. Similarly, the ridges 272r and 274r can be provided at a lower height compared with the ridge 276r in order to help ease movement of the filter element 250 relative to the corresponding troughs 226 on the outlet tube 200. Furthermore, the breadth of the lobes in the lead in region 272 and the transition region 274 can be less compared with the seal region 276 in order to help ease movement of the filter element 250 relative to the outlet tube 200. These features can be adjusted throughout the lead in region 272 and the transition region 274 in order to ease the creation of a seal between the seal region 276 and the second filter element seal surface 204.

In some embodiments, as the filter cartridge 250 is inserted into the second filter cartridge seal surface 204 of the wavy wall 210, the seal region 276 begins to contact and slide against the second filter cartridge seal support surface 204 until the second filter cartridge 250 engages the plurality of stop member 212.

Figure 18:
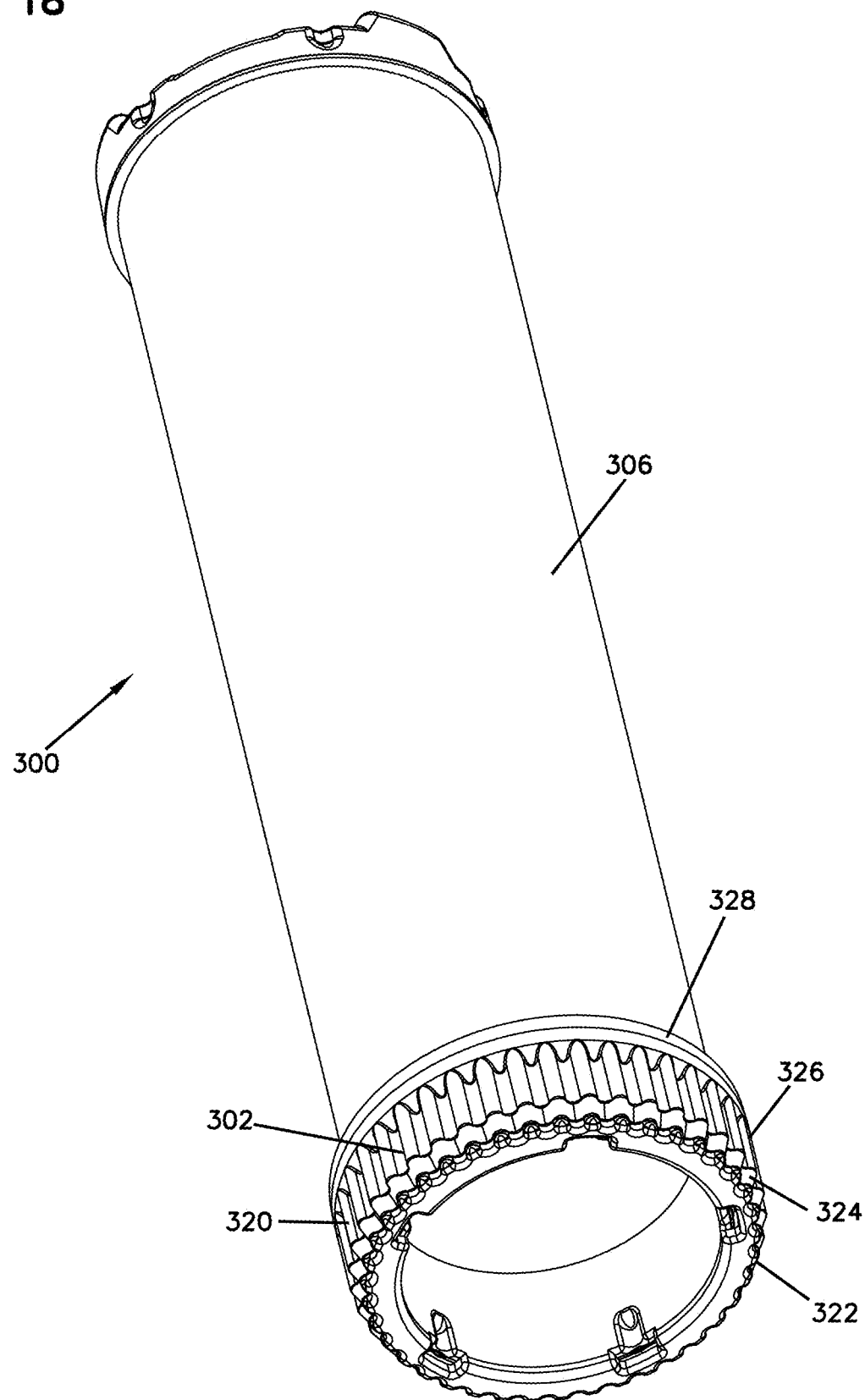
FIG. 18 is a perspective view of another alternative filter cartridge constructed to engage the outlet tube of FIG. 10.
Figure 19:
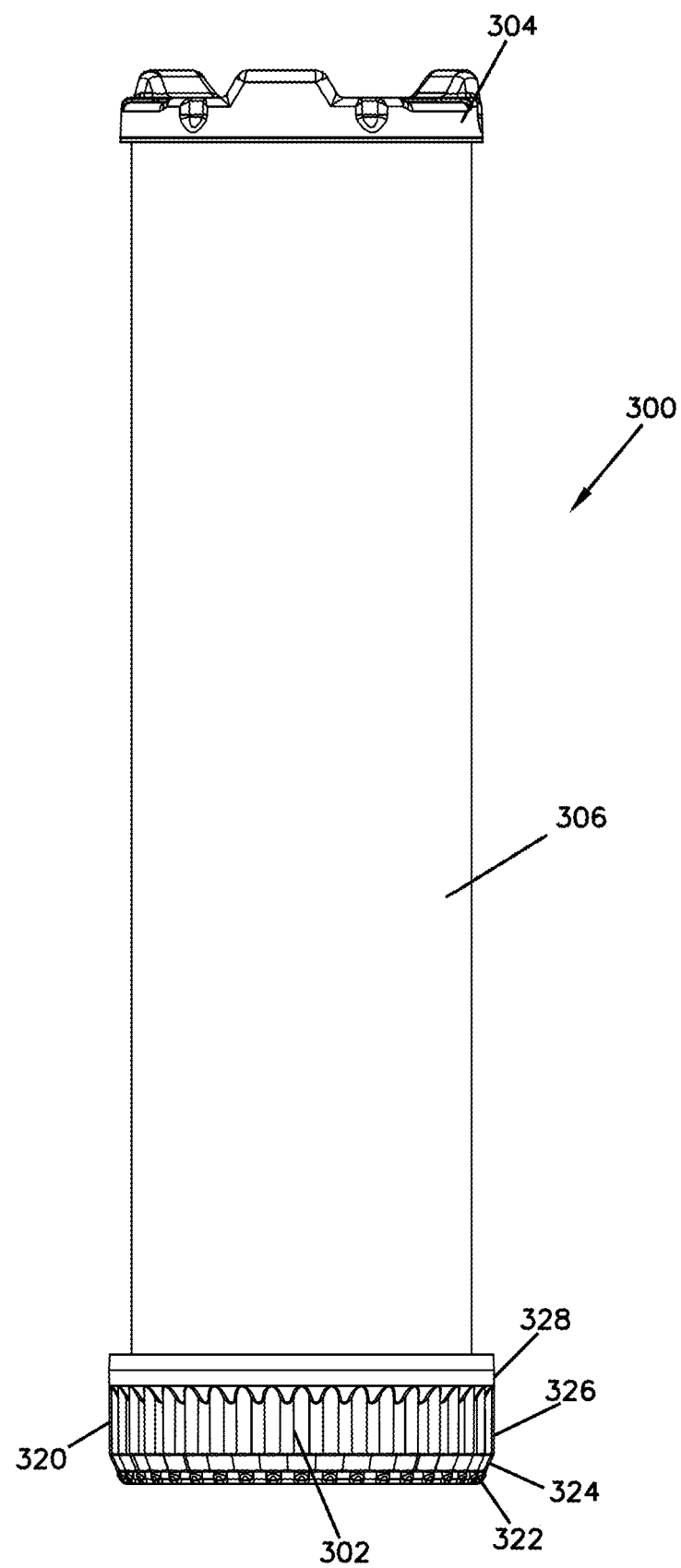
FIG. 19 is a side view of the filter cartridge of FIG. 18.
Figure 20:
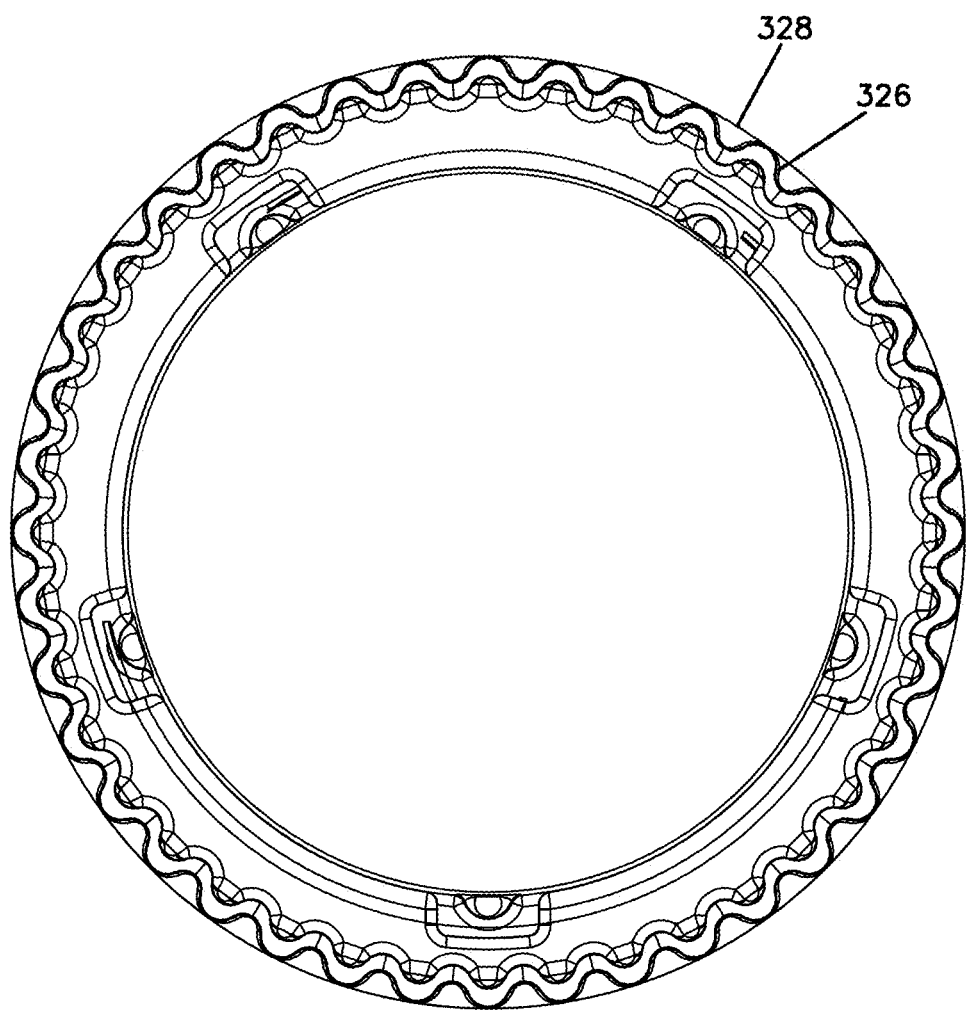
FIG. 20 is a bottom view of the filter cartridge of FIG. 18.

Now referring to FIGS. 18-20, an alternative filter cartridge or element (e.g., secondary or safety) is shown at reference number 300. The filter cartridge 300 is similar to the filter cartridge 250 except that the filter cartridge 300 is constructed to fit the second filter cartridge seal surface 204 (FIG. 10) and also fit a prior art outlet tube where the second filter cartridge seal surface is peripherally uniform about an axis X. In the embodiment shown, the filter cartridge 300 includes a first end piece (e.g., cap) 302, a second end piece (e.g., cap) 304, filter media 306 extending from the first end cap 302 to the second end cap 304, and a liner 308 supporting the filter media 306 and also extending from the first end cap 302 to the second end cap 304. The second end cap 304 can be characterized as a closed end cap and can be provided similar to the end cap 254. The first end cap 302 includes an outwardly directed surface 320 that can also include a lead in region 322, a transition region 324, a wavy wall seal region 326, and a peripherally uniform seal region 328. In general, the peripherally uniform radially seal region 328 has an outer perimeter constructed to seal against a prior art outlet tube having a generally peripherally uniform seal surface. In general, the outer peripheral surface of the peripherally uniform seal surface 328 extends to a location that is at least as great as the peaks of the wavy wall seal region 326.

An advantage of the filter element construction 300 relative to the filter construction 250 is that the filter construction 300 can be used to seal against a wavy wall outlet tube such as the outlet tube 200 depicted in FIG. 10, and also seal against a prior art outlet tube where the outlet tube is peripherally uniform. As a result, the filter element 300 can be used in the newly designed air cleaner according to the present disclosure and can also be used in prior art air cleaner having an outlet tube sized to seal against the peripherally uniform radially seal region 328. The filter element 300 may be advantageous in allowing a vehicle service provider to carry a single filter element in inventory that can be used in separate air cleaners.

Figure 21:
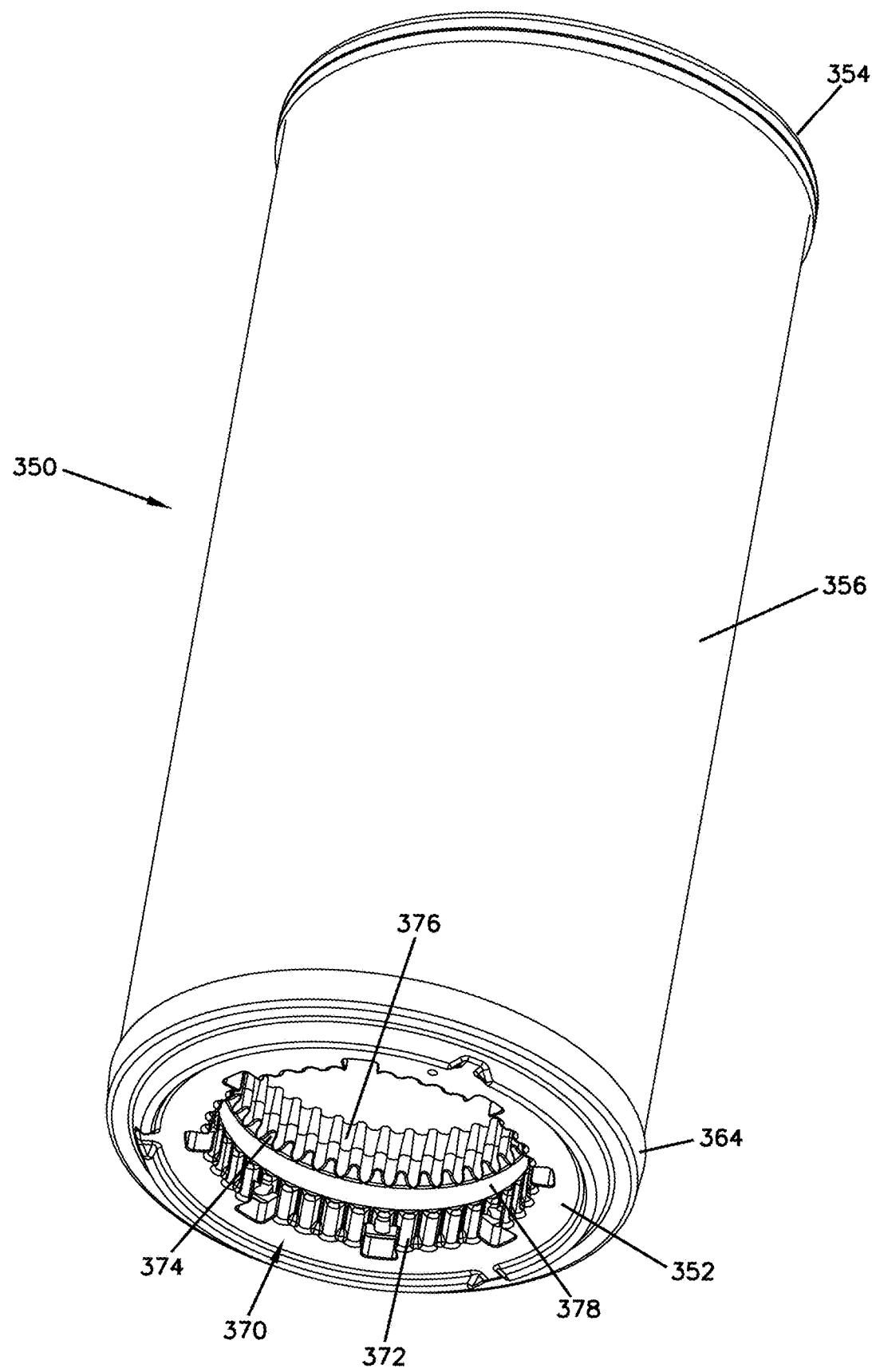
FIG. 21 is a perspective view of a filter cartridge constructed to engage the outlet tube of FIG. 10.
Figure 22:
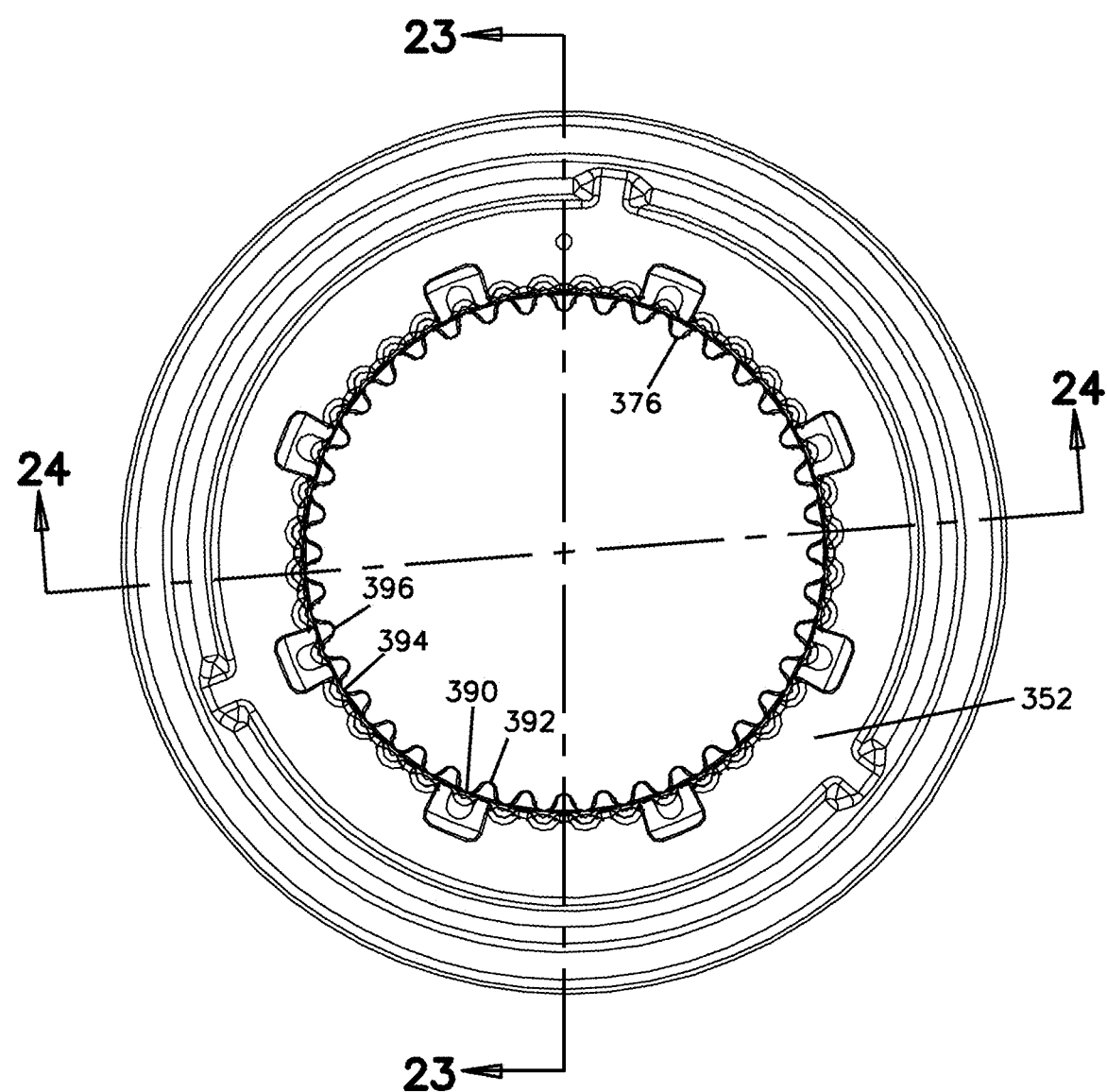
FIG. 22 is an end view of the filter cartridge of FIG. 21.
Figure 23:
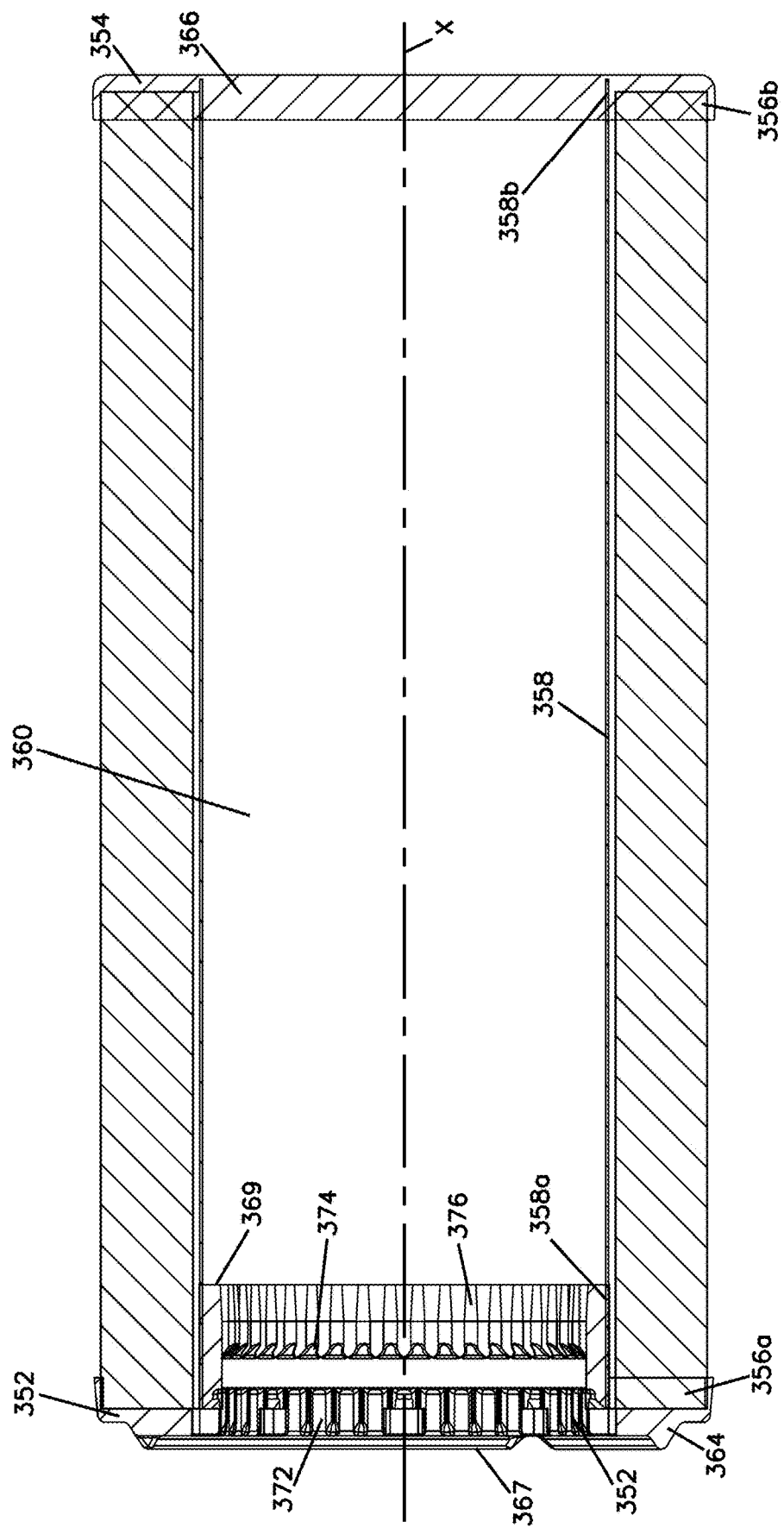
FIG. 23 is a sectional view of the filter cartridge of FIG. 22 taken along line 23-23.

Now referring to FIGS. 21-23, a filter cartridge or element (e.g., primary or main) is shown at reference number 350. The filter cartridge 350 as shown includes a first end piece (e.g., cap) 352, a second end piece (e.g., cap) 354, filter media 356, and a liner 358. The filter media 356 includes a first end 356a and a second end 356b. In general, the filter media first end 356a can be imbedded in the first end cap 352, and the filter media second end 356b can be imbedded in the second end cap 354. In addition, the liner 358 includes a liner first end 358a and a liner second end 358b. The liner first end 358a can also be imbedded in the first end cap 352, and the liner second end 358b can be imbedded in the second end cap 354. In addition, the filter media 256 can be provided as supported by the liner 258. The filter media 256 can be provided as cylindrical or conical pleated media, or as any other type of media configuration that provides the filter cartridge 350 with a central open volume 360.

Figure 24:
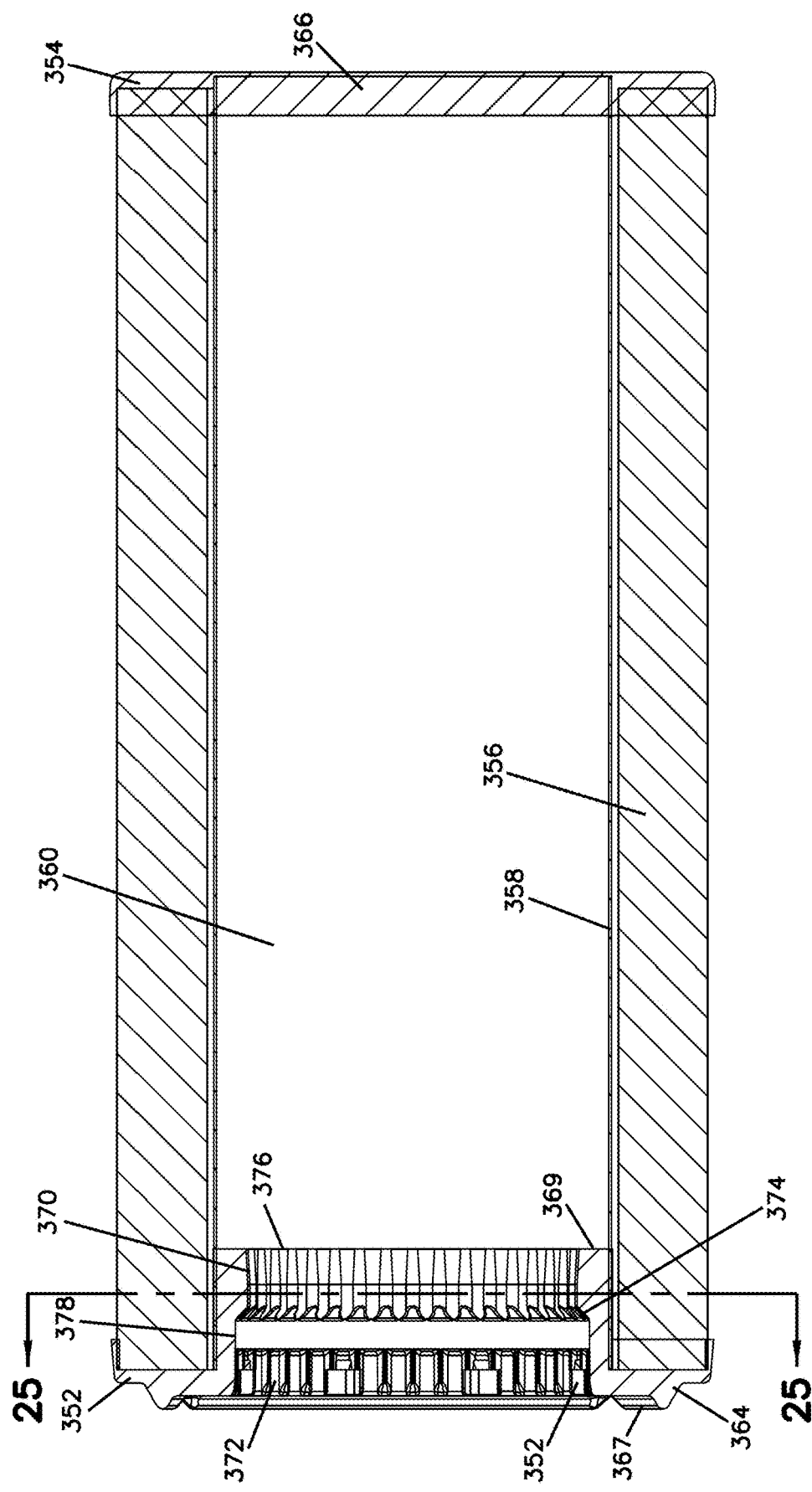
FIG. 24 is a sectional view of the filter cartridge of FIG. 22 taken along line 24-24.
Figure 25:
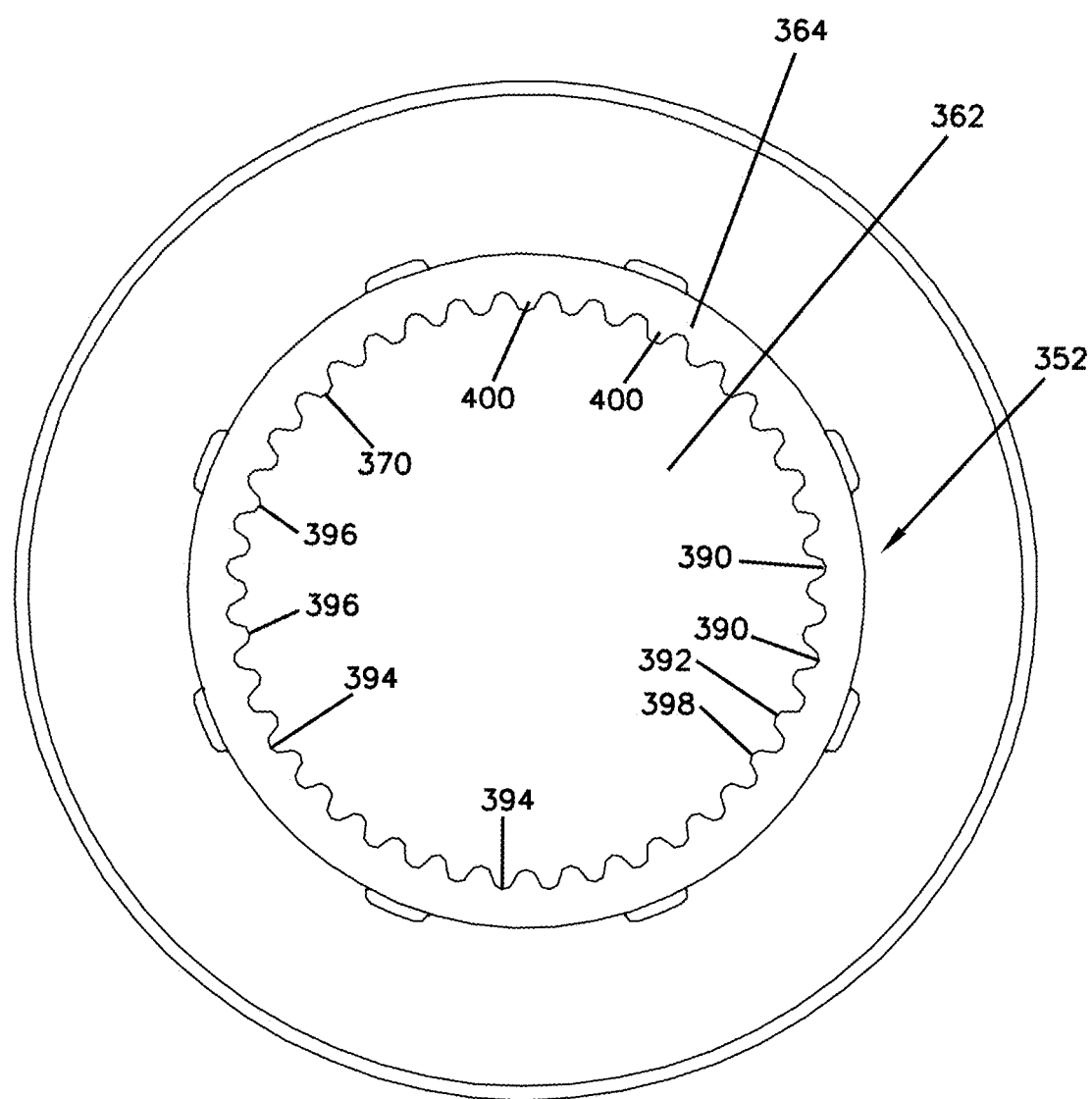
FIG. 25 is a sectional view of the end piece of the filter cartridge of FIG. 21 taken along line 25-25.

Now referring to FIGS. 24-25, the first end piece (e.g., cap) 352 is shown in detail. The first end cap 352 includes a central open volume 362 that is in communication with the filter element central open volume 360. Accordingly, the first end cap 352 can be characterized as an open end cap 364. In contrast, the second end cap 354 can be characterized as a closed end cap 366. During operation, filtered air passes through the filter media 356 to the central open volume 360, and then out of the filter cartridge 350 via the central open volume 362. When a second filter cartridge, such as cartridge 250 or 300, is also provided within the housing, the second filter cartridge is located within the central open volume 360, and the air that passes through the filter media 356 then passes through the filter media 256 and into the second filter cartridge open volume 264 and out via the first end cap central open volume 362.

The open end piece (e.g. cap) 364 includes a first end 367, a second end 369, and an internal surface 370 extending between the first end 367 and the second end 369. The internal surface 370 forms the central open volume 362, and can be constructed to engage and seal against the first filter cartridge seal surface 202 of the wavy wall 210 (see, e.g., FIG. 10). The internal surface 370 can form an internally directed radial seal.

The internal surface 370 as shown includes a lead in region 372, an optional peripherally uniform radial seal region 378, a transition region 374, and a peripherally non-uniform radial seal region 376. The optional peripherally uniform seal radial seal region 378 can be omitted from the filter element 350, and is provided in the event it is desirable for the filter element 350 to fit both a filter cartridge seal surface that can be characterized as a wavy wall housing seal surface (such as surface 202 in FIG. 10) and a prior art air cleaner outlet tube having a peripherally uniform seal surface about an axis X. In the case where the filter cartridge 350 includes the optional peripherally uniform radial seal region 378, it may be possible to inventory the filter element for both an air cleaner according to the present disclosure and having a wavy wall housing seal surface and a prior art air cleaner containing a peripherally uniform radial seal surface.

The lead in region 372, the transition region 374, and the peripherally non-uniform radial seal region 376 can be characterized as having a plurality of radially outwardly projecting and axially extending portions 390 alternating with a plurality of radially inwardly projecting and axially extending portions 392. These portions 390 and 392 can be provided extending axially along each of regions 372, 374, and 376 and not along region 378 if region 378 is present. The radially outwardly projecting and axially extending portions 390 can be characterized as troughs 394, and the and the radially inwardly projecting and axially extending portions 392 can be characterized as peaks or ridges 396. The lobes 400 formed by the peaks 396 between adjacent troughs 394 can be provided so that they fit into the corresponding troughs 222 in the first filter cartridge seal surface 202 (FIG. 10). Similarly, the troughs 394 are provided so that they receive the peaks 220 in the first filter cartridge seal surface 202. It should be appreciated that the reference to "outwardly" and "inwardly" refer to a direction either away from or toward the central axis X. Thus, the outwardly projecting and axially extending portions 390 can be referred to as troughs 394, and the inwardly projecting and axially extending portions 392 can be referred to as peaks 396. Similar to the filter elements 250 and 300, the size and shape of the troughs 394 and peaks 396 can be altered and adjusted throughout the lead in region 372, the transition region 374, and the radially seal region 376 in order to ease the indexing of the filter element 350 relative to the outlet tube 200 and also ease the insertion of the filter element 350 onto the outlet tube 200.

The radial seal region 376 includes a wavy wall seal member surface 398 that also includes a plurality of lobes 400. As discussed previously, the wavy wall seal member surface can be characterized in terms of "pitch" which is the distance from peak to adjacent peak of the lobes 400. In the case of the wavy wall seal member surface 376, the pitch can be defined as the distance between adjacent peaks. Alternatively, the pitch can be defined as the distance between the adjacent troughs. The wavy wall seal member surface 376 can be characterized as having a pitch that allows the service provider (installer of the filter element) with a degree of indexing that allows the service provider to correctly index the filter element within the housing without having to re-grip the filter element, as described above. As the filter cartridge 350 is introduced into the wavy wall 210, the lead in region 372 engages the wavy wall 210 thereby indexing the filter cartridge 350 into the correct orientation for further axial insertion. The peripherally uniform radial seal surface 378, if present, engages the wavy wall 210 with continued axial insertion. Further axial insertion results in the transition region 374 engaging the wavy wall 210 to help further orient the filter cartridge 350 and ease the transition to the radial seal region 376 engaging the wavy wall 210 where a radially directed seal is created.

It should be appreciated that for the filter cartridge 350, the peripherally non-uniform radial seal surface 376 and the peripherally uniform radial seal surface 378 (if present) are recessed from the first end 367 of the open end cap 364. Furthermore, the seal surfaces 376 and 378 can be characterized as provided inside of the filter media 356. In addition, by recessing the seal surfaces 376 and 378 from the first end 367, the seal surfaces 376 and 378 are protected from dust or debris when the filter cartridge 350 is set on a dirty surface. For example, the seal surfaces 376 and 378 can be axially recessed at least about 1 millimeter from the first end 367.

Now referring to FIGS. 26-32, alternative filter assemblies and filter cartridges are described in the context of alternative filtration media. The concepts of a wavy wall seal member surface on a filter cartridge engaging a corresponding wavy wall housing seal surface on a filter assembly are characterized. Furthermore, also characterized is the concept of the wavy wall seal member surface on the filter element being supported by a non-wavy wall seal support. The definitions of lobe and pitch provided previously are also applicable in these alternative embodiments.

Figure 26:
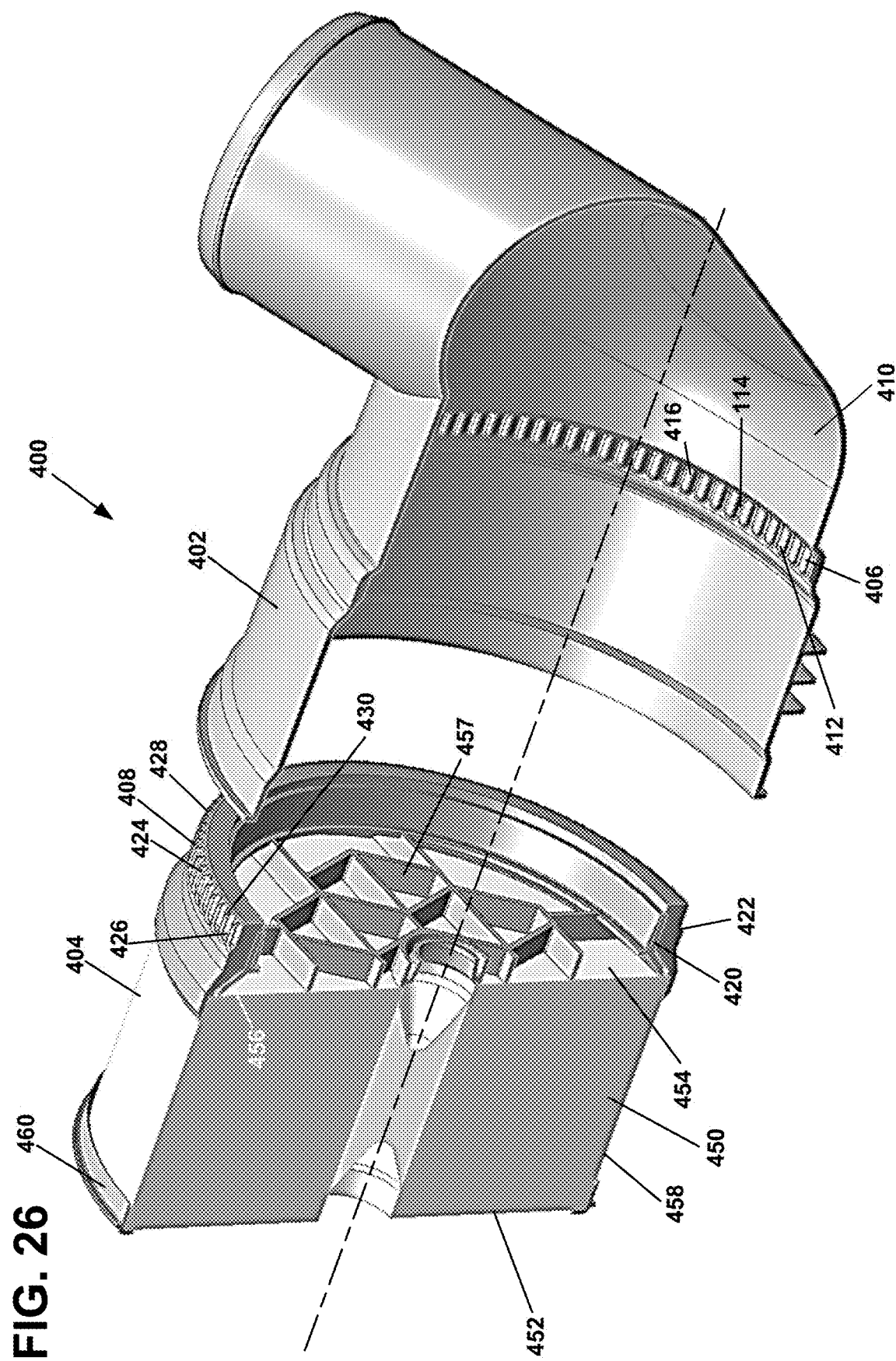
FIG. 26 is a sectional, exploded view of an alternative air cleaner assembly utilizing a filter cartridge containing z-filter media.

Now referring to FIG. 26, a sectional view of a partial air cleaner assembly is shown at reference number 400. The air cleaner assembly 400 includes an air cleaner housing 402 and a first filter element or filter cartridge 404. With the exception of the first filter cartridge seal surface 406 on the housing 402 and radial seal surface 408 on the first filter cartridge 404, the filter cartridge 404 can generally be consistent with the disclosure of U.S. Pat. No. 7,396,376, the entire disclosure which is incorporated herein by reference. The first filter cartridge seal surface 406 is provided extending along a periphery of the interior surface 410 of the housing 402, and includes a wavy wall housing seal surface 412 having radially outwardly projecting and axially extending portions 414 alternating with radially inwardly projecting and axially extending portions 416. Similarly, the filter cartridge 404 includes a seal support 420 having a seal member 422 molded thereon. The seal support 420 can be characterized as a non-wavy wall seal support. The radial seal surface 408 of the seal member 422 similarly includes a plurality of radially outwardly projecting and axially extending portions 424 alternating with a plurality of radial inwardly projecting and axially extending portions 426. The seal member 422 can include a lead in region 428 that helps align the filter cartridge 404 with the housing 402. The lead in region 428 can include bevels 430 in the plurality of radially outward projecting and axially extending portions 414 to help correctly engage the first filter cartridge seal surface 406. When the filter cartridge 404 is fully inserted into the housing 402, the radial seal surface 408 engages the first filter cartridge seal surface 406 and creates a seal. The radial seal surface 408 can be characterized as outwardly directed radial seal surface.

The filter cartridge 404 can be provided having z-filter media 450 having an inlet flow face 452 and an opposite, outlet flow face 454. Over the outlet flow face 454 can be provided a seal support structure 456 that can include a grid work arrangement 457 that extends over the outlet flow face 454, and the seal support 420 that supports the seal member 422. The seal member 422 can be molded over the seal support 420 and over a media pack periphery 458. In addition, the filter element 404 can include an end piece (e.g., frame) 460 located proximate the inlet flow face 454. The end piece 460 can be used to help insert or remove the filter cartridge 404 from air cleaner housing 402.

Figure 27:
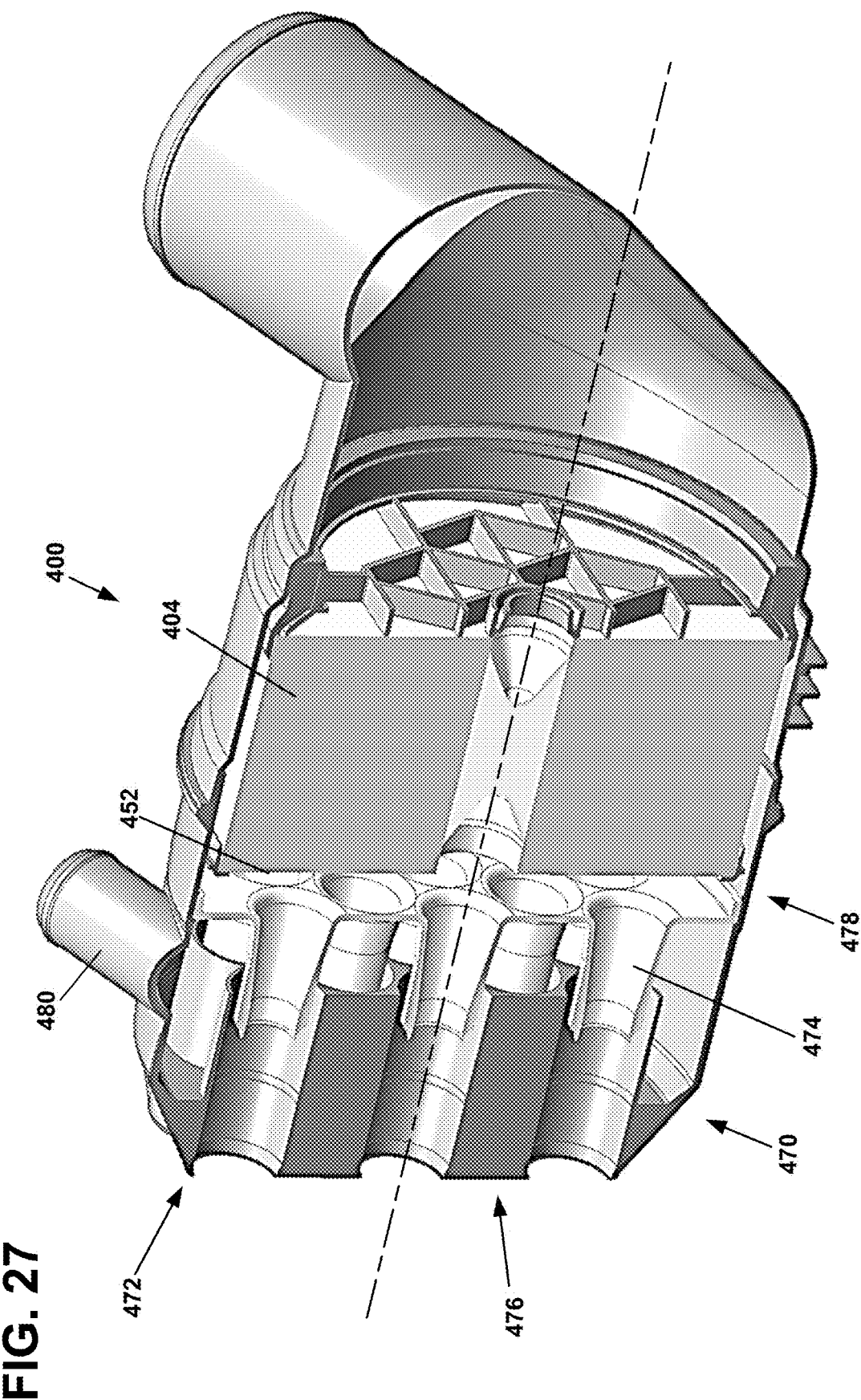
FIG. 27 is a sectional view of the air cleaner assembly of FIG. 26 and including a precleaner.
Figure 28:
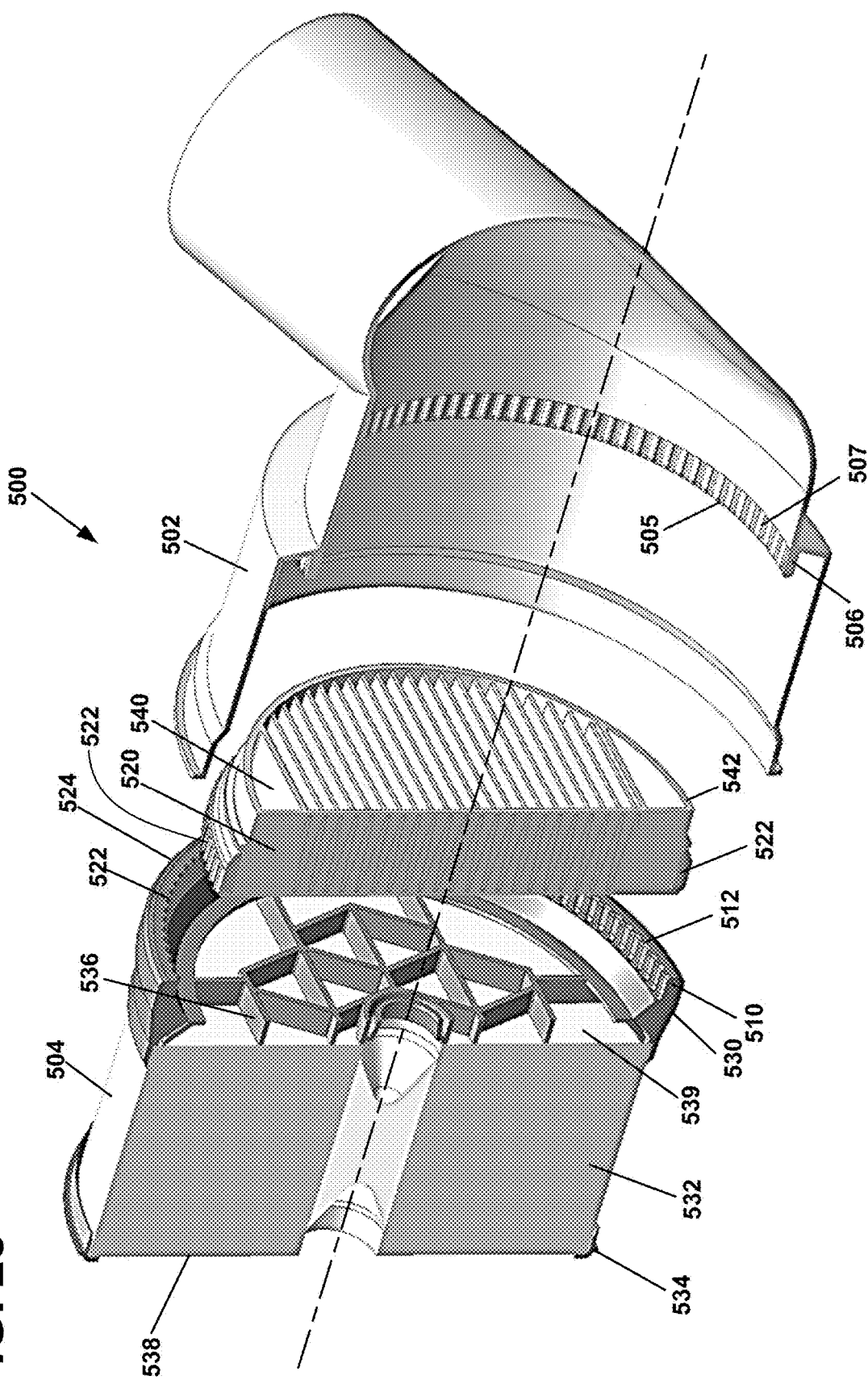
FIG. 28 is a sectional, exploded view of an alternative air cleaner assembly utilizing a first filter cartridge and a second filter cartridge.
Figure 29:
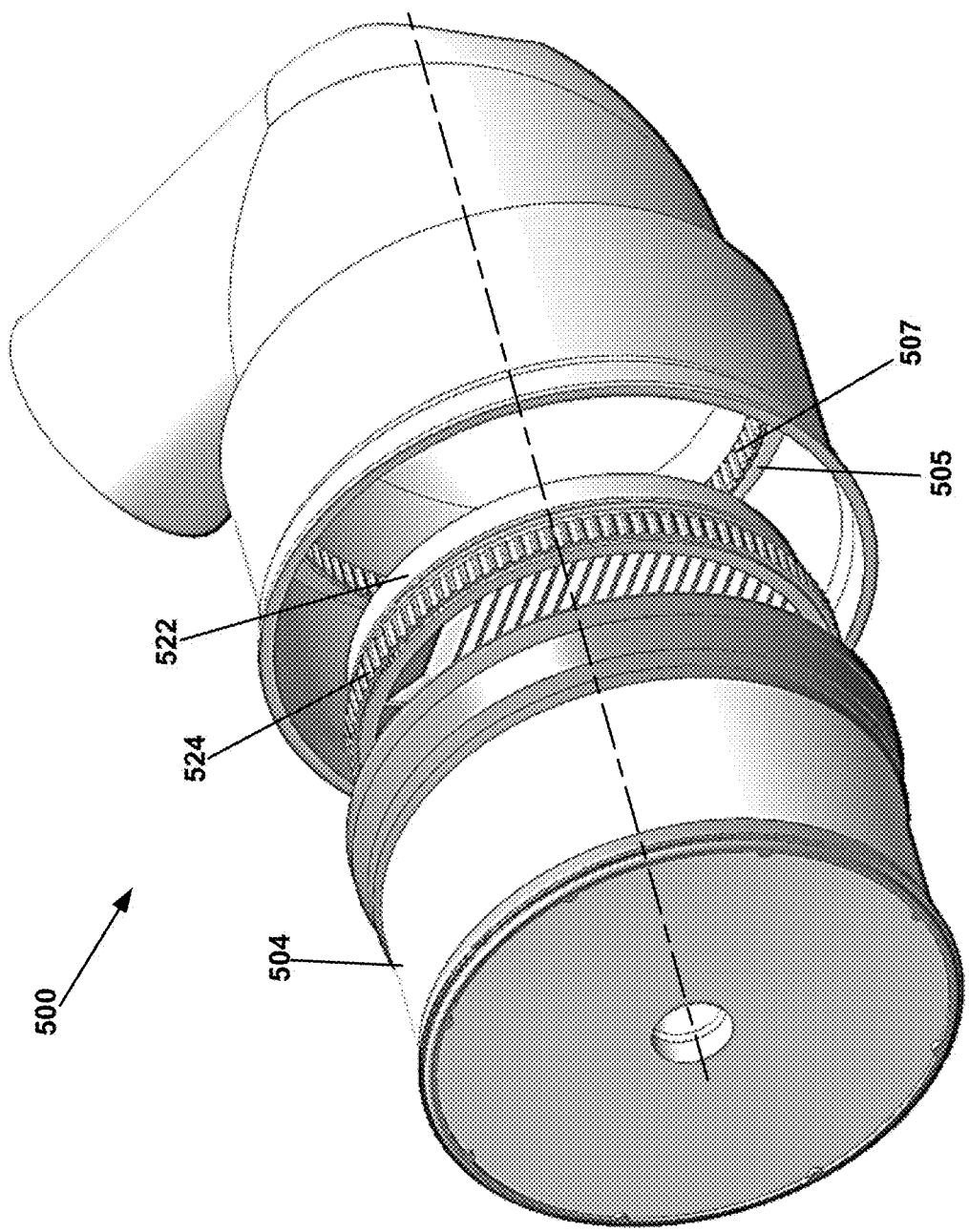
FIG. 29 is an exploded view of the air cleaner assembly of FIG. 28.
Figure 30:
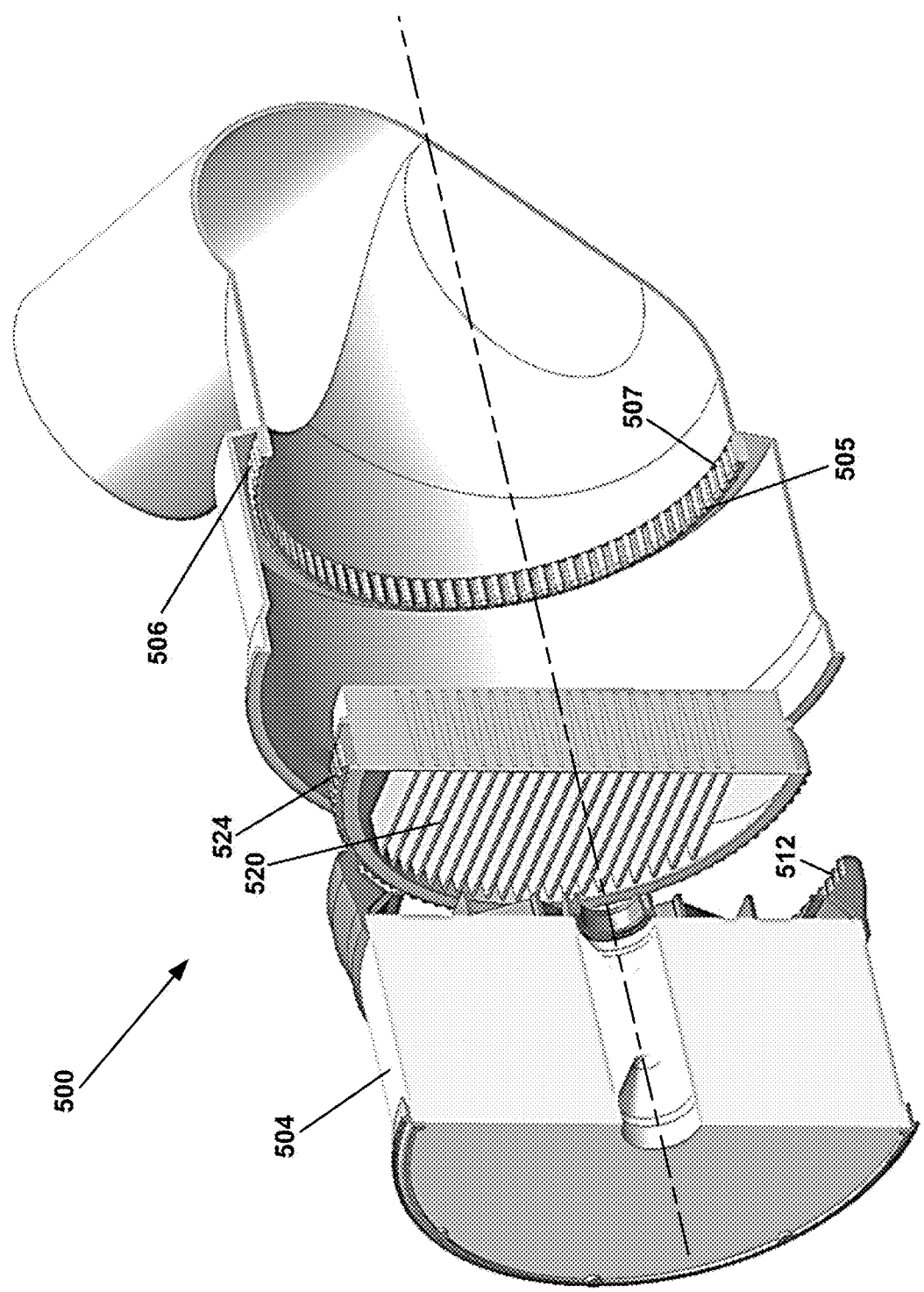
FIG. 30 is a sectional, exploded view of the air cleaner assembly of FIG. 28.
Figure 31:
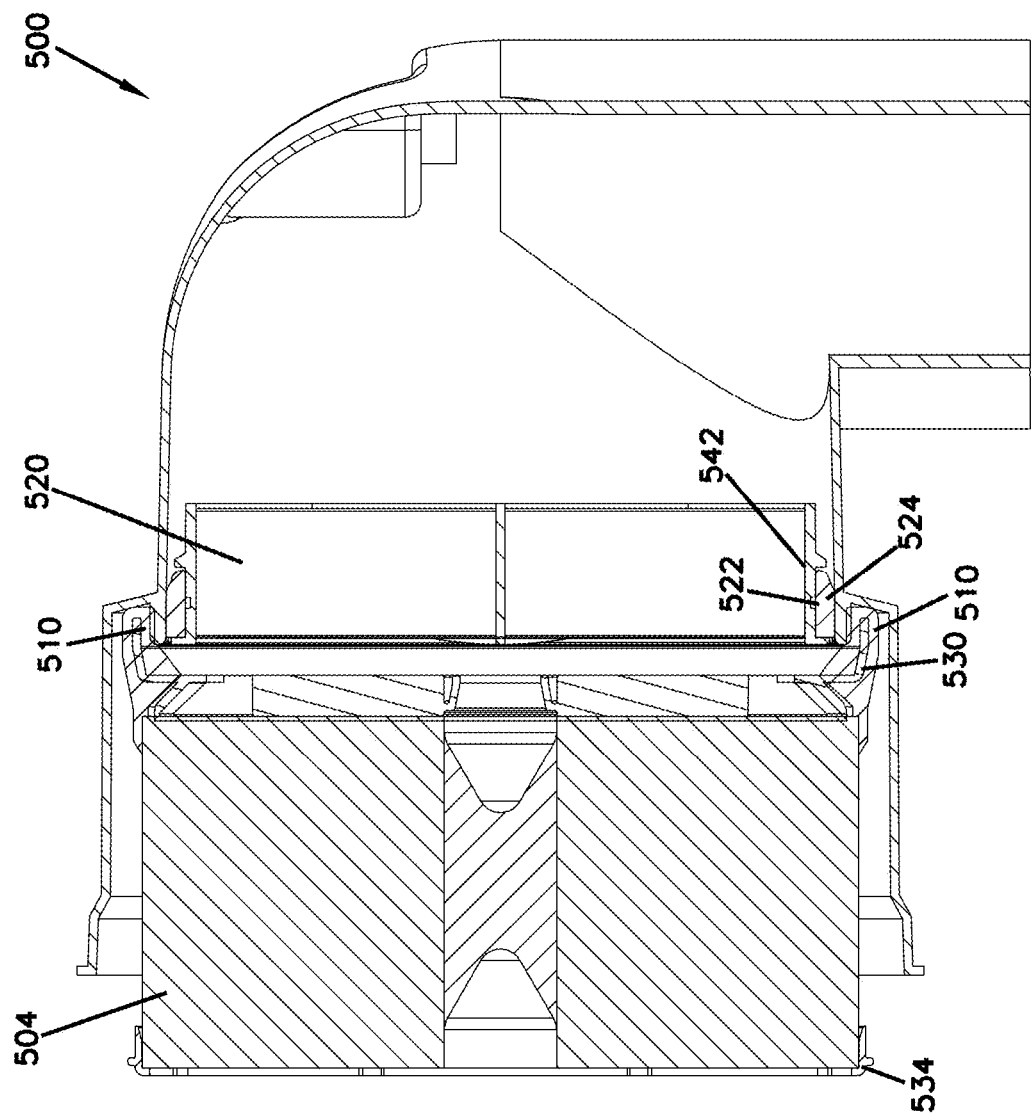
FIG. 31 is a sectional view of an air cleaner assembly consistent with FIG. 28.

Now referring to FIG. 27, the air cleaner 400 is similar to that shown in FIG. 26 except with an additional air inlet region 470. The air inlet region 470 can be referred to as a precleaner 472 and includes a plurality of centrifugal separators 474 that receive air from a first end 476, spin the air through the plurality of centrifugal separators 472 in order to remove large particulates, and then permit precleaned air to exist via the precleaner outlet 478. The precleaned air from the precleaner outlet 478 then flows into the inlet flow face 452 of the first filter cartridge 404. A scavenge 480 can be provided for removal of the large particulates. As shown in FIG. 27, the radial seal surface 408 on the filter cartridge 404 is in a sealing relationship with the first filter cartridge seal surface 406 on the housing 402.

Now referring to FIGS. 28-31, an alternative air cleaner assembly is shown at reference number 500. The air cleaner assembly 500 is similar to the air cleaner assembly 400 in several respects. The air cleaner housing 502 includes a wavy wall 505 having a first filter cartridge wavy wall seal surface 506 and a second filter cartridge wavy wall seal surface 507. The first filter cartridge 504 includes a seal member 510 having a wavy wall seal member surface 512 that is constructed as an internally directed radial seal surface. The filter element wavy wall seal member surface 512 is constructed to engage the wavy wall housing seal surface 506. Similarly, the second filter cartridge 520 includes a seal member 522 having a wavy wall seal member surface 524 that is provided as an outwardly directed radial seal. The wavy wall seal member surface 524 is constructed to engage the wavy wall housing seal surface 507.

The first filter element 504 can be constructed with a seal support 530, coiled and fluted media 532, end piece (e.g., frame) 534, and a cross brace arrangement 536. The media pack 532 can be provided with an inlet flow face 538 and an outlet flow face 539. The second filter cartridge 520 is shown containing pleated media 540 and a support structure 542 for supporting the pleated media and also the seal member 522.

Figure 32:
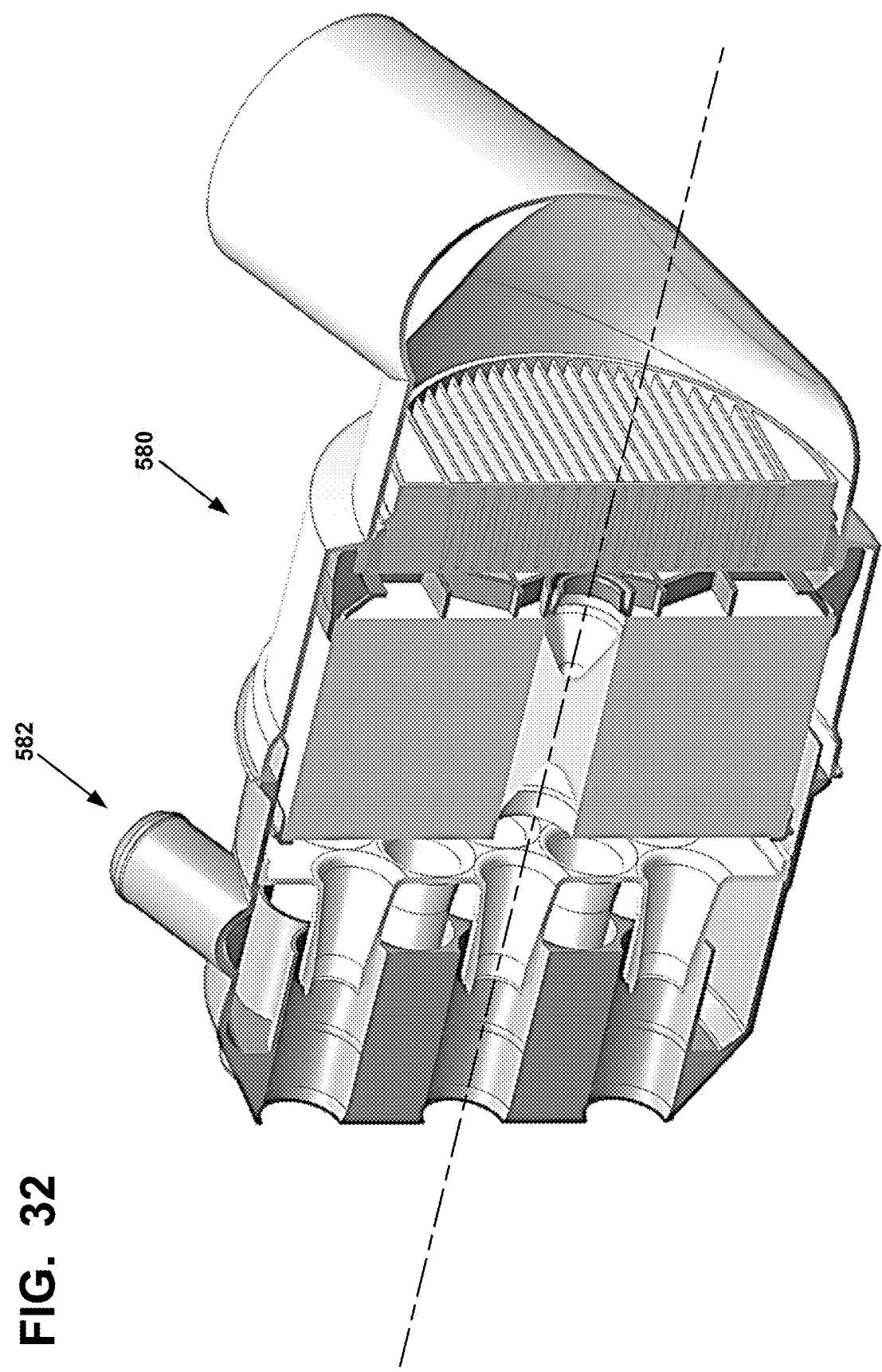
FIG. 32 is a sectional view of the air cleaner assembly of FIG. 31 and including a precleaner.

Now referring to FIG. 32, an alternative air cleaner assembly 580 is provided that is similar to the air cleaner assembly 500 except for the addition of the precleaner assembly 582. The precleaner assembly 582 can be provided having a structure similar to the precleaner 472.

The particular material chosen for the media is a matter of choice for a selected application. When the filter assembly is an air cleaner, any of a variety of media materials used in air cleaners can be used with principles according to the present disclosure.

The media pack can comprise only media or the media can be provided with an inner and/or outer liner before installation in the cartridge. The media can be pleated, non-pleated, or wave media although additional alternatives are possible. The media can be provided in a variety of configurations including cylindrical and conical, and with a variety of inner and/or outer perimeter definitions, for example circular or oval.

It is noted that although the seal of the arrangements are sometimes characterized as "radial." However, as a result of the non-circular shape, some of the sealing forces will be directed other than specifically at or away from the central axis X of the cartridge. The seals are nevertheless characterized herein as "radial," since, in general, the seal surfaces on the cartridge and housing are generally radially directed and the sealing forces are either radially outwardly directed or radially inwardly directed, around the axis X, depending on whether an outward or inward seal surface is involved. Alternately stated, the compression forces are generally not axial (i.e. in the longitudinal direction of axis X), but rather are generally radial. There are applications, however, where the seal forces are not aligned directly toward or away from the axis X in each of these non-circular configurations.

In more general terms, radial seals comprise seal surfaces that surrounds (directed toward away from) a central axis. That central axis in many instances will comprise a central axis of a filter cartridge around which media is also positioned. However, from alternative arrangements described herein below, it will be understood that a radial seal can be a seal that surrounds an axis that is not also a central axis for the cartridge (by contrast, an axial seal is a seal that is generally aligned with a central axis around which the seal is positioned, typically also, but not necessarily in all instances, a central cartridge axis X).

In the general terminology used herein, the various housing seal arrangements depicted can also be characterized as generally comprising a radially directed seal surface, since the seal direction for the various housing seals depicted in the drawings, is generally with a surface of the seal engaging some portion of the housing (be it a portion of an outlet tube or outer portion of the housing, depending on whether which of the two of the housing seals is involved) that can be generally characterized as a "radially directed surface." In each instance, the surface that actually forms the seal is directed around (and facing toward or away from) a central axis X (typically, also of the cartridge) as opposed to an axial seal which would be generally with seal forces directed in the longitudinal direction of the central axis X. The examples depicted are "outward radial seal surfaces" or "outwardly directed radial seals" since the actual surface of the seal member on the cartridge that will form a seal in engagement with a housing, is generally directed away from a central axis of the cartridge, as opposed as toward the axis. However, many of the principles described herein can be applied in alternate arrangements in which the seal surface on the cartridge that engages the housing to form a seal is directed radially toward the central axis.

The radial housing seals described herein can be generally characterized as "non-clamp," "non-clamping" or "clampless" arrangements or by similar terms. By this it is meant that the seal arrangements typically do not involve the use of a clamp such as a hose clamp or other structure that needs to be tightened in order to provide for a secure seal. Rather, the seals are established by mere installation, with compression of the seal material against a surface of the housing being directed by a cartridge component.

The principles described herein can be applied in a variety of filter assemblies. Examples described in which the principles applied to (air) gas filter assemblies. Examples are described include air filters and crankcase ventilation filter assemblies. The principles can be applied to a variety of alternate gas filtration arrangements, in some instances even with liquid filter assemblies.

Principles according to the present disclosure relate to interactions between filter cartridges and air cleaner systems, in advantageous manners to achieve certain, selected, desired results discussed below. The filter cartridge would generally include a filter media therein, through which air and other gases pass, during a filtering operation. The media can be of a variety of types and configurations, and can be made from using a variety of materials. For example, pleated media arrangements can be used in cartridges according to the principles of the present disclosure, as discussed below.

The principles are particularly well adapted for use in situations in which the media is quite deep in extension between the inlet and outlet ends of the cartridge, but alternatives are possible. Also, the principles are often used in cartridges that relatively large cross-dimension sizes. With such arrangements, alternate media types to pleated media will often be desired.

In this section, examples of some media arrangements that are usable with the techniques described herein are provided. It will be understood, however, that a variety of alternate media types can be used. The choice of media type is generally one of preference for: availability; function in a given situation of application, ease of manufacturability, etc. and the choice is not necessarily specifically related to the overall function of selected ones of various filter cartridge/air cleaner interaction features characterized herein.

Fluted filter media (e.g., media having media ridges) can be used to provide fluid filter constructions in a variety of manners. One well known manner is characterized herein as a z-filter construction. The term "z-filter construction" as used herein, is meant to include (but not be limited to) a type of filter construction in which individual ones of corrugated, folded or otherwise formed filter flutes are used to define (typically in combination with facing media) sets of longitudinal, typically parallel, inlet and outlet filter flutes for fluid flow through the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these cited references being incorporated herein by reference.

One type of z-filter media utilizes two specific media components joined together, to form the media construction. The two components are: (1) a fluted (typically corrugated) media sheet or sheet section, and, (2) a facing media sheet or sheet section. The facing media sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted media section and facing media section can comprise separate materials between one another. However, they can also be sections of the single media sheet folded to bring the facing media material into appropriate juxtaposition with the fluted media portion of the media.

The fluted (typically corrugated) media sheet and the facing media sheet or sheet section together, are typically used to define media having parallel flutes. In some instances, the fluted sheet and facing sheet are separate and then secured together and are then coiled, as a media strip, to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked with one another, to create a filter construction. An example of this is described in FIG. 11 of U.S. Pat. No. 5,820,646, incorporated herein by reference.

Herein, strips of material comprising fluted sheet (sheet of media with ridges) secured to corrugated sheet, which are then assembled into stacks to form media packs, are sometimes referred to as "single facer strips," "single faced strips," or as "single facer" or "single faced" media. The terms and variants thereof, are meant to refer to a fact that one face, i.e., a single face, of the fluted (typically corrugated) sheet is faced by the facing sheet, in each strip.

Typically, coiling of a strip of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is often used to refer to a flute structure resulting from passing the media between two corrugation rollers, i.e., into a nip or bite between two rollers, each of which has surface features appropriate to cause corrugations in the resulting media. The term "corrugation" is however, not meant to be limited to such flutes, unless it is stated that they result from flutes that are by techniques involving passage of media into a bite between corrugation rollers. The term "corrugated" is meant to apply even if the media is further modified or deformed after corrugation, for example by the folding techniques described in PCT WO 04/007054, and published Jan. 22, 2004, incorporated herein by reference.

Corrugated media is a specific form of fluted media. Fluted media is media which has individual flutes or ridges (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a substantial turn as its passes into and out of the media. That is, in a U.S. Pat. No. 6,039,778 filter, the flow enters the cylindrical filter cartridge through a cylindrical side, and then turns to exit through an open end of the media (in forward-flow systems). In a typical reverse-flow system, the flow enters the serviceable cylindrical cartridge through an open end of the media and then turns to exit through a side of the cylindrical filter media. An example of such a reverse-flow system is shown in U.S. Pat. No. 5,613,992, incorporated by reference herein.

The term "z-filter media construction" and variants thereof as used herein, without more, is meant to include, but not necessarily be limited to, any or all of: a web of corrugated or otherwise fluted media (media having media ridges) secured to (facing) media, whether the sheets are separate or part of a single web, with appropriate sealing (closure) to allow for definition of inlet and outlet flutes; and/or a media pack constructed or formed from such media into a three dimensional network of inlet and outlet flutes; and/or, a filter cartridge or construction including such a media pack.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

Typically, in the corrugation process a deformation is caused to the media. After the tension is released the flute or corrugations will tend to partially spring back, recovering only a portion of the stretch and bending that has occurred. The facing media sheet is sometimes tacked to the fluted media sheet, to inhibit this spring back in the corrugated sheet.

The media of the corrugated (fluted) sheet facing sheet or both, can be provided with a fine fiber material on one or both sides thereof, for example in accord with U.S. Pat. No. 6,673,136, incorporated herein by reference. In some instances, when such fine fiber material is used, it may be desirable to provide the fine fiber on the upstream side of the material.

An issue with respect to z-filter constructions relates to closing of the individual flute ends. Although alternatives are possible, typically a sealant or adhesive is provided, to accomplish the closure. As is apparent from the discussion above, in typical z-filter media especially that which uses straight flutes as opposed to tapered flutes and sealant for flute seals, large sealant surface areas (and volume) at both the upstream end and the downstream end are needed. High quality seals at these locations are important to proper operation of the media structure that results. The high sealant volume and area, creates issues with respect to this.

Techniques described herein are particularly well adapted for use in media packs that result from a step of coiling a single sheet comprising a corrugated sheet/facing sheet combination, i.e., a "single facer" strip. However, they can also be made into stacked arrangements.

Coiled media or media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media or media pack. Typical shapes are circular as described in PCT WO 04/007054. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054, and PCT application US 04/07927, published as WO 04/082795, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media or media pack can be provided with a variety of different definitions. In many arrangements, the ends or end faces are generally flat (planer) and perpendicular to one another. In other arrangements, one or both of the end faces include tapered, for example, stepped, portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 33:
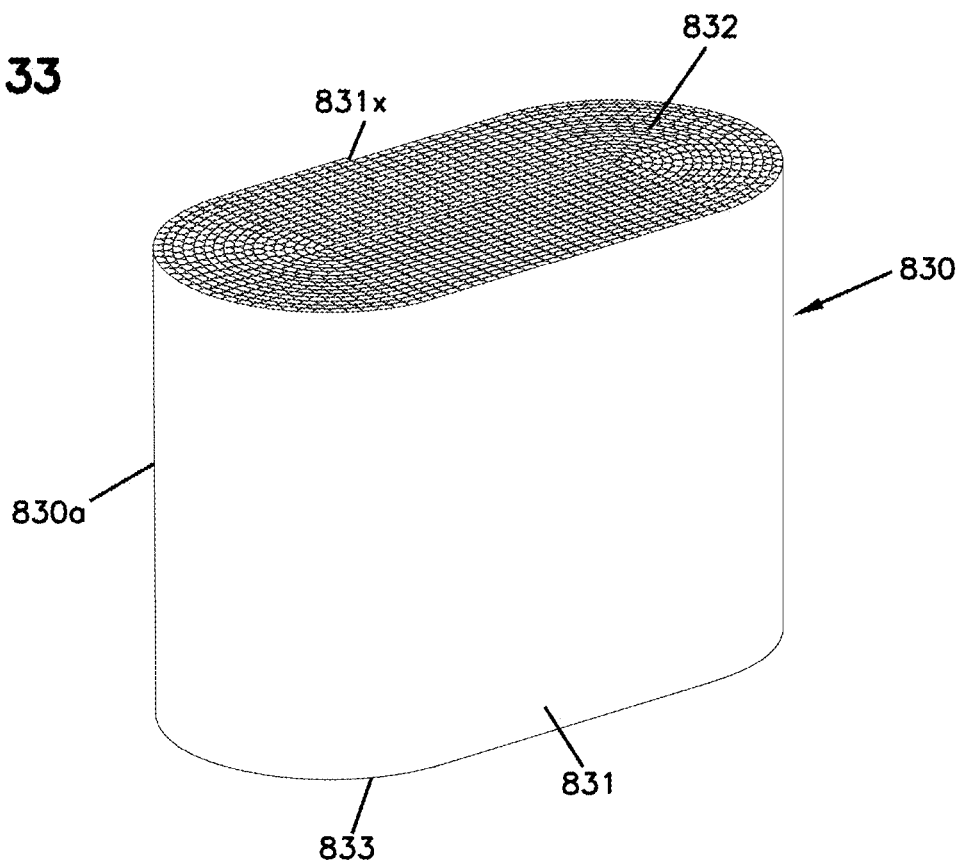
FIG. 33 is a perspective view of an alternative media pack that can be used in the air cleaner assembly of the present disclosure.

In FIG. 33, a coiled media pack (or coiled media) 830 constructed by coiling a single strip of single faced media is depicted, generally. The particular coiled media pack depicted is an oval media pack 830*a*, specifically a racetrack shaped media pack 831. The tail end of the media, at the outside of the media pack 830 is shown at 831*x*. It will be typical to terminate that tail end along straight section of the media pack 830 for convenience and sealing. Typically, a hot melt seal bead or seal bead is positioned along that tail end to ensure sealing. In the media pack 830, the opposite flow (end) faces are designated at 832, 833. One would be an inlet flow face, the other an outlet flow face.

Figure 34:
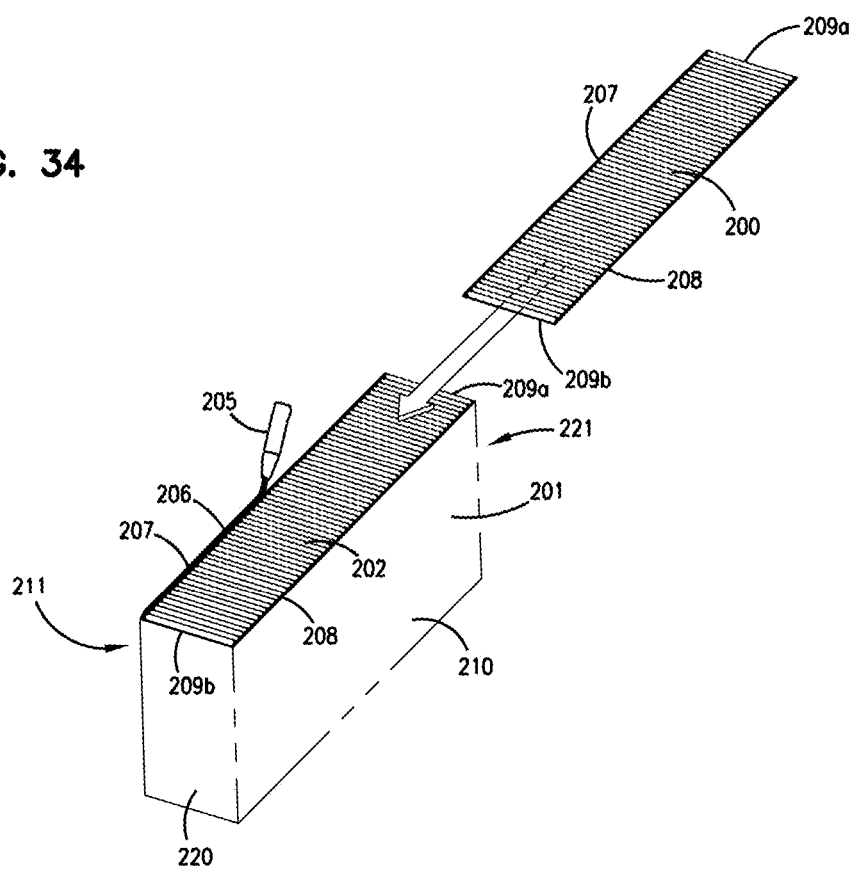
FIG. 34 is a perspective view of an alternative media pack that can be used in the air cleaner assembly of the present disclosure.

In FIG. 34, there is (schematically) shown a step of forming stacked z-filter media (or media pack) from strips of z-filter media, each strip being a fluted sheet secured to a facing sheet. Referring to FIG. 33, single facer strip 200 is being shown added to a stack 201 of strips 202 analogous to strip 200. Strip 200 can be cut from either of strips 76, 77. At 205, FIG. 33, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 34, each strip 200, 202 has front and rear edges 207, 208 and opposite side edges 209*a*, 209*b*. Inlet and outlet flutes of the corrugated sheet/facing sheet combination comprising each strip 200, 202 generally extend between the front and rear edges 207, 208, and parallel to side edges 209*a*, 209*b*.

Still referring to FIG. 34, in the media or media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media configuration or pack 201 is sometimes referred to herein as a "blocked" stacked media pack. The term "blocked" in this context, is an indication that the arrangement is formed to a rectangular block in which all faces are 90° relative to all adjoining wall faces. In another example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media or media pack will be referenced as having a parallelogram shape in any cross-section, meaning that any two opposite side faces extend generally parallel to one another.

It is noted that a blocked, stacked arrangement corresponding to FIG. 34 is described in the prior art of U.S. Pat. No. 5,820,646, incorporated herein by reference. It is also noted that stacked arrangements are described in U.S. Pat. Nos. 5,772,883; 5,792,247; U.S. Patent Publication No. 2004/0187689. Each of these latter references is incorporated herein by reference. It is noted that a stacked arrangement shown in U.S. Patent Publication No. 2005/0130508 is a slanted stacked arrangement.

It is also noted that, in some instances, more than one stack can be incorporated into a single media pack. Also, in some instances, the stack can be generated with one or more flow faces that have a recess therein, for example, as shown in U.S. Pat. No. 7,625,419 incorporated herein by reference.

Figure 35:
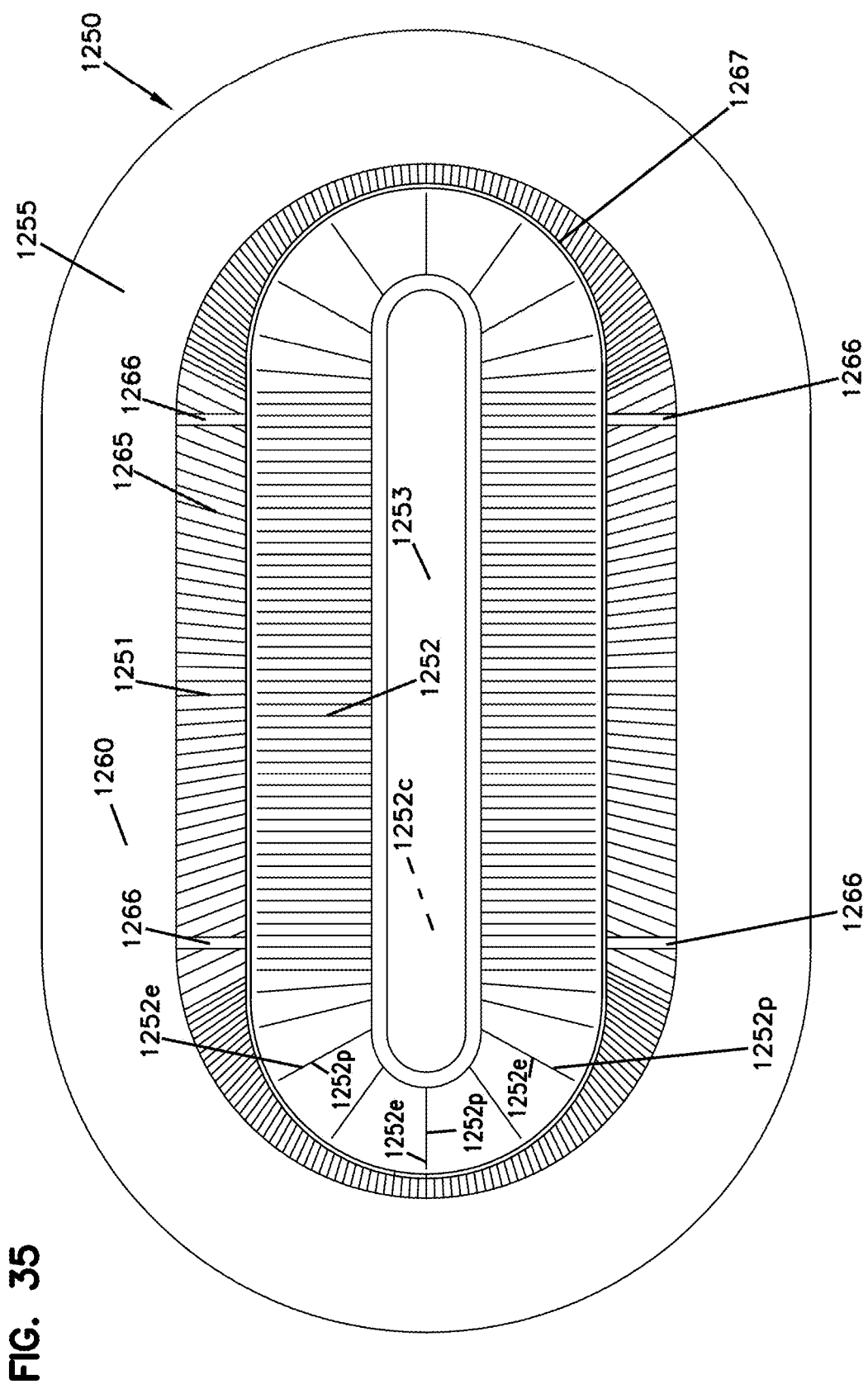
FIG. 35 is a top view of an alternative media pack that can be used in the air cleaner assembly of the present disclosure.

Alternate types of media arrangements or packs that involve flutes between opposite ends extending between can be used with selected principles according to the present disclosure. An example of such alternate media arrangement or pack is depicted in FIGS. 35-35B. The media of FIGS. 35-35B is analogous to one depicted and described in DE 20 2008 017 059 U1; and as can sometimes found in arrangements available under the mark "IQORON" from Mann & Hummel.

Referring to FIG. 35, the media or media pack is indicated generally at 1250. The media or media pack 1250 comprises a first outer pleated (ridged) media loop 1251 and a second, inner, pleated (ridged) media loop 1252, each with pleat tips (or ridges) extending between opposite flow ends. The view of FIG. 35 is toward a media pack (flow) end 1255. The end 1255 depicted, can be an inlet (flow) end or an outlet (flow) end, depending on selected flow direction. For many arrangements using principles characterized having the media pack 1250 would be configured in a filter cartridge such that end 1255 is an inlet flow end.

Still referring to FIG. 35, the outer pleated (ridged) media loop 1251 is configured in an oval shape, though alternatives are possible. At 1260, a pleat end closure, for example molded in place, is depicted closing ends of the pleats or ridges 1251 at media pack end 1255.

Pleats, or ridges 1252 (and the related pleat tips) are positioned surrounded by and spaced from loop 1251, and thus pleated media loop 1252 is also depicted in a somewhat oval configuration. In this instance, ends 1252e of individual pleats or ridges 1252p in a loop 1252 are sealed closed. Also, loop 1252 surrounds the center 1252c that is closed by a center strip 1253 of material, typically molded-in-place.

During filtering, when end 1255 is an inlet flow end, air enters gap 1265 between the two loops of media 1251, 1252.

The air then flows either through loop 1251 or loop 1252, as it moves through the media pack 1250, with filtering.

In the example depicted, loop 1251 is configured slanting inwardly toward loop 1252, in extension away from end 1255. Also spacers 1266 are shown supporting a centering ring 1267 that surrounds an end of the loop 1252, for structural integrity.

Figure 35A:
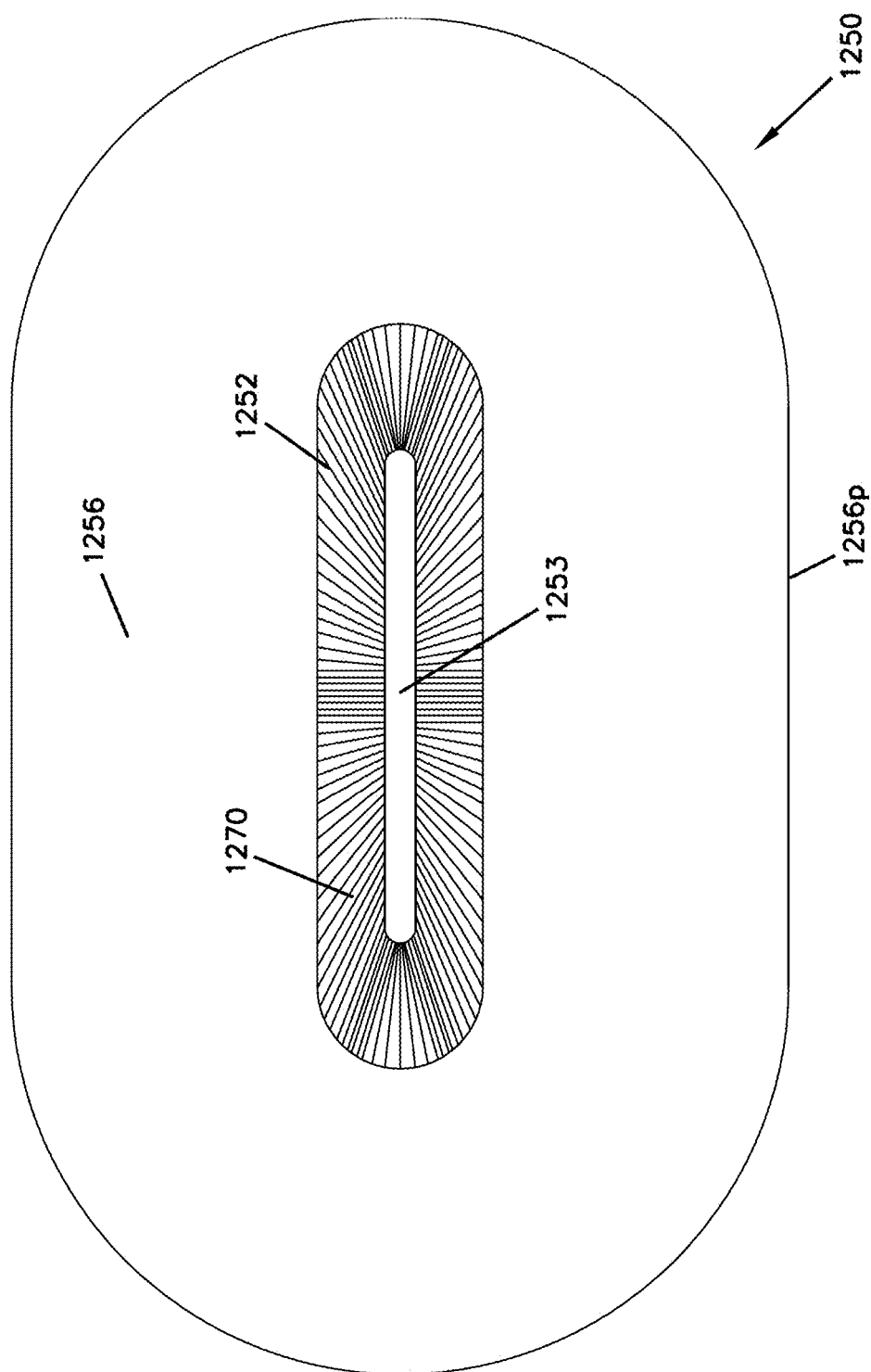
FIG. 35A is a bottom view of the media pack of FIG. 35.
Figure 35B:
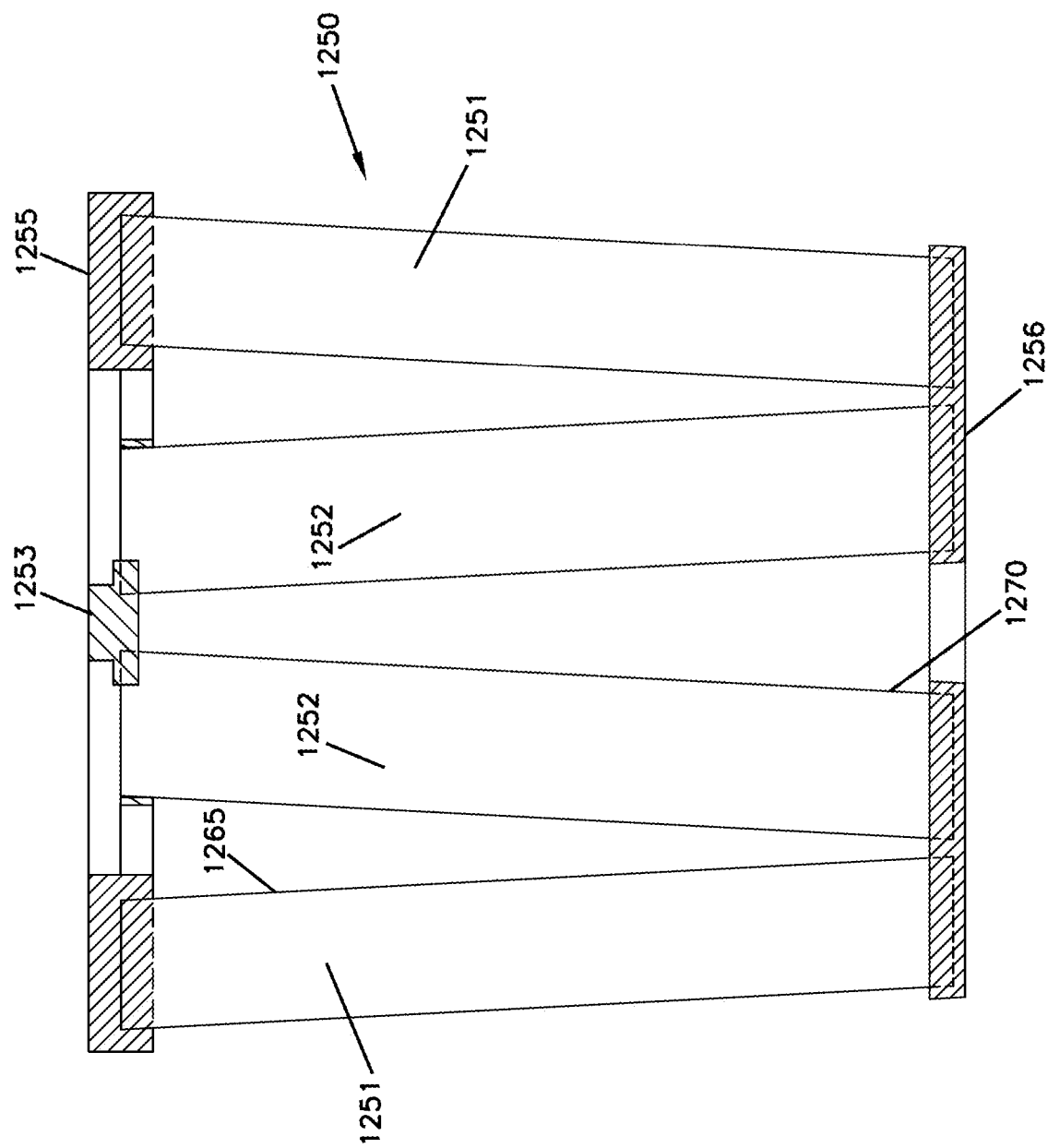
FIG. 35B is a side view of the media pack of FIG. 35.

In FIG. 35A, an end 1256 of the cartridge 1250, opposite end 1255 is viewable. Here, an interior of loop 1252 can be seen, surrounding an open gas flow region 1270. When air is directed through cartridge 1250 in a general direction toward end 1256 and away from end 1255, the portion of the air that passes through loop 1252 will enter central region 1270 and exit therefrom at end 1256. Of course air that has entered media loop 1251 during filtering would generally pass around (over) an outer perimeter 1256p of end 1256.

In FIG. 35B a schematic cross sectional view of cartridge 1250 is provided. Selected identified and described features are indicated by like reference numerals It will be understood from a review of FIGS. 35-35B, the above description, that the cartridge 1250 described, is generally a cartridge which has media tips extending in a longitudinal direction between opposite flow ends 1255, 1256.

In the arrangement of FIGS. 35-35B, the media pack 1250 is depicted with an oval, in particular racetrack, shaped perimeter. It is depicted in this manner, since the air filter cartridges in many examples below also have an oval or racetrack shaped configuration. However, the principles can be embodied in a variety of alternate peripheral shapes.

Herein, in FIGS. 36-41, some schematic, fragmentary, cross-sectional views are provided of still further alternate variations of media types that can be used in selected applications of the principles characterized herein. Certain examples are described in U.S. Ser. No. 62/077,749, filed Nov. 10, 2014 and owned by the Assignee of the present disclosure, Donaldson Company, Inc. The disclosure of U.S. Ser. No. 62/077,749 is incorporated herein by reference. In general, each of the arrangements of FIGS. 9-12 represents a media type that can be stacked or coiled into an arrangement that has opposite inlet and outlet flow ends (or faces), with straight through flow.

Figure 36:
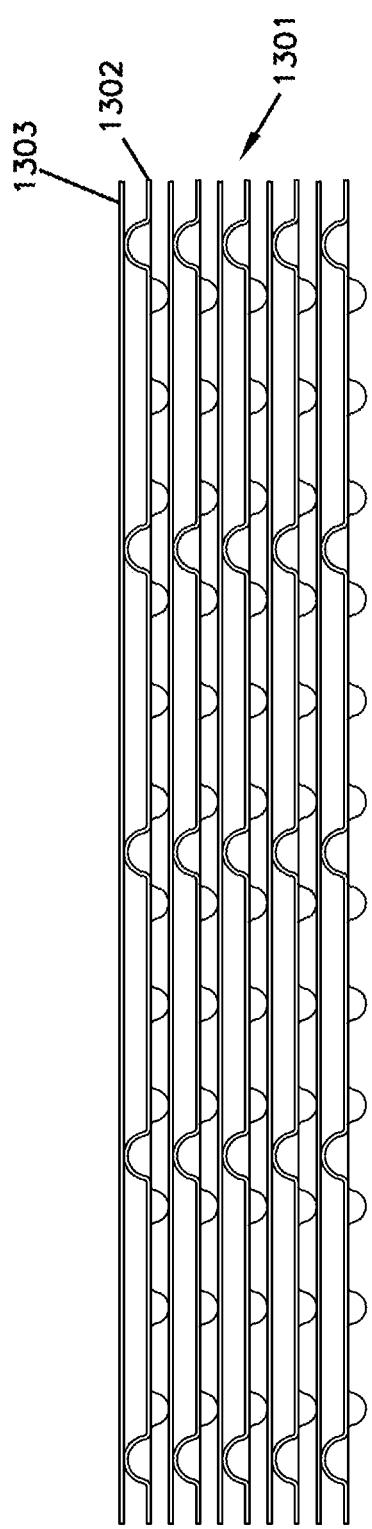
FIG. 36 is an end view of an alternative media pack that can be used in the air cleaner assembly of the present disclosure.

In FIG. 36, an example media arrangement 1301 from U.S. Ser. No. 62/077,749 is depicted, in which an embossed sheet 1302 is secured to a non-embossed sheet 1303, then stacked and coiled into a media pack, with seals along opposite edges of the type previously described for FIG. 1 herein.

Figure 37:
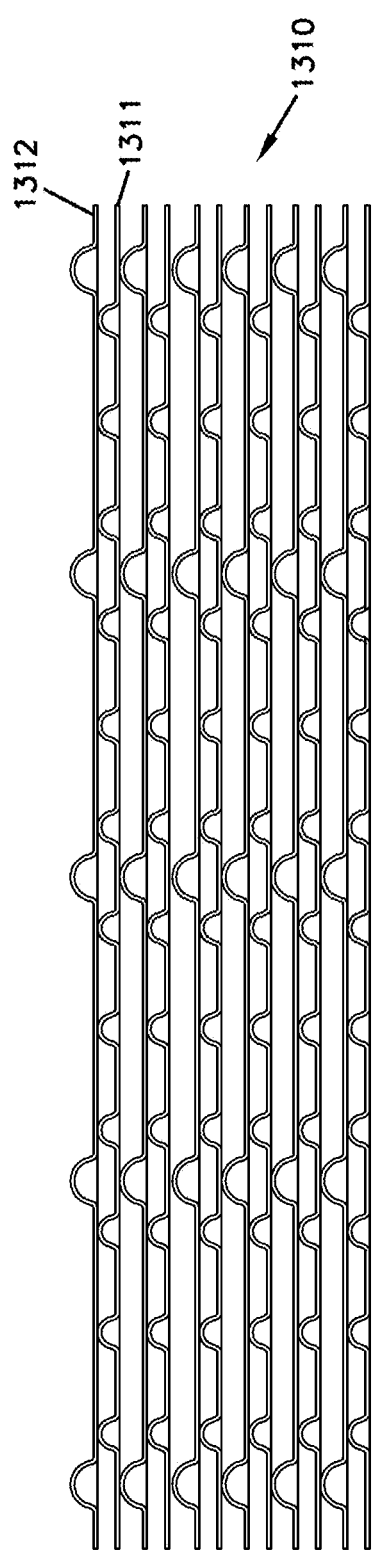
FIG. 37 is a perspective view of an alternative media pack that can be used in the air cleaner assembly of the present disclosure.

In FIG. 37, an alternate example media pack 1310 from U.S. Ser. No. 62/077,749 is depicted, in which a first embossed sheet 1311 is secured to a second embossed sheet 1312 and then formed into a stacked or coiled media pack arrangement, having edge seals.

Edge seals can be conducted in either the upstream end or the downstream end, or in some instances both. Especially when the media is likely to encounter chemical material during filtering, it may be desirable to avoid a typical adhesive or sealant.

Figure 38A:
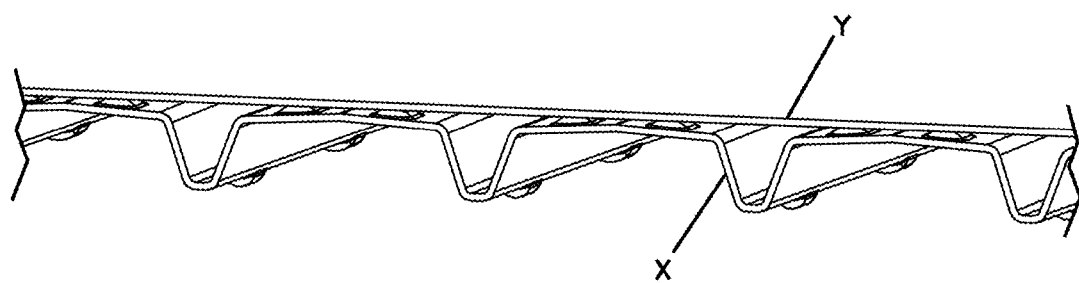
FIG. 38A is a perspective view of an alternative media pack that can be used in the air cleaner assembly of the present disclosure.

In FIG. 38A, a cross-section is depicted in which the fluted sheet X has various embossments on it for engagement with the facing sheet Y. Again these can be separate, or sections of the same media sheet.

Figure 38B:
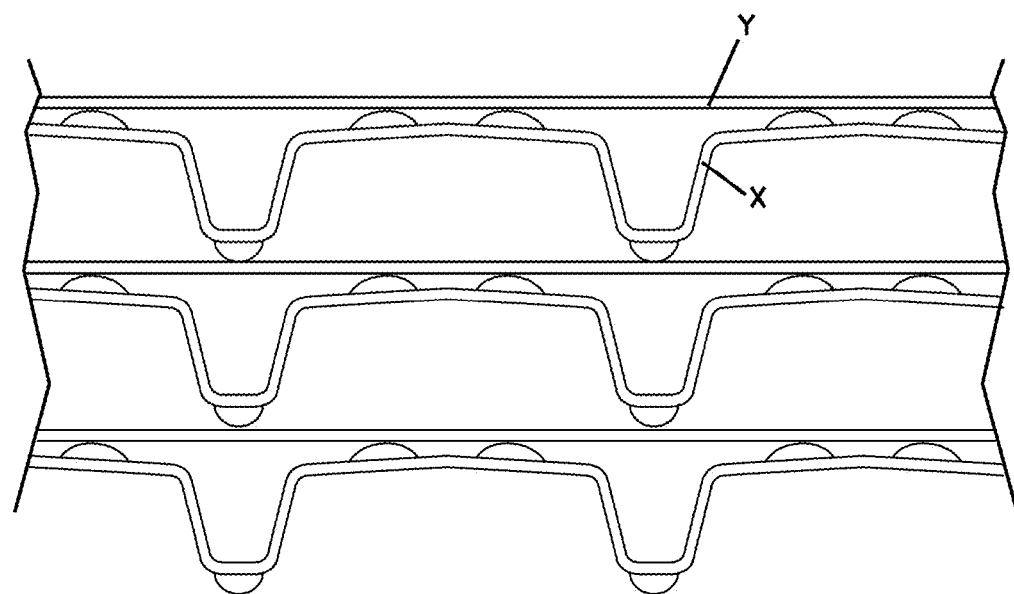
FIG. 38B is an end view of a portion of the media pack of FIG. 38A.

In FIG. 38B, a schematic depiction of such an arrangement between the fluted sheet X and facing sheet Y is also shown.

Figure 38C:
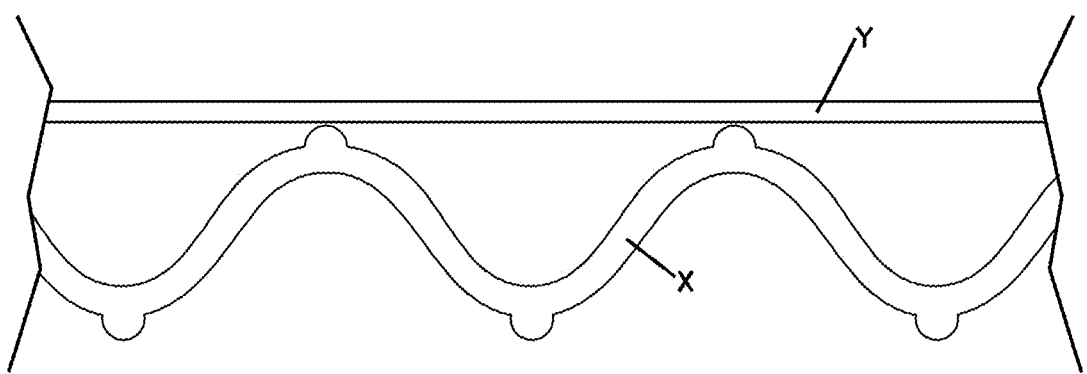
FIG. 38C is an end view of a portion of an alternative media pack that can be used in the air cleaner assembly of the present disclosure.

In FIG. 38C, a still further variation of such a principle is shown between a fluted sheet X and a facing sheet Y. These are meant to help understand how a wide variety of approaches are possible.

Figure 39:
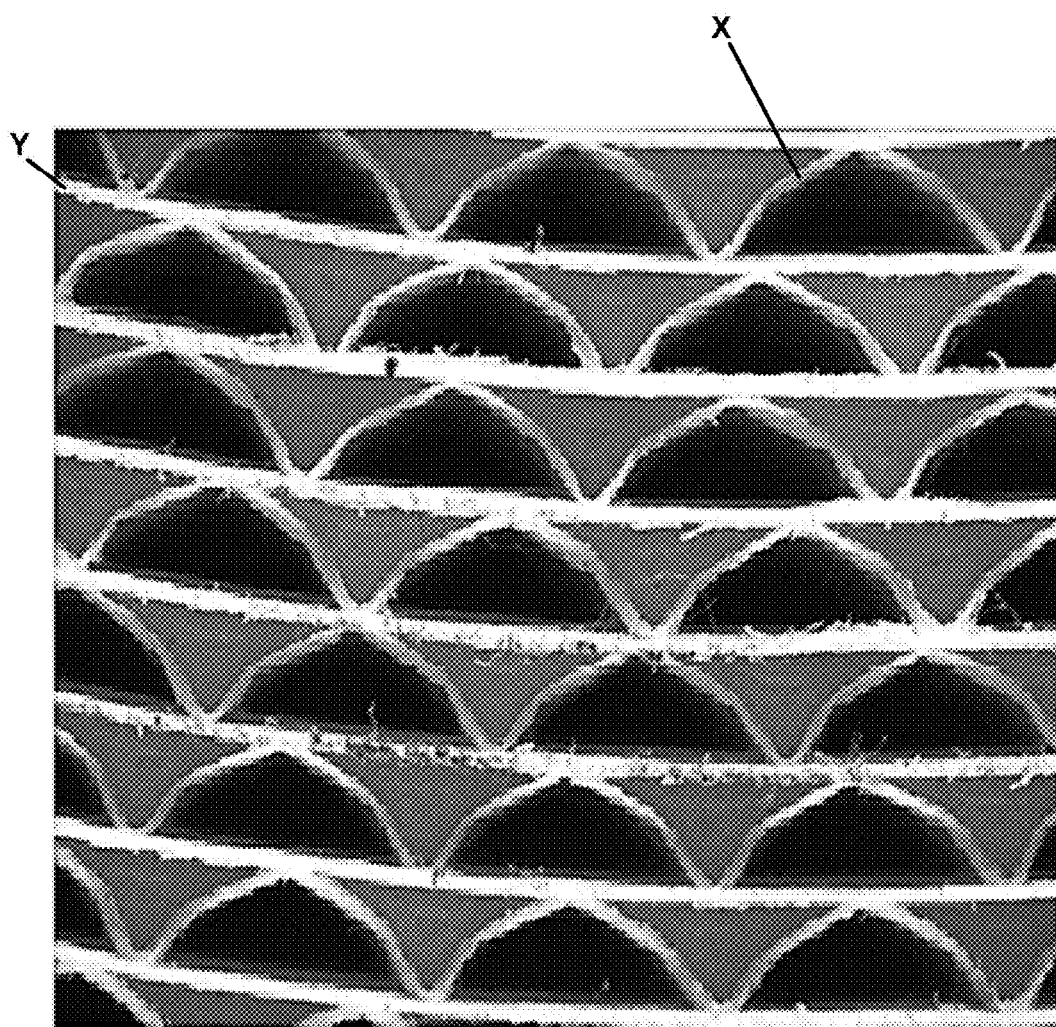
FIG. 39 is an end view of a portion of an alternative media pack that can be used in the air cleaner assembly of the present disclosure.

In FIG. 39, still another possible variation in fluted sheet X and facing sheet Y is shown.

Figure 40:
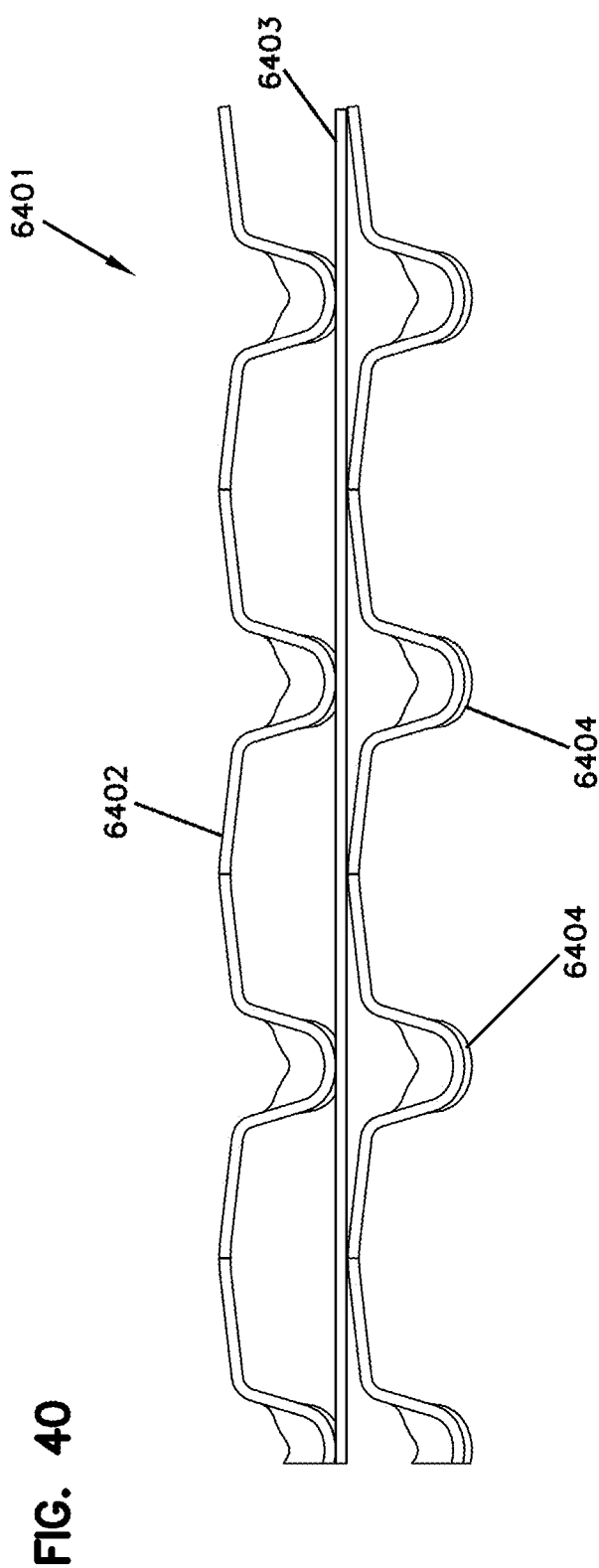
FIG. 40 is an end view of a portion of an alternative media pack that can be used in the air cleaner assembly of the present disclosure.
Figure 41:
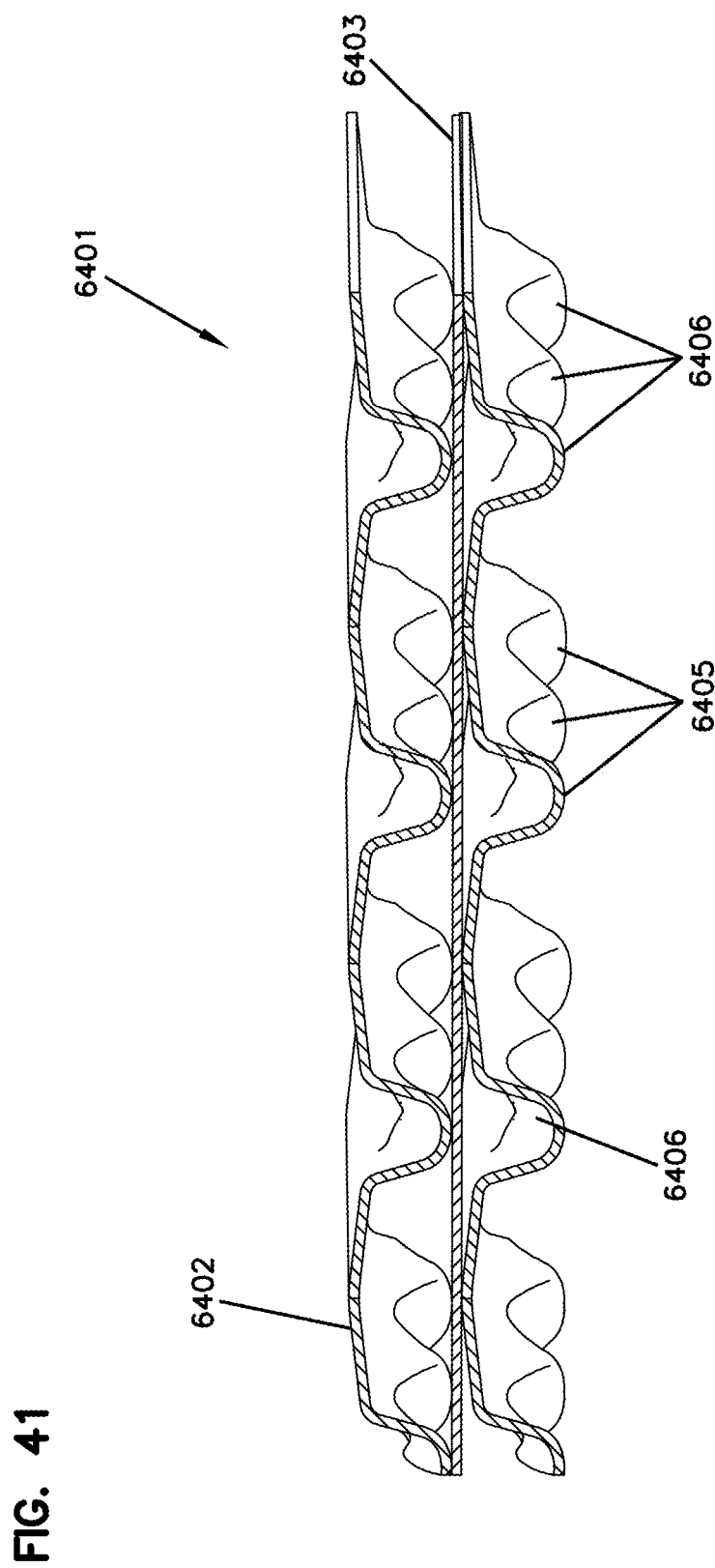
FIG. 41 is an end view of a portion of an alternative media pack that can be used in the air cleaner assembly of the present disclosure.

In FIGS. 40 and 41, an example media arrangement 6401 is depicted, in which a fluted sheet 6402 is secured to a facing sheet 6403. The facing sheet 6403 may be a flat sheet. The media arrangement 6401 can then be stacked or coiled into a media pack, with seals along opposite edges of the type previously described for FIG. 1 herein. In the embodiment shown, the flutes 6404 of fluted sheet 6402 have an undulating ridgeline including a series of peaks 6405 and saddles 6406. The peaks 6405 of adjacent flutes 6404 can be either aligned as shown in FIGS. 64 and 65 or offset. Further the peak height and/or density can increase, decrease, or remain constant along the length of the flutes 6404. The ratio of the peak flute height to saddle flute height can vary from about 1.5 to 1 to 1.1 to about 1.

It is noted that there is no specific requirement that the same media be used for the fluted sheet section and the facing sheet section. A different media can be desirable in each, to obtain different effects. For example, one may be a cellulose media, while the other is a media containing some non-cellulose fiber. They may be provided with different porosity or different structural characteristics, to achieve desired results.

Many of the techniques characterized herein will preferably be applied when the media is oriented for filtering between opposite flow ends of the cartridge is media having flutes or pleat tips that extend in a direction between those opposite ends. However, alternatives are possible. The techniques characterized herein with respect to seal arrangement definition can be applied in filter cartridges that have opposite flow ends, with media positioned to filter fluid flow between those ends, even when the media does not include flutes or pleat tips extending in a direction between those ends. The media, for example, can be depth media, can be pleated in an alternate direction, or it can be a non-pleated material.

The techniques characterized herein can be used with cartridges that are relatively deep in extension between flow ends, usually at least 100 mm, typically at least 150 mm, often at least 200 mm, sometimes at least 250 mm, and in some instances 300 mm or more, and are configured for large loading volume during use. These types of systems will typically be ones in which the media is configured with pleat tips or flutes extending in a direction between opposite flow ends.

Figure 42A:
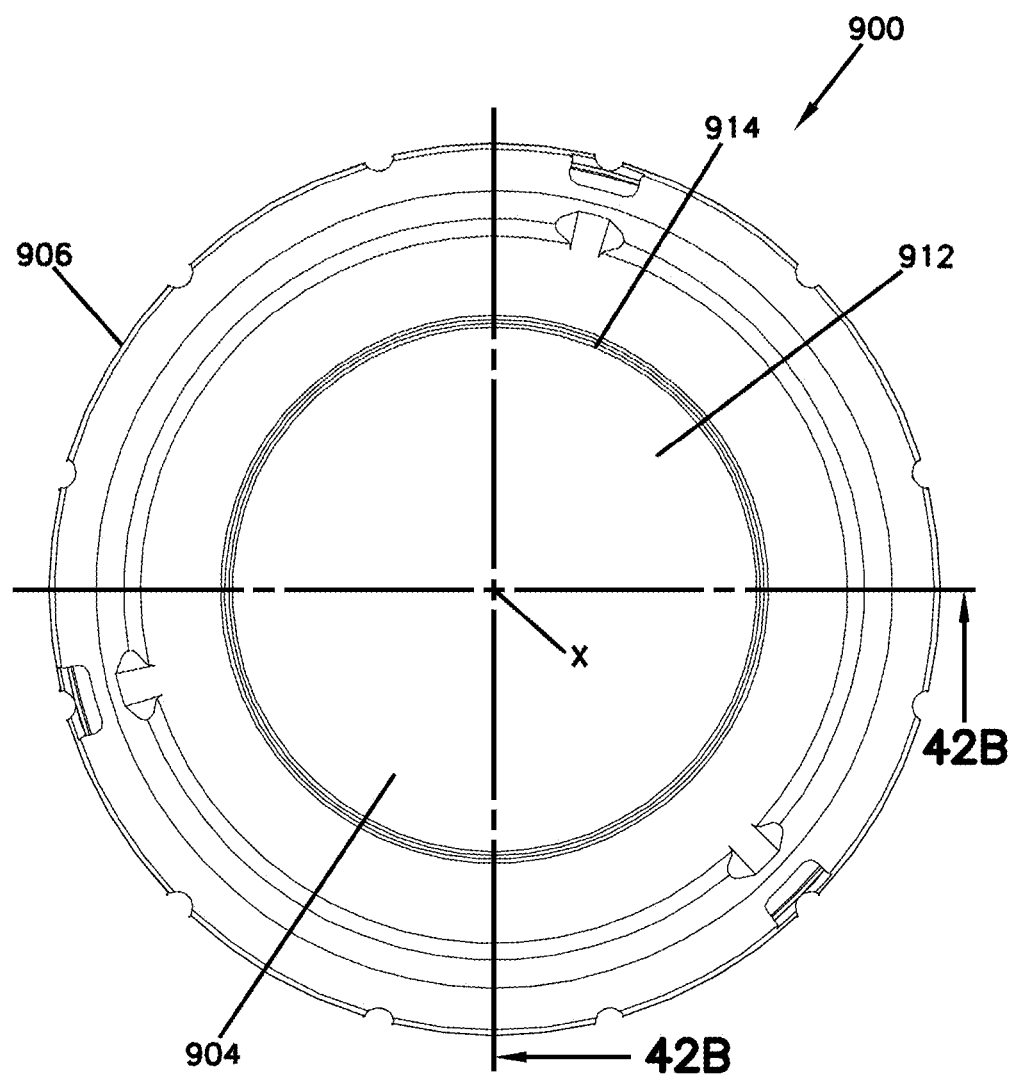
FIG. 42A is an end view of an alternative filter element that can be used in the air cleaner assembly of the present disclosure.
Figure 42B:
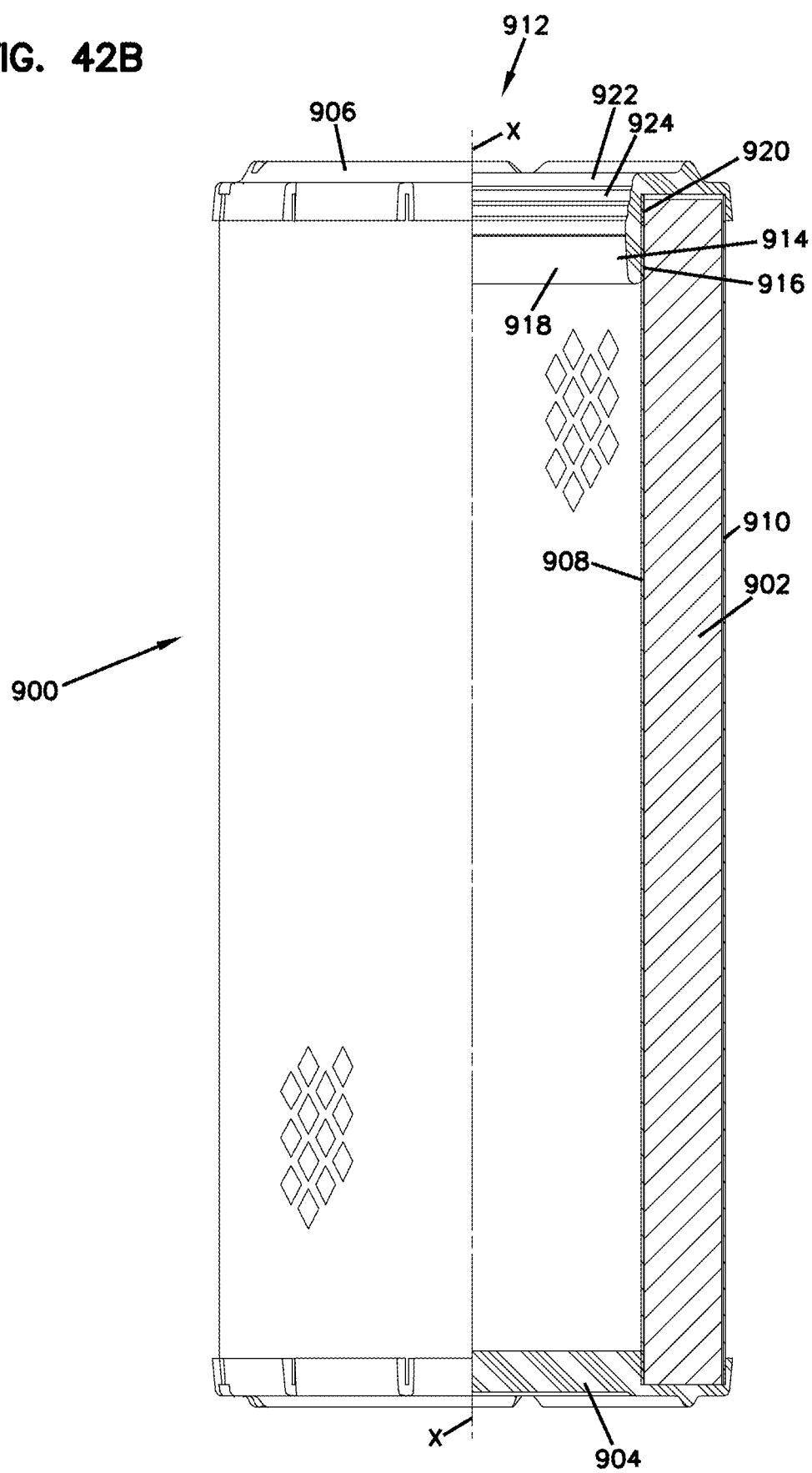
FIG. 42B is a sectional view of the filter element of FIG. 42A taken along line 42B-42B.

Now referring to FIGS. 42A and 42B, an alternative filter element that can be used in the air cleaner assembly having a wavy wall 210 as illustrated in FIGS. 10-13 is shown at reference number 900. The filter element 900 includes a cylindrically arranged media pack 902, a closed end cap 904, and an open end cap 906. The media pack preferably includes an inner screen or support structure 908 and an outer screen or support structure 910 that help support the media pack 902. Preferably, the media pack 902 is a pleated media pack, and the screen or support structures 908 and 910 extend from the closed end cap 904 to the open end cap 906. The media pack 902 is arranged around a central open volume 912, and the open end cap 906 includes a central opening 914 that is in communication with the central open volume 912. The closed end cap 904 is closed to flow of air therethrough, and the open end cap 906 is open to flow of air through the central opening 914. As discussed previously, fluid (such as air) to be filtered can flow inwardly through the media pack 902 and clean air can flow from the central open volume 912 through the central opening 914. Alternatively, the flow can be reversed so that dirty fluid enters via the central opening 914 and the central open volume 912, and then flows through the media pack 902 to provide filtration thereof, and then to the exterior of the media pack 902.

The open end cap 906 includes a seal member 916. The inner screen or support structure 908 forms a support 920 for the seal member 916, although support separate from the inner screen or the support structure 908 can be provided. The seal member 916 is shown having a seal surface 918 that can be characterized as an inwardly directed radial seal surface. In addition, the seal member 916 can include a lead in region 922 and a transition region 924. In the case of an inwardly directed seal, the inner perimeter can decrease from the lead in region 922 to the transition region 924 and to the seal surface 918 when the filter element 900 is provided separate from the housing. The lead in region 922 and the transition region 924 help the seal surface 918 into a configuration that mirrors the wavy wall 210 so that it provides a seal against the wavy wall 210 when inserted into the air cleaner containing the wavy wall 210.

The seal member 916 of the open end cap 906 has a softness sufficient to form a seal with a corresponding air cleaner wavy wall seal surface. The formation of a seal can be determined by satisfying the seal performance test ISO 15011:2014. Accordingly, the seal member 916 forms a seal when it engages the air cleaner wavy wall seal surface by satisfying ISO 15011:2014. The seal member 916 can be characterized as having a softness sufficient to form a seal with the wavy wall seal surface of the air cleaner housing when it is introduced into the air cleaner and provided in a sealing relationship with the air cleaner housing. In addition, the seal member 916 can be characterized as constructed to conform or capable of conforming to the wavy wall so that the seal surface 918 mirrors the wavy wall. Because of the softness of the seal member 916, the seal member seal surface 918 is able to conform to the configuration of the wavy wall seal surface of the air cleaner housing. An exemplary material that can be used to form the seal member 916 includes silicone rubbers. Preferably, the silicon rubber can have a shore hardness according to ASTM D-412 of 00-30 to 00-10, and more preferably about 00-20. An exemplary type of silicone rubber that can be used is available under the name Ecoflex® from Smooth-On. An exemplary Ecoflex® rubber that can be used includes Ecoflex® 00-20. Furthermore, the specific seal member material selected to form a seal depends on various conditions such as operating temperature, seal thickness, lobe size, etc.

When the filter element 900 is introduced into an air cleaner so that the seal member 916 forms a seal, such as an inwardly directed radial seal as shown, with the wavy wall surface of the air cleaner housing, the seal surface 918 conforms to the wavy wall configuration. Accordingly, the filter element 900, when provided in a sealing relationship with a wavy wall seal surface of an air cleaner housing, can be characterized as having a radially directed seal surface and a thickness between the seal support surface and the radially directed seal surface that varies along the seal member surface about the central axis X. In addition, the seal surface 918 can be characterized, when inserted into a housing having a wavy wall surface, as having the radially directed seal member surface 918, a plurality of lobes arranged along and forming the seal member surface, and wherein the plurality of lobes provide a pitch of about 1 mm/lobe to about 25 mm/lobe. The configuration of the seal surface 918 can be consistent with the other characterization of the wavy wall.

The seal surface 918, prior to introducing the filter element into a sealing relationship with the housing, can have a smooth surface (for example, see FIGS. 42A and 42B) or a non-smooth surface (such as a textured or patterned surface) that does not mirror the wavy wall configuration. It may be helpful to provide the seal surface 918 with a non-smooth surface to assist the seal surface 918 in conforming to the wavy wall shape.

Although the filter element 900 is shown having an inwardly directed radial seal surface 918 that is able to conform and seal with an outwardly directed wavy wall seal surface of an air cleaner, such as the first filter cartridge seal surface 202 shown in FIGS. 10-13, an alternative filter element can be provided wherein the seal member includes an outwardly directed radial seal surface that can (or is capable of) conforming to an inwardly directed wavy wall seal surface in an air cleaner. An example of the inwardly directed wavy wall seal surface is shown as the second filter cartridge seal surface 204 in FIGS. 10-13. The seal member can be provided as sufficiently soft so that it mirrors the wavy wall and forms a seal with the wavy wall.

The same principles of using a seal member that is sufficiently soft so that the seal surface, whether inwardly directed, or outwardly directed, can be applied to a filter element to provide a seal against the wavy walls 202 and 204 as illustrated in FIG. 10 can be applied to a filter element for sealing against the wavy wall 412 as illustrated in FIGS. 26-27 and the wavy wall 505 (including the wavy wall seal surface 506 and the wavy wall seal surface 507) as illustrated in FIGS. 28-32. That is, the soft seal member that is able to conform to the wavy wall and thereby take the shape of the wavy wall can be used as the seal member 422 in FIG. 26, and as the seal members 510 and 522 of FIG. 28.

The seal support can be provided as various alternative structures that support the seal member in a sealing relationship with the housing. One type of seal support is a preform. An example of a preform is an injection molded plastic material. It should be understood, however, that the term "preform" refers to the formation of the seal support prior to application of the seal member thereon. Other examples of preforms include screens, filtration media, and various other plastic formed structures. While these are examples of preforms, they are also examples of seal supports. An example of filtration media that can be used as a seal support includes stiffened filtration media having a hardening agent applied to the filtration media. An example of a stiffened filter media is described in, for example International Publication No. WO 2016/057815 at, for example, paragraphs [0099]-[0161], wherein a reinforcing agent is applied to filtration media, and the result of the reinforcing agent and the filtration media forms a seal support without the need for an additional plastic structure (such as an injection molded plastic structure) to support the seal. The disclosure of International Publication No. WO 2016/057815 relating to the use of a reinforcing agent with filtration media to support a seal member is incorporated by reference. In addition, a seal support can be provided by applying a curable material (such as a polymeric material) around a filtration media pack, allowing the curable material to cure or harden, and then applying a housing seal (for example by molding) around the cured material so that the cured material forms a seal support for the housing seal as described in U.S. Pat. No. 8,241,383. The entire disclosure of U.S. Pat. No. 8,241,383 is incorporated herein by reference. As described, the curable material can be applied by spraying the curable material or molding the curable material onto or around the filtration media.

Selected Characterizations

1. A filter cartridge comprising: (a) filtration media; and (b) a housing seal arrangement coupled to the filtration media, comprising: (i) a seal support having a surface; and (ii) a seal member supported by the seal support and having a radially directed seal surface and a thickness between the seal support surface and the radially directed seal surface that varies along the seal member surface. 2. A filter cartridge according to claim 1 wherein: (a) the radially directed seal surface comprises an inwardly directed radial seal surface. 3. A filter cartridge according to claim 1 wherein: (a) the radially directed seal surface comprises an outwardly directed radial seal surface. 4. A filter cartridge according to any of claims 1-3 wherein: (a) the thickness between the seal support and the radially directed seal surface varies in a radial direction. 5. A filter cartridge according to any of claims 1-4 wherein: (a) the thickness between the seal support and the radially directed seal surface is generally constant in an axial direction. 6. A filter cartridge according to any of claims 1-5 wherein: (a) the seal member thickness varies by a minimum thickness and a maximum thickness, wherein the maximum thickness is at least 1.1 times the minimum thickness. 7. A filter cartridge according to any of claims 1-6 wherein: the radially directed seal surface comprises at least one of (a) a plurality of outwardly projecting and axially extending portions; and (b) a plurality of inwardly projecting and axially extending portions. 8. A filter cartridge according to claim 7 wherein: (a) the plurality of outwardly projecting and axially extending portions and the plurality of inwardly projecting and axially extending portions are formed in the radially directed seal surface when the cartridge is introduced into a housing and forms a seal with a housing seal surface. 9. A filter cartridge according to claim 7 wherein: (a) the radially directed seal surface comprises a plurality of outwardly projecting and axially extending portions alternating with a plurality of inwardly projecting and axially extending portions, and the radially directed seal surface comprises an outwardly directed radial seal surface where the thickness of the seal member between the seal support and the radially directed seal surface at the plurality of outwardly projecting and axially extending portions is greater than the thickness of the seal member between the seal support and the radially directed seal surface at the plurality of inwardly projecting and axially extending portions. 10. A filter cartridge according to claim 7 wherein: (a) the radially directed seal surface comprises a plurality of outwardly projecting and axially extending portions alternating with a plurality of inwardly projecting and axially extending portions, and the radially directed seal surface comprises an inwardly directed radial seal surface where the thickness of the seal member between the seal support and the radially directed seal surface at the plurality of outwardly projecting and axially extending portions is less than the thickness of the seal member between the seal support and the radially directed seal surface at the plurality of inwardly projecting and axially extending portions. 11. A filter cartridge according to any of claims 7-10 wherein: (a) the radially directed seal surface comprises a plurality of outwardly projecting and axially extending portions alternating with a plurality of inwardly projecting and axially extending portions, at least one of the plurality of outwardly projecting and axially extending portions and the plurality of inwardly projecting and axially extending portions comprise curved portions. 12. A filter cartridge according to any of claims 7-11 wherein: (a) the radially directed seal surface comprises a plurality of outwardly projecting and axially extending portions alternating with a plurality of inwardly projecting and axially extending portions, the radially directed seal surface comprises at least two radially outwardly projecting and axially extending portions alternating with at least two radially inwardly projecting and axially extending portions per inch along the seal support extending around the filter cartridge axis. 13. A filter cartridge according to any of claims 7-12 wherein: (a) the radially directed seal surface comprises a plurality of outwardly projecting and axially extending portions alternating with a plurality of inwardly projecting and axially extending portions, the radially directed seal surface comprises less than about 13 of the radially outwardly projecting and axially extending portions alternating with less than about 13 of the radially inwardly projecting and axially extending portions along a distance of one inch along the seal support extending around the filter cartridge axis. 14. A filter cartridge according to any of claims 7-13 wherein: (a) the radially directed seal surface comprises a plurality of outwardly projecting and axially extending portions alternating with a plurality of inwardly projecting and axially extending portions, the radially directed seal surface comprises greater than 20, inclusive, of the radially outwardly projecting and axially extending portions alternating with greater than 20, inclusive, of the radially inwardly projecting and axially extending portions. 15. A filter cartridge according to any of claims 7-14 wherein: (a) the radially directed seal surface comprises a plurality of outwardly projecting and axially extending portions alternating with a plurality of inwardly projecting and axially extending portions, the radially directed seal surface comprises 20-400, inclusive, of the radially outwardly projecting and axially extending portions alternating with 20-400, inclusive, of the radially inwardly projecting and axially extending portions. 16. A filter cartridge according to any of claims 1-15 wherein: (a) the housing seal arrangement forms a fluid port where fluid flows into or out of the filtration media, and the thickness of the seal member between the seal support and the radially directed seal member varies around the fluid port. 17. A filter cartridge according to any of claims 1-16 wherein: (a) the filtration media has first and second ends; and, surrounds and defines a central open volume. 18. A filter cartridge according to claim 17 wherein: (a) the filtration media comprises pleated media arranged around the central open volume. 19. A filter cartridge according to claim 17 wherein: (a) the filtration media comprises non-pleated media arranged around the central open volume. 20. A filter cartridge according to any of claims 1-16 wherein: (a) the filtration media comprises filter media defining first and second, opposite, flow faces; and having a set of flutes closed proximate the second flow face, and a set of flutes closed proximate the first flow face. 21. A filter cartridge according to any of claims 1-16 and 20 wherein: (a) the filtration media comprises a fluted sheet of media attached to a second sheet of media, and wound or stacked. 22. A filter cartridge according to any of claims 1-16 and 20-21 wherein: (a) the filtration media comprises filter media defining first and second, opposite, flow faces, having flutes extending from the first flow face to the second flow face, and wherein flow from the first flow face to the second flow face is closed except by flow through the filtration media. 23. A filter cartridge according to any of claims 7-16 wherein: (a) the radially directed seal surface comprises a plurality of outwardly projecting and axially extending portions alternating with a plurality of inwardly projecting and axially extending portions, and the thickness between the seal support surface and the radially directed seal surface varies continuously between the outwardly projecting and axially extending portions and the inwardly projecting and axially extending portions along the radially directed seal surface about the filter cartridge axis. 24. A filter cartridge according to any of claims 1-23 wherein: (a) the filtration media has first and second ends; (b) a first, open, end piece is positioned at the first end of the media; and, (c) the housing seal arrangement is positioned on the first end piece. 25. A filter cartridge according to any of claims 1-24 wherein: (a) the seal support comprises a support structure extending around a filtration media axis, the seal support also supporting the filtration media. 26. A filter cartridge according to any of claims 1-25 wherein: (a) the seal support comprises a preform. 27. A filter cartridge according to any of claims 1-26 wherein: (a) the radially directed seal surface is recessed from the end of the filtration media. 28. A filter assembly comprising: (a) a housing having a gas flow inlet and a gas flow outlet and comprising a body section having an access cover; (b) a wavy wall housing seal structure; and (c) a filter cartridge according to any of claims 1-26 operably, removably positioned within the housing and sealed to the wavy wall housing seal structure. 29. A filter assembly according to claim 28 wherein: (a) the wavy wall housing seal structure comprises a first filter cartridge wavy wall surface and a second filter cartridge wavy wall surface. 30. A filter assembly according to claim 29 wherein: (a) the first filter cartridge wavy wall surface and the second filter cartridge wavy wall surface are on opposite sides of the wavy wall housing seal structure. 31. A filter cartridge comprising: (a) filtration media; and (b) a housing seal arrangement comprising: (i) a seal member having a radially directed seal member surface; (ii) a plurality of lobes arranged along and forming the seal member surface; and (iii) wherein the plurality of lobes provide a pitch of about 1 mm/lobe to about 25 mm/lobe. 32. A filter cartridge according to claim 31 wherein: (a) the plurality of lobes provide a pitch of about 2 mm/lobe to about 12 mm/lobe. 33. A filter cartridge according to claim 31 wherein: (a) the plurality of lobes provide a pitch of about 4 mm/lobe to about 10 mm/lobe. 34. A filter cartridge according to any of claims 31-33 wherein: (a) the seal member surface is provided as an inwardly directed radial seal surface. 35. A filter cartridge according to any of claims 31-33 wherein: (a) the seal member surface is provided as an outwardly directed radial seal surface. 36. A filter cartridge according to any of claims 31-35 wherein: (a) the filtration media is arranged peripherally around the seal member surface. 37. A filter cartridge according to any of claims 31-35 wherein: (a) the seal member surface is arranged peripherally around the filtration media. 38. A filter cartridge according to any of claims 31-37 wherein: (a) the filtration media comprises pleated media. 39. A filter cartridge according to any of claim 38 wherein: (a) the pleated media is arranged around a central open volume. 40. A filter cartridge according to any of claims 31-37 wherein: (a) the filtration media comprises non-pleated media. 41. A filter cartridge according to claim 40 wherein: (a) the filtration media comprises filter media defining first and second, opposite, flow faces; and having a set of flutes closed proximate the second flow face, and a set of flutes closed proximate the first flow face. 42. A filter cartridge according to any of claims 40 and 41 wherein: (a) the filtration media comprises a fluted sheet of media attached to a second sheet of media, and wound or stacked. 43. A filter cartridge according to any of claims 40-41 wherein: (a) the filtration media comprises filter media defining first and second, opposite, flow faces, having flutes extending from the first flow face to the second flow face, and wherein flow from the first flow face to the second flow face is closed except by flow through the filtration media. 44. A filter assembly comprising: (a) a housing having a gas flow inlet and a gas flow outlet and comprising a body section having an access cover; (b) a wavy wall housing seal structure; and (c) a filter cartridge according to any of claims 30-42 operably, removably positioned within the housing and sealed to the wavy wall housing seal structure. 45. A filter assembly according to claim 44 wherein: (a) the wavy wall housing seal structure comprises a first filter cartridge wavy wall surface and a second filter cartridge wavy wall surface. 46. A filter assembly according to claim 45 wherein: (a) the first filter cartridge wavy wall surface and the second filter cartridge wavy wall surface are on opposite sides of the wavy wall housing seal structure. 47. A filter cartridge comprising: (a) filtration media; and (b) a housing seal arrangement coupled to the filtration media, the housing seal arrangement comprising: (i) a seal support; and (ii) a seal member supported by the seal support and having a radially directed surface and a softness sufficient to permit the radially directed surface to conform to a wavy wall seal surface on a filter housing having a plurality of lobes provided at a pitch of about 1 mm/lobe to about 25 mm/lobe. 48. A filter cartridge according to claim 47 wherein: (a) the plurality of lobes provide a pitch of about 2 mm/lobe to about 12 mm/lobe. 49. A filter cartridge according to claim 47 wherein: (a) the plurality of lobes provide a pitch of about 4 mm/lobe to about 10 mm/lobe. 50. A filter cartridge according to any of claims 47-49 wherein: (a) the seal member surface is provided as an inwardly directed radial seal surface. 51. A filter cartridge according to any of claims 47-49 wherein: (a) the seal member surface is provided as an outwardly directed radial seal surface. 52. A filter cartridge according to any of claims 47-51 wherein: (a) the filtration media is arranged peripherally around the seal member surface. 53. A filter cartridge according to any of claims 47-51 wherein: (a) the seal member surface is arranged peripherally around the filtration media. 54. A filter cartridge according to any of claims 47-53 wherein: (a) the filtration media comprises pleated media. 55. A filter cartridge according to any of claim 54 wherein: (a) the pleated media is arranged around a central open volume. 56. A filter cartridge according to claim 47-53 wherein: (a) the filtration media comprises non-pleated media. 57. A filter cartridge according to claim 56 wherein: (a) the filtration media comprises filter media defining first and second, opposite, flow faces; and having a set of flutes closed proximate the second flow face, and a set of flutes closed proximate the first flow face. 58. A filter cartridge according to any of claims 56 and 57 wherein: (a) the filtration media comprises a fluted sheet of media attached to a second sheet of media, and wound or stacked. 59. A filter cartridge according to any of claims 56-58 wherein: (a) the filtration media comprises filter media defining first and second, opposite, flow faces, having flutes extending from the first flow face to the second flow face, and wherein flow from the first flow face to the second flow face is closed except by flow through the filtration media. 60. A filter cartridge according to any of claims 47-59 wherein: (a) the seal member comprises silicone rubber. 61. A filter assembly comprising: (a) a housing having a gas flow inlet and a gas flow outlet and comprising a body section having an access cover; (b) a wavy wall housing seal structure; and (c) a filter cartridge according to any of claims 46-59 operably, removably positioned within the housing and sealed to the wavy wall housing seal structure. 62. A filter assembly according to claim 61 wherein: (a) the wavy wall housing seal structure comprises a first filter cartridge wavy wall surface and a second filter cartridge wavy wall surface. 63. A filter assembly according to claim 62 wherein: (a) the first filter cartridge wavy wall surface and the second filter cartridge wavy wall surface are on opposite sides of the wavy wall housing seal structure. 64. A method of servicing a filter assembly according to any of claims 28-30, 44-46, and 61-63 comprising: (a) introducing the filter cartridge into the housing and forming a seal between the seal member and the wavy wall housing seal structure. 65. A method of servicing a filter assembly according to claim 64, further comprising: (a) conforming the seal member to the wavy wall housing seal structure by the step of introducing the filter cartridge into the housing.

Again, the principles, techniques, and features described herein can be applied in a variety of systems, and there is no requirement that all of the advantageous features identified be incorporated in an assembly, system or component to obtain some benefit according to the present disclosure.

What is claimed:
1. A filter cartridge comprising:
   (a) filtration media comprising pleated media arranged around a central open volume, the filtration media extending from a filtration media first end to a filtration media second end;
   (b) a liner for supporting the pleated media arranged around a central open volume, the liner extending from a liner first end to a liner second end;
   (c) a first, open, end cap and a second, closed, end cap, wherein:
      (i) the filtration media first end and the liner first end extend into the first, open, end cap;
      (ii) the filtration media second end and the liner second end extend into the second, closed, end cap;
      (iii) the first, open, end cap comprises an opening through the first, open, end cap, wherein the filter cartridge comprises a central axis extending through the central open volume, the second end cap, and the opening in the first end cap;
      (iv) the first, open, end cap comprising a radially directed seal surface constructed to form a seal against an air cleaner seal surface when operably installed in an air cleaner housing, wherein the radially directed seal surface comprises a plurality of outwardly projecting and axially extending portions projecting away from the central axis and a plurality of inwardly projecting and axially extending portions projecting toward the central axis; and
      (v) the liner first end being non-undulating at a location between the filtration media and the radially directed seal surface.
2. A filter cartridge according to claim 1 wherein:
   (a) the pleated media arranged around a central open volume is arranged in a cylindrical configuration.
3. A filter cartridge according to claim 1 wherein:
   (a) the pleated media arranged around a central open volume is arranged in a conical configuration.
4. A filter cartridge according to claim 1 wherein:
   (a) a thickness of the first end cap between the seal surface and the liner first end varies along the seal surface in a direction about the central axis of filter cartridge.
5. A filter cartridge according to claim 4 wherein:
   (a) the thickness of the first end cap between the seal surface and the liner first end includes a portion that is generally constant in a direction parallel to the central axis.

6. A filter cartridge according to claim 4 wherein:
(a) the thickness of the first, open, end cap between the seal surface and the liner first end varies by a minimum thickness and a maximum thickness in the direction about the central axis, wherein the maximum thickness is at least 1.1 times the minimum thickness.

7. A filter cartridge according to claim 1 wherein:
(a) the plurality of outwardly projecting and axially extending portions and the plurality of inwardly projecting and axially extending portions are formed in the seal surface when the filter cartridge is introduced into a housing and forms a seal with a housing seal surface.

8. A filter cartridge according to claim 1 wherein:
(a) the plurality of outwardly projecting and axially extending portions alternating with the plurality of inwardly projecting and axially extending portions alternate in a direction about the central axis of the filter cartridge.

9. A filter cartridge according to claim 1 wherein:
(a) the plurality of outwardly projecting and axially extending portions and the plurality of inwardly projecting and axially extending portions comprise curved portions.

10. A filter cartridge according to claim 1 wherein:
(a) the seal surface comprises at least two of the radially outwardly projecting and axially extending portions alternating with at least two of the radially inwardly projecting and axially extending portions per inch along the seal support extending around the central axis of the filter cartridge.

11. A filter cartridge according to claim 1 wherein:
(a) the seal surface comprises at least 20 of the radially outwardly projecting and axially extending portions alternating with at least 20 of the radially inwardly projecting and axially extending portions.

12. A filter cartridge according to claim 1 wherein:
(a) the seal surface comprises 20 to 40 of the radially outwardly projecting and axially extending portions alternating with 20 to 40 of the radially inwardly projecting and axially extending portions.

13. A filter cartridge according to claim 1 wherein:
(a) the seal surface comprises 20-120 of the radially outwardly projecting and axially extending portions alternating with 20-120 of the radially inwardly projecting and axially extending portions.

14. A filter cartridge according to claim 1 wherein:
(a) the seal surface is recessed from an end of the first, open, end cap farthest from the second, closed end cap.

15. A filter cartridge according to claim 1 wherein:
(a) the internal surface comprises a lead in region and a seal region, wherein both the lead in region and the seal region comprises the plurality of outwardly projecting and axially extending portions and the plurality of inwardly projecting and axially extending portions, and wherein the seal region comprises the seal surface.

16. A filter cartridge according to claim 15 wherein:
(a) the lead in region and the seal region are recessed from an end of the first, open, end cap farthest from the second end cap, and the seal region is recessed further than the lead in region.

17. A filter cartridge according to claim 1 wherein:
(a) the radially directed seal surface comprises an inwardly facing radial seal surface.

18. A filter cartridge according to claim 1 wherein:
(a) the radially directed seal surface comprises an outwardly facing radial seal surface.

19. A filter cartridge according to claim 1 wherein:
(a) the liner first end extending into the first, open, end cap is located between the seal surface and the filter media first end.

20. A filter cartridge according to claim 1 wherein:
(a) the liner first end extending into the first, open, end cap is located radially outwardly from the seal surface and the filter media first end.

21. A filter cartridge comprising:
(a) filtration media comprising pleated media arranged around a central open volume, the filtration media extending from a filtration media first end to a filtration media second end;
(b) a liner for supporting the pleated media arranged around the central open volume;
(c) a first, open, end cap and a second, closed, end cap, wherein:
 (i) the filtration media first end extends into the first, open, end cap;
 (ii) the filtration media second end extends into the second, closed, end cap;
 (iii) the first, open, end cap comprises an opening through the first, open, end cap;
 (iv) the seal surface is constructed to form a radially directed seal against an air cleaner seal surface when operably installed in an air cleaner housing, the seal surface is recessed from an end of the first end cap farthest from the second end cap;
 (v) the seal surface comprises a plurality of outwardly projecting and axially extending portions and a plurality of inwardly projecting and axially extending portions; and
 (vi) the liner comprises a portion located between the seal surface and the filtration media, and wherein the portion of the liner located between the seal surface and the filtration media being non-undulating.

* * * * *